United States Patent
Pera et al.

(10) Patent No.: US 9,325,516 B2
(45) Date of Patent: Apr. 26, 2016

(54) POWER RECEPTACLE WIRELESS ACCESS POINT DEVICES FOR NETWORKED LIVING AND WORK SPACES

(71) Applicant: Ubiquiti Networks, Inc., San Jose, CA (US)

(72) Inventors: Robert J. Pera, San Jose, CA (US);
Randall W. Frei, San Jose, CA (US);
Linker Cheng, San Jose, CA (US)

(73) Assignee: Ubiquiti Networks, Inc., San Jose, CA (US)

( * ) Notice: Subject to any disclaimer, the term of this patent is extended or adjusted under 35 U.S.C. 154(b) by 0 days.

(21) Appl. No.: 14/639,892

(22) Filed: Mar. 5, 2015

(65) Prior Publication Data
US 2015/0256665 A1      Sep. 10, 2015

Related U.S. Application Data

(60) Provisional application No. 61/949,918, filed on Mar. 7, 2014, provisional application No. 61/954,244, filed on Mar. 17, 2014, provisional application No. 62/031,106, filed on Jul. 30, 2014.

(51) Int. Cl.
| | |
|---|---|
| *H04M 1/00* | (2006.01) |
| *H04L 12/28* | (2006.01) |
| *G05B 15/02* | (2006.01) |
| *H04M 1/725* | (2006.01) |

(52) U.S. Cl.
CPC ............ *H04L 12/2803* (2013.01); *G05B 15/02* (2013.01); *H04M 1/72533* (2013.01)

(58) Field of Classification Search
CPC ............... H04B 2203/5441; H04B 2203/5483; H04B 3/542; H04B 2203/5454; H04B 1/3805; H04L 12/66; H04L 2012/2841; H04L 41/0816; H04W 88/16; H04N 21/41407
See application file for complete search history.

(56) References Cited

U.S. PATENT DOCUMENTS

| | | | |
|---|---|---|---|
| 3,155,975 A | 11/1964 | Chatelain | |
| 3,633,208 A | 1/1972 | Ajioka | |
| 3,696,433 A | 10/1972 | Killion et al. | |
| 3,739,392 A | 6/1973 | Ross et al. | |
| 3,825,874 A | 7/1974 | Peverill | |

(Continued)

FOREIGN PATENT DOCUMENTS

| | | | |
|---|---|---|---|
| EP | 2131505 A1 | 9/2009 | |
| GB | 2313957 A | 12/1997 | |

(Continued)

OTHER PUBLICATIONS

Sanford, John; U.S. Appl. No. 14/170,507 entitled "Coaxial RF Dual-Polarized Waveguide Filter and Method," filed Jan. 31, 2014.

(Continued)

*Primary Examiner* — Quan M Hua
(74) *Attorney, Agent, or Firm* — Shay Glenn LLP

(57) ABSTRACT

Described herein are power receptacle wireless access point (AP) devices that may be used as part of a networked (smart) living and work space. These power receptacle wireless AP devices may be wall-mounted and/or retrofitted over existing electrical outlets or light switches, for providing wireless access to a room or region of a room. The power receptacle wireless AP device may connect via power line communication to a data connection.

26 Claims, 42 Drawing Sheets

(56) References Cited

U.S. PATENT DOCUMENTS

| | | |
|---|---|---|
| 4,613,868 A | 9/1986 | Weiss |
| 4,658,262 A | 4/1987 | Duhamel |
| 4,757,324 A | 7/1988 | Dhanjal |
| 4,758,842 A | 7/1988 | Linhardt et al. |
| 4,973,953 A | 11/1990 | Shimokawa et al. |
| 4,992,866 A | 2/1991 | Morgan |
| 5,131,006 A | 7/1992 | Kamerman et al. |
| 5,151,920 A | 9/1992 | Haagh et al. |
| 5,191,349 A | 3/1993 | Dinsmore et al. |
| 5,295,154 A | 3/1994 | Meier et al. |
| 5,303,413 A | 4/1994 | Braegas |
| 5,307,515 A | 4/1994 | Kuo et al. |
| 5,339,455 A | 8/1994 | Vogt et al. |
| 5,406,260 A | 4/1995 | Cummings et al. |
| 5,416,797 A | 5/1995 | Gilhousen et al. |
| 5,422,887 A | 6/1995 | Diepstraten et al. |
| 5,428,636 A | 6/1995 | Meier |
| 5,503,566 A | 4/1996 | Wang |
| 5,504,746 A | 4/1996 | Meier |
| 5,510,975 A | 4/1996 | Ziegler |
| 5,523,768 A | 6/1996 | Hemmie et al. |
| 5,546,397 A | 8/1996 | Mahany |
| 5,564,093 A | 10/1996 | Matsumoto |
| 5,608,413 A | 3/1997 | Macdonald |
| 5,621,662 A | 4/1997 | Humphries et al. |
| 5,661,494 A | 8/1997 | Bondyopadhyay |
| 5,666,126 A | 9/1997 | Lange |
| 5,706,428 A | 1/1998 | Boer et al. |
| 5,734,350 A | 3/1998 | Deming et al. |
| 5,740,366 A | 4/1998 | Mahany et al. |
| 5,758,296 A | 5/1998 | Nakamura |
| 5,782,656 A | 7/1998 | Zell et al. |
| 5,805,111 A | 9/1998 | Brettner et al. |
| 5,844,893 A | 12/1998 | Gollnick et al. |
| 5,872,594 A | 2/1999 | Thompson |
| 5,936,542 A | 8/1999 | Kleinrock et al. |
| 5,936,584 A | 8/1999 | Lawrence et al. |
| 5,940,771 A | 8/1999 | Gollnick et al. |
| 6,036,539 A | 3/2000 | Rigby et al. |
| 6,045,402 A | 4/2000 | Embo et al. |
| 6,067,053 A | 5/2000 | Runyon et al. |
| 6,113,431 A | 9/2000 | Wong |
| 6,124,830 A | 9/2000 | Yuanzhu |
| 6,127,987 A | 10/2000 | Maruyama et al. |
| 6,130,892 A | 10/2000 | Short et al. |
| 6,192,282 B1 | 2/2001 | Smith et al. |
| 6,194,992 B1 | 2/2001 | Short et al. |
| 6,206,724 B1 | 3/2001 | Leung |
| 6,208,310 B1 | 3/2001 | Suleiman et al. |
| 6,219,005 B1 | 4/2001 | Szafranek |
| 6,252,559 B1 | 6/2001 | Donn |
| 6,275,922 B1 | 8/2001 | Bertsch |
| 6,313,798 B1 | 11/2001 | Bancroft et al. |
| 6,320,553 B1 | 11/2001 | Ergene |
| 6,326,922 B1 | 12/2001 | Hegendoerfer |
| 6,334,057 B1 | 12/2001 | Malmgren et al. |
| 6,337,990 B1 | 1/2002 | Koshino |
| 6,359,647 B1 | 3/2002 | Sengupta et al. |
| 6,362,783 B1 | 3/2002 | Sugiura et al. |
| 6,374,311 B1 | 4/2002 | Mahany et al. |
| 6,386,913 B1 | 5/2002 | Mohammad et al. |
| 6,386,914 B1 | 5/2002 | Collins et al. |
| 6,411,258 B1 | 6/2002 | Ho |
| 6,425,783 B1 | 7/2002 | Touboul |
| 6,429,827 B1 | 8/2002 | Hsueh et al. |
| 6,462,710 B1 | 10/2002 | Carson et al. |
| 6,501,377 B2 | 12/2002 | Ebata et al. |
| 6,524,119 B2 | 2/2003 | Kato et al. |
| 6,529,234 B2 | 3/2003 | Urisaka et al. |
| 6,535,793 B2 | 3/2003 | Allard |
| 6,563,786 B1 | 5/2003 | Van Nee |
| 6,567,482 B1 | 5/2003 | Popovic |
| 6,593,892 B2 | 7/2003 | Honda et al. |
| 6,597,393 B2 | 7/2003 | Kato et al. |
| 6,618,017 B1 | 9/2003 | Ryken et al. |
| 6,636,894 B1 | 10/2003 | Short et al. |
| 6,643,496 B1 | 11/2003 | Shimoyama et al. |
| 6,665,004 B1 | 12/2003 | Paff |
| 6,665,536 B1 | 12/2003 | Mahany |
| 6,679,728 B1 | 1/2004 | Huang et al. |
| 6,697,415 B1 | 2/2004 | Mahany |
| 6,714,559 B1 | 3/2004 | Meier |
| 6,738,582 B1 | 5/2004 | Moshe et al. |
| 6,759,957 B2 | 7/2004 | Murakami et al. |
| 6,789,110 B1 | 9/2004 | Short et al. |
| 6,795,852 B1 | 9/2004 | Kleinrock et al. |
| 6,808,414 B2 | 10/2004 | Spiegel et al. |
| 6,810,426 B2 | 10/2004 | Mysore et al. |
| 6,844,862 B1 | 1/2005 | Cencich et al. |
| 6,845,297 B2 | 1/2005 | Allard |
| 6,857,009 B1 | 2/2005 | Ferreria et al. |
| 6,865,169 B1 | 3/2005 | Quayle et al. |
| 6,868,399 B1 | 3/2005 | Short et al. |
| 6,945,817 B2 | 9/2005 | Miyazaki et al. |
| 6,954,859 B1 | 10/2005 | Simerly et al. |
| 6,968,173 B2 | 11/2005 | Cowley |
| 6,970,680 B1 | 11/2005 | Tomoe |
| 6,970,751 B2 | 11/2005 | Gonzales et al. |
| 6,977,585 B2 | 12/2005 | Falk et al. |
| 6,997,753 B2 | 2/2006 | Broomall et al. |
| 7,020,082 B2 | 3/2006 | Bhagavath et al. |
| 7,086,898 B2 | 8/2006 | Johnsen et al. |
| 7,088,727 B1 | 8/2006 | Short et al. |
| 7,095,321 B2 | 8/2006 | Primm et al. |
| 7,117,043 B1 | 10/2006 | Frederick et al. |
| 7,117,526 B1 | 10/2006 | Short |
| 7,155,196 B1 | 12/2006 | Beard |
| 7,194,554 B1 | 3/2007 | Short et al. |
| 7,197,556 B1 | 3/2007 | Short et al. |
| 7,252,555 B2 | 8/2007 | Moessinger |
| 7,254,191 B2 | 8/2007 | Sugar et al. |
| 7,286,095 B2 | 10/2007 | Parsche et al. |
| 7,295,812 B2 | 11/2007 | Haapoja et al. |
| 7,319,477 B2 | 1/2008 | Katz |
| 7,353,114 B1 | 4/2008 | Rohlf et al. |
| 7,386,002 B2 | 6/2008 | Meier |
| 7,413,474 B2 | 8/2008 | Liu et al. |
| 7,430,442 B2 | 9/2008 | He et al. |
| 7,457,646 B2 | 11/2008 | Mahany et al. |
| 7,483,984 B1 | 1/2009 | Jonker et al. |
| 7,526,539 B1 | 4/2009 | Hsu |
| 7,555,658 B2 | 6/2009 | Vahid et al. |
| 7,584,020 B2 | 9/2009 | Bruemmer et al. |
| 7,587,260 B2 | 9/2009 | Bruemmer et al. |
| 7,636,559 B2 | 12/2009 | Magnusen et al. |
| 7,668,621 B2 | 2/2010 | Bruemmer |
| 7,683,940 B2 | 3/2010 | Fleming |
| 7,696,940 B1 | 4/2010 | Macdonald |
| 7,710,940 B2 | 5/2010 | Van Der Wal et al. |
| 7,715,800 B2 | 5/2010 | Sinha |
| 7,733,835 B2 | 6/2010 | Sammour et al. |
| 7,734,038 B2 * | 6/2010 | Martich et al. ............ 379/413.04 |
| 7,739,383 B1 | 6/2010 | Short et al. |
| 7,752,334 B2 | 7/2010 | Paunikar et al. |
| 7,783,390 B2 | 8/2010 | Miller |
| 7,791,466 B2 | 9/2010 | Agarwalla et al. |
| 7,801,644 B2 | 9/2010 | Bruemmer et al. |
| 7,826,426 B1 | 11/2010 | Bharghavan et al. |
| 7,839,926 B1 | 11/2010 | Metzger et al. |
| 7,848,263 B2 | 12/2010 | Chhabra |
| 7,865,252 B2 | 1/2011 | Clayton |
| 7,934,952 B2 | 5/2011 | Pera |
| 7,974,738 B2 | 7/2011 | Bruemmer et al. |
| 8,013,732 B2 | 9/2011 | Petite et al. |
| 8,031,650 B2 | 10/2011 | Petite et al. |
| 8,042,048 B2 | 10/2011 | Wilson et al. |
| 8,060,582 B2 | 11/2011 | Bliss et al. |
| 8,073,564 B2 | 12/2011 | Bruemmer et al. |
| 8,077,113 B2 | 12/2011 | Syed et al. |
| 8,154,398 B2 | 4/2012 | Rolf et al. |
| 8,165,041 B2 | 4/2012 | Wang et al. |
| 8,184,061 B2 | 5/2012 | Sanford |
| 8,184,064 B2 | 5/2012 | Sanford |
| 8,190,708 B1 | 5/2012 | Short et al. |

(56) References Cited

U.S. PATENT DOCUMENTS

| | | |
|---|---|---|
| 8,219,059 B2 | 7/2012 | Pera et al. |
| 8,270,767 B2 | 9/2012 | Park |
| 8,306,634 B2 | 11/2012 | Nguyen et al. |
| 8,310,335 B2 | 11/2012 | Sivakkolundhu |
| 8,335,272 B2 | 12/2012 | Roberts |
| 8,350,697 B2 | 1/2013 | Trundle et al. |
| 8,385,869 B2 | 2/2013 | Feenaghty et al. |
| 8,390,684 B2 | 3/2013 | Piran et al. |
| 8,400,997 B2 | 3/2013 | Pera et al. |
| 8,421,700 B2 | 4/2013 | Sanford |
| 8,421,704 B2 | 4/2013 | Sanford |
| 8,429,435 B1 | 4/2013 | Clayton et al. |
| 8,466,847 B2 | 6/2013 | Pera et al. |
| 8,467,759 B2 | 6/2013 | Pera et al. |
| 8,478,450 B2 | 7/2013 | Lu et al. |
| 8,483,188 B2 | 7/2013 | Walton et al. |
| 8,489,065 B2 | 7/2013 | Green et al. |
| 8,493,279 B2 | 7/2013 | Pera et al. |
| 8,619,136 B2 | 12/2013 | Howarter et al. |
| 8,698,684 B2 | 4/2014 | Sanford |
| 8,698,687 B2 | 4/2014 | Pera et al. |
| 8,736,503 B2 | 5/2014 | Zaghloul et al. |
| 8,761,142 B2 | 6/2014 | Dayanandan et al. |
| 8,836,601 B2 | 9/2014 | Sanford et al. |
| 8,855,730 B2 | 10/2014 | Sanford |
| 8,879,574 B2 | 11/2014 | Dayanandan et al. |
| 8,880,204 B2 | 11/2014 | Frei et al. |
| 8,902,120 B2 | 12/2014 | Sanford |
| 8,941,976 B1 * | 1/2015 | Maroney ............... 361/637 |
| 2001/0046258 A1 | 11/2001 | Wise et al. |
| 2002/0015393 A1 | 2/2002 | Pan et al. |
| 2002/0105475 A1 | 8/2002 | Overton et al. |
| 2002/0113744 A1 | 8/2002 | Strickland |
| 2002/0142780 A1 | 10/2002 | Airy et al. |
| 2002/0187760 A1 | 12/2002 | Krishmar Junker et al. |
| 2003/0032398 A1 | 2/2003 | Harris |
| 2003/0098812 A1 | 5/2003 | Ying et al. |
| 2003/0169522 A1 | 9/2003 | Schofield et al. |
| 2003/0189516 A1 | 10/2003 | Olson |
| 2003/0207669 A1 | 11/2003 | Kroeger |
| 2003/0217136 A1 | 11/2003 | Cho et al. |
| 2003/0224728 A1 * | 12/2003 | Heinonen et al. ............ 455/41.2 |
| 2003/0224801 A1 | 12/2003 | Lovberg et al. |
| 2003/0233660 A1 | 12/2003 | Slemmer et al. |
| 2004/0133913 A1 | 7/2004 | Benveniste |
| 2004/0151126 A1 | 8/2004 | Matsubara |
| 2004/0209521 A1 | 10/2004 | Cooper et al. |
| 2004/0233107 A1 | 11/2004 | Popov et al. |
| 2005/0048835 A1 | 3/2005 | Clark |
| 2005/0048971 A1 | 3/2005 | Findikli et al. |
| 2005/0057700 A1 | 3/2005 | Lim et al. |
| 2005/0136880 A1 | 6/2005 | Subasic et al. |
| 2005/0152306 A1 * | 7/2005 | Bonnassieux et al. ........ 370/328 |
| 2006/0050677 A1 | 3/2006 | Schafer |
| 2006/0057986 A1 | 3/2006 | Wakui et al. |
| 2006/0079230 A1 | 4/2006 | Russell |
| 2006/0090923 A1 | 5/2006 | Fetterolf et al. |
| 2006/0116170 A1 | 6/2006 | Brahmbhatt et al. |
| 2006/0128371 A1 | 6/2006 | Dillon et al. |
| 2006/0229114 A2 | 10/2006 | Kim |
| 2006/0253205 A1 | 11/2006 | Gardiner |
| 2006/0258315 A1 | 11/2006 | Fein et al. |
| 2006/0281433 A1 | 12/2006 | Yang et al. |
| 2007/0042732 A1 | 2/2007 | Kang et al. |
| 2007/0053362 A1 | 3/2007 | Garg |
| 2007/0057860 A1 | 3/2007 | Jaffer et al. |
| 2007/0075909 A1 | 4/2007 | Flynn et al. |
| 2007/0086424 A1 | 4/2007 | Calcev et al. |
| 2007/0188615 A1 | 8/2007 | Beniyama et al. |
| 2007/0205847 A1 | 9/2007 | Kushta et al. |
| 2007/0216764 A1 | 9/2007 | Kwak |
| 2007/0238419 A1 | 10/2007 | Dubois et al. |
| 2007/0274249 A1 | 11/2007 | Hulbert et al. |
| 2007/0282944 A1 | 12/2007 | Odaka et al. |
| 2008/0009967 A1 | 1/2008 | Bruemmer |
| 2008/0036657 A1 | 2/2008 | Oomuro |
| 2008/0048927 A1 | 2/2008 | Hoshi |
| 2008/0051053 A1 | 2/2008 | Fedan |
| 2008/0056125 A1 | 3/2008 | Kneckt et al. |
| 2008/0080553 A1 | 4/2008 | Hasty et al. |
| 2008/0113552 A1 | 5/2008 | Casperson et al. |
| 2008/0125129 A1 | 5/2008 | Lee |
| 2008/0136713 A1 | 6/2008 | Fu et al. |
| 2008/0151801 A1 | 6/2008 | Mizuta |
| 2008/0159239 A1 | 7/2008 | Odlyzko et al. |
| 2008/0162048 A1 | 7/2008 | Yang et al. |
| 2008/0165731 A1 | 7/2008 | Zellner |
| 2008/0165735 A1 | 7/2008 | Chen et al. |
| 2008/0175265 A1 | 7/2008 | Yonge et al. |
| 2008/0192644 A1 | 8/2008 | Utsunomiya et al. |
| 2008/0211929 A1 | 9/2008 | Uchihara |
| 2008/0212612 A1 | 9/2008 | Singh et al. |
| 2008/0219198 A1 | 9/2008 | Honkasalo et al. |
| 2008/0224938 A1 | 9/2008 | Udagawa et al. |
| 2008/0231538 A1 | 9/2008 | Inque et al. |
| 2008/0240107 A1 | 10/2008 | Parekh et al. |
| 2008/0291873 A1 | 11/2008 | Benveniste |
| 2008/0303661 A1 | 12/2008 | Chick |
| 2008/0309535 A1 | 12/2008 | Le Guillou |
| 2009/0003374 A1 | 1/2009 | Morrissey et al. |
| 2009/0070477 A1 | 3/2009 | Baum et al. |
| 2009/0096689 A1 | 4/2009 | Krajicek |
| 2009/0157844 A1 | 6/2009 | Fionda et al. |
| 2009/0174622 A1 | 7/2009 | Kanou |
| 2009/0191751 A1 | 7/2009 | Barsigian et al. |
| 2009/0195467 A1 | 8/2009 | Vassilakis et al. |
| 2009/0234499 A1 | 9/2009 | Nielsen et al. |
| 2009/0237314 A1 | 9/2009 | Lalezari |
| 2009/0240791 A1 | 9/2009 | Sakurai et al. |
| 2009/0245227 A1 | 10/2009 | Chin et al. |
| 2009/0252127 A1 | 10/2009 | Rangarajan et al. |
| 2009/0257239 A1 | 10/2009 | Burton |
| 2009/0307255 A1 | 12/2009 | Park |
| 2009/0310721 A1 | 12/2009 | Redfern et al. |
| 2010/0007561 A1 | 1/2010 | Bucca et al. |
| 2010/0013729 A1 | 1/2010 | Harel et al. |
| 2010/0023865 A1 | 1/2010 | Fulker et al. |
| 2010/0039979 A1 | 2/2010 | Takase et al. |
| 2010/0053022 A1 | 3/2010 | Mak et al. |
| 2010/0097473 A1 | 4/2010 | Park et al. |
| 2010/0106860 A1 * | 4/2010 | Li et al. .................... 709/250 |
| 2010/0115415 A1 | 5/2010 | Hickey |
| 2010/0152897 A1 | 6/2010 | Muller |
| 2010/0177012 A1 | 7/2010 | Morrow |
| 2010/0218004 A1 | 8/2010 | Cousy |
| 2010/0232324 A1 | 9/2010 | Radunovic et al. |
| 2010/0232400 A1 | 9/2010 | Patil et al. |
| 2010/0280635 A1 | 11/2010 | Cohn et al. |
| 2010/0280637 A1 | 11/2010 | Cohn et al. |
| 2010/0295736 A1 | 11/2010 | Su |
| 2010/0298957 A1 | 11/2010 | Sanchez Rocha et al. |
| 2010/0306320 A1 | 12/2010 | Leppanen et al. |
| 2011/0013601 A1 | 1/2011 | Cerasa et al. |
| 2011/0053536 A1 | 3/2011 | Friedmann |
| 2011/0057787 A1 | 3/2011 | Wu et al. |
| 2011/0058036 A1 | 3/2011 | Metzger et al. |
| 2011/0090129 A1 | 4/2011 | Weily et al. |
| 2011/0115816 A1 | 5/2011 | Brackney |
| 2011/0150401 A1 | 6/2011 | Furuyama |
| 2011/0185011 A1 | 7/2011 | Shuman et al. |
| 2011/0211559 A1 | 9/2011 | Lim et al. |
| 2011/0258678 A1 | 10/2011 | Cowling et al. |
| 2011/0260934 A1 | 10/2011 | Ilno et al. |
| 2011/0294342 A1 | 12/2011 | DeBock et al. |
| 2012/0019418 A1 | 1/2012 | Wong et al. |
| 2012/0062370 A1 | 3/2012 | Feldstein et al. |
| 2012/0127977 A1 | 5/2012 | Copeland et al. |
| 2012/0130513 A1 | 5/2012 | Hao et al. |
| 2012/0158161 A1 | 6/2012 | Cohn et al. |
| 2012/0176608 A1 | 7/2012 | McCown |
| 2012/0210147 A1 | 8/2012 | Musti et al. |
| 2012/0212332 A1 | 8/2012 | Schubert |
| 2012/0213086 A1 | 8/2012 | Matsuura |
| 2012/0226366 A1 | 9/2012 | Lee et al. |

(56) References Cited

U.S. PATENT DOCUMENTS

| | | | |
|---|---|---|---|
| 2012/0257862 | A1 | 10/2012 | Deel et al. |
| 2012/0275526 | A1 | 11/2012 | Hughes |
| 2013/0002515 | A1 | 1/2013 | Hills et al. |
| 2013/0012134 | A1 | 1/2013 | Jin et al. |
| 2013/0017794 | A1 | 1/2013 | Kloper et al. |
| 2013/0028150 | A1 | 1/2013 | Ma et al. |
| 2013/0035774 | A1 | 2/2013 | Warren et al. |
| 2013/0051286 | A1 | 2/2013 | Schultz et al. |
| 2013/0077606 | A1 | 3/2013 | Wu et al. |
| 2013/0107869 | A1 | 5/2013 | Abraham et al. |
| 2013/0154894 | A1 | 6/2013 | Caimi et al. |
| 2013/0201316 | A1 | 8/2013 | Binder et al. |
| 2013/0252567 | A1 | 9/2013 | Pera et al. |
| 2013/0271337 | A1 | 10/2013 | Lee et al. |
| 2014/0005809 | A1 | 1/2014 | Frei et al. |
| 2014/0005810 | A1 | 1/2014 | Frei et al. |
| 2014/0005851 | A1 | 1/2014 | Frei et al. |
| 2014/0006506 | A1 | 1/2014 | Frei et al. |
| 2014/0006552 | A1 | 1/2014 | Frei et al. |
| 2014/0006605 | A1 | 1/2014 | Frei et al. |
| 2014/0022918 | A1 | 1/2014 | Guo et al. |
| 2014/0115354 | A1 | 4/2014 | Jabbaz et al. |
| 2014/0118203 | A1 | 5/2014 | Sanford |
| 2014/0140228 | A1 | 5/2014 | Dayanandan et al. |
| 2014/0140232 | A1 | 5/2014 | Dayanandan et al. |
| 2014/0143374 | A1 | 5/2014 | Huang et al. |
| 2014/0218248 | A1 | 8/2014 | Schulz et al. |
| 2014/0219142 | A1 | 8/2014 | Schulz et al. |
| 2014/0220903 | A1 | 8/2014 | Schulz et al. |
| 2014/0225782 | A1 | 8/2014 | Sanford |
| 2014/0225788 | A1 | 8/2014 | Schulz et al. |
| 2014/0225802 | A1 | 8/2014 | Huerta et al. |
| 2014/0225803 | A1 | 8/2014 | Huerta et al. |
| 2014/0245160 | A1 | 8/2014 | Bauer et al. |
| 2014/0258742 | A1 | 9/2014 | Chien et al. |
| 2014/0266669 | A1 | 9/2014 | Fadell et al. |
| 2014/0274177 | A1 | 9/2014 | Carbajal |
| 2014/0329522 | A1 | 11/2014 | Dayanandan et al. |
| 2015/0002357 | A1 | 1/2015 | Sanford et al. |
| 2015/0105038 | A1 | 4/2015 | Lascari et al. |
| 2015/0142945 | A1 | 5/2015 | Brandt et al. |
| 2015/0187209 | A1 | 7/2015 | Brandt |

FOREIGN PATENT DOCUMENTS

| | | |
|---|---|---|
| JP | 2002299940 A | 10/2002 |
| KR | 20020095556 | 12/2002 |
| KR | 10-2008-0079357 | 9/2008 |
| WO | WO98/40990 A1 | 9/1998 |
| WO | WO99/34477 A1 | 7/1999 |
| WO | WO01/31855 A2 | 5/2001 |
| WO | WO01/31886 A2 | 5/2001 |
| WO | WO01/86877 A2 | 11/2001 |
| WO | WO03/023987 A1 | 3/2003 |
| WO | WO2006/044783 A2 | 4/2006 |
| WO | WO2008/042804 A2 | 4/2008 |
| WO | WO2009/146342 A1 | 12/2009 |
| WO | WO2010/049113 A1 | 5/2010 |
| WO | WO2011/005710 A2 | 1/2011 |
| WO | WO2014/004705 A1 | 1/2014 |

OTHER PUBLICATIONS

Hardy et al.; U.S. Appl. No. 14/639,909 entitled "Cloud device identification and authentication," filed Mar. 5, 2015.

Pera et al.; U.S. Appl. No. 14/639,905 entitled "Wall-mounted interactive sensing and audio-visual devices for networked living and work spaces," filed Mar. 5, 2015.

Dayanandan et al.; U.S. Appl. No. 14/659,397 entitled "Methods of operating an access point using a plurality of directional beams," filed Mar. 16, 2015.

Ashtaiwi et al.; Utilizing IEEE 802.11n to enhance QoS support in wireless mesh networks; (LCN 2008) 33rd IEEE Conf. on Loacal Computer Networks; pp. 689-696; Oct. 14-17, 2008.

Cisco; Cisco NX-OS Software: Business-Critical Cross-Platform Data Center OS (white paper); retrieved from the internet on Jul. 9, 2014 (http://www.cisco.com/c/en/us/products/collateral/switches/nexus-7000-series-switches/white_paper_c11-622511.pdf); 14 pgs.; © 2010.

El-Basioni et al.; Smart home design using wireless sensor network and biometric technologies; International Journal of Application or Innovation in Engineering & Management; 2(3); pp. 413-429; Mar. 2013.

Hajlaoui et al.; A frame aggregation scheduler for QoS-sensitive applications in IEEE802.11n WLANs; (ICCIT) Int. Conf. on Communications and Information Tech.; pp. 221-226; Jun. 26-28, 2012.

Iijima et al.; NETCONF over WebSocket; 82nd IETF Meeting, Taipei, Taiwan; retrieved from the internet (http://www.ietf.org/proceedings/82/slides/netconf-1.pdf); 9 pgs.; Nov. 13-18, 2011.

Internet Engineering Task Force (IETF); The WebSocket Protocol; 72 pgs.; Dec. 2011; retrieved from the internet on Mar. 6, 2014 from https://tools.ietf.org/html/rfc6455.

Kishk et al.; Conical dielectric resonator antennas for wide-band applications; IEEE Trans.; vol. AP-50; Issue 4; pp. 469-474; Apr. 2002.

Lewis, F. L.; Chapter 2: Wireless Sensor Networks; in Smart Environments: Technologies, Protocols, and Applications (eds Cook and Das); John Wiley & Sons, Inc.; Hoboken, NJ, USA; Sep. 2004 (pre-publication copy, 18 pgs.).

Liang et al.; Design and implementation of wireless smart-home sensor network based on ZigBee protocol; IEEE; International Conf. on Communications; Circuits and systems, ICCCAS 2008; May 25-27, 2008.

Liu et al.; Design of antenna radome composed of metamaterials for high gain; Antenna and Propogation Society Symposium; IEEE; pp. 19-22; Jul. 9-14, 2006.

Marcincak, Martin; AirGrid M5; 3 pgs.; Jan. 27, 2010; retrieved from the internet: http://www.youtube.com/watch?v=L4Z99Uzz-Bc (this web address was available to applicant(s) at least as of Jan. 27, 2010).

Nakajima et al.; A simple and efficient selective repeat scheme for high throughput WLAN; IEEE802.11n; IEEEVTS Vehicular Tech. Conf. Proc.; pp. 1302-1306; Apr. 22-25, 2007.

Netvox; Intelligent home automation system (Product Catalog); 123 pgs.; retrieved from the internet on Jul. 8, 2014 (http://www.netvox.com.tw/download/Netvox%20Catalog(English%20Version)%2020131129.pdf).

Open Networking Foundation; OpenFlow management and configuration protocol (OF-Config 1.1); retrieved from the internet: (www.opennetworking.org/images/stories/downloads/sdn-resources/onf-specifications/openflow-config/of-config-1.1pdf); 117 pgs.; Jun. 25, 2012.

Rosenberg et al.; Session Traversal Utilities for NAT (STUN); 52 pgs.; Oct. 2008; retrieved from the internet on Mar. 6, 2014 from http://tools.ietf.org/search/rfc5389.

Russell et al.; The Bayeux Specification; 25 pgs.; 2007; retrieved from the Internet on Mar. 6, 2014 from http://svn.cometd.org/trunk/bayeux/bayeux.html.

Streakwave Wireless; Ubiquiti Nanobridge m Series Product Overview; 2 pgs.; Jan. 12, 2012; retrieved from the internet: http//www.youtube.com/watch?v=DF_hx6iDIAM (this web address was available to applicant(s) at least as of Jan. 12, 2012).

Ubiquiti Networks; AirGrid M Datasheet; © 2011-2013; pp. 1-10; Jun. 21, 2013; retrieved from the internet (http://dl.ubnt.com/datasheets/airgridm/agmhp_datasheet_web.pdf).

Ubiquiti Networks; Nanobridge M Quick Start Guide; 20 pgs.; Mar. 27, 2012; retrieved from the internet (http://dl.ubnt.com/guides/nanobridge/nanobridge_M_QSG.pdf).

Zhang et al.; Prediction-based link-layer dynamic fragmentation and aggregation for wireless mesh networks; 2008 ISECS int. Colloquium on Computing, Communication, Control, and Management; vol. 2; pp. 582-586; Aug. 3-4, 2008.

\* cited by examiner

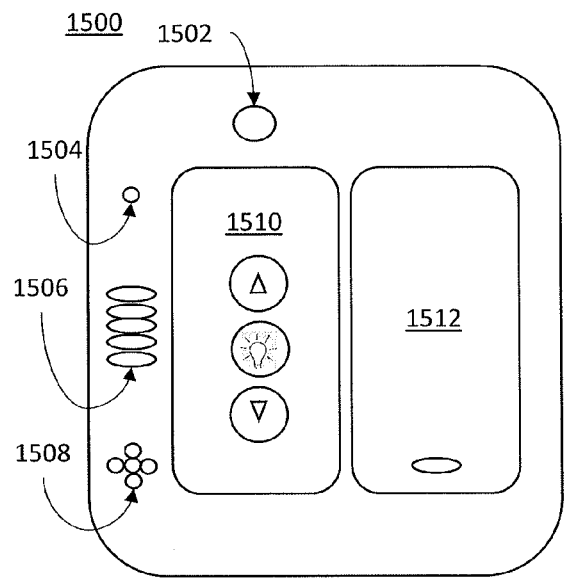
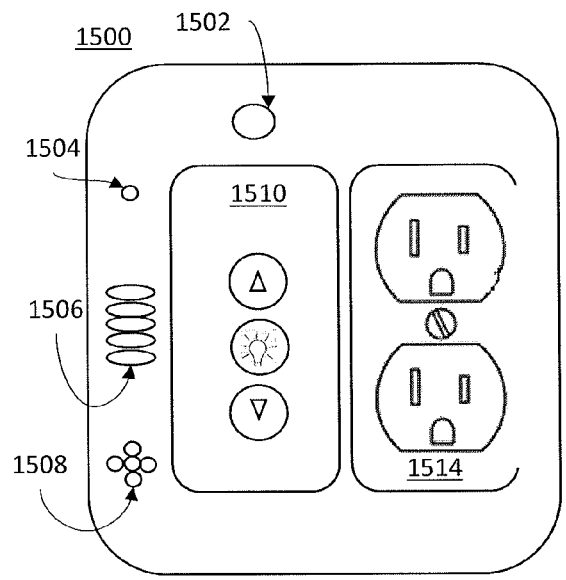
FIG. 15D          FIG. 15E
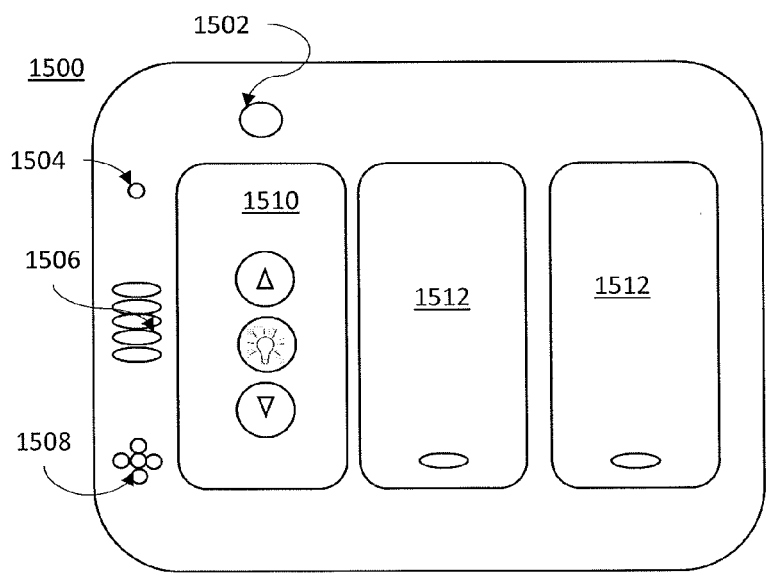
FIG. 15F

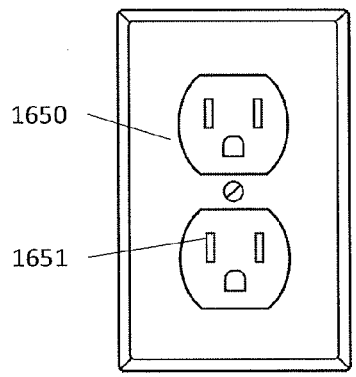
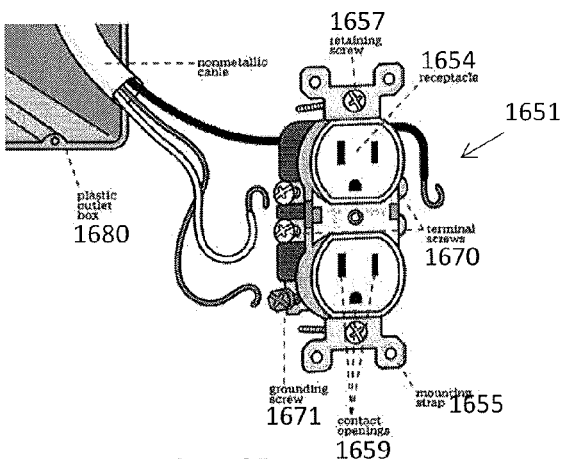
FIG. 16A        FIG. 16B
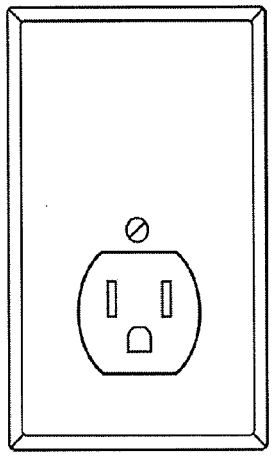
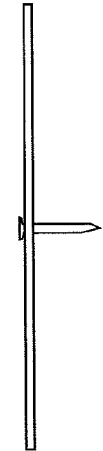
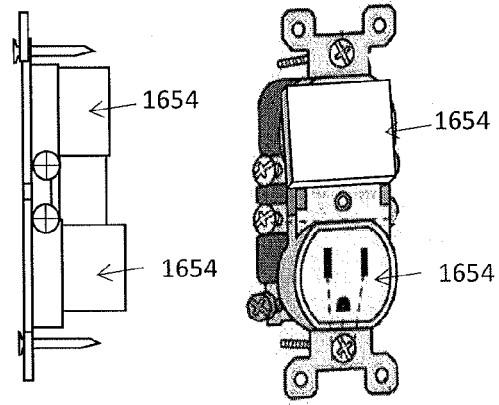
FIG. 16C    FIG. 16D    FIG. 16E    FIG. 16F
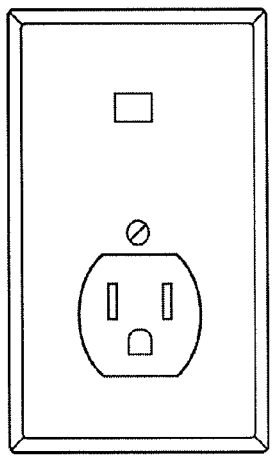
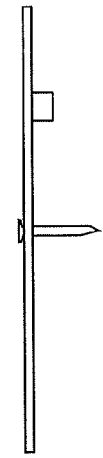
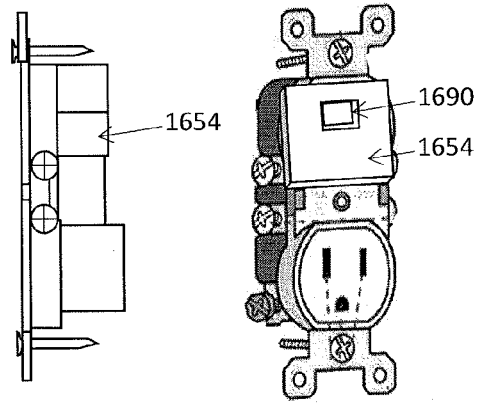
FIG. 16G    FIG. 16H    FIG. 16i    FIG. 16J

FIG. 16K1   FIG. 16K2   FIG. 16L   FIG. 16M

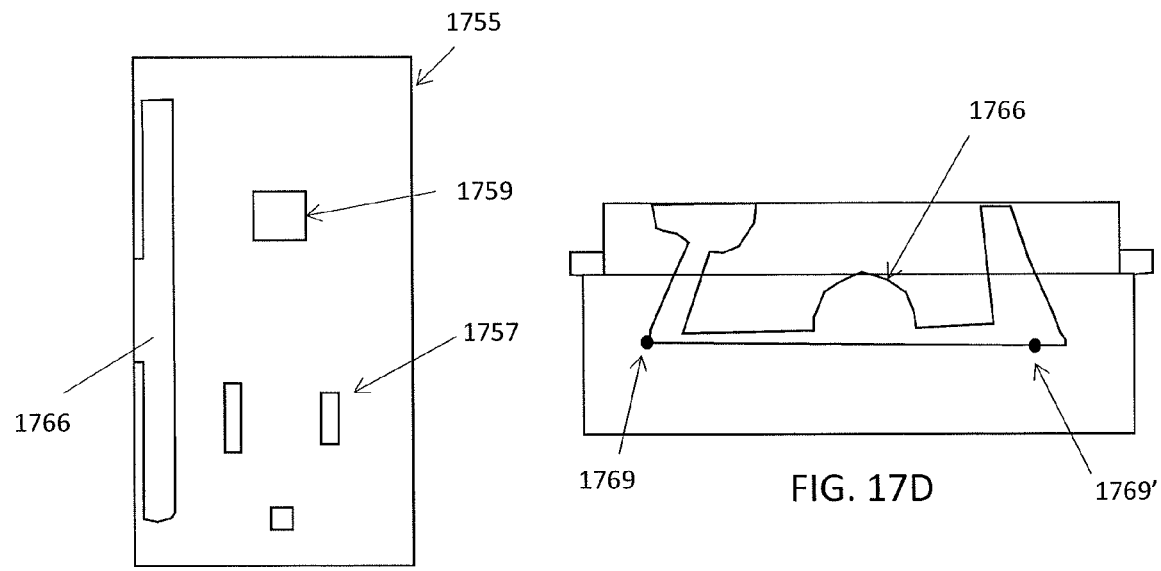
FIG. 17C
FIG. 17D
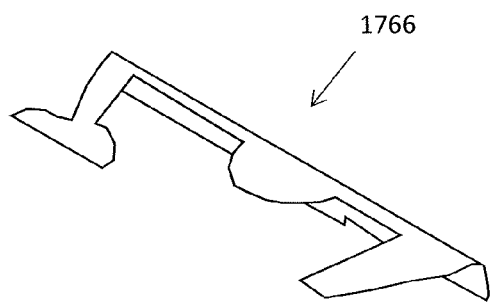
FIG. 17E

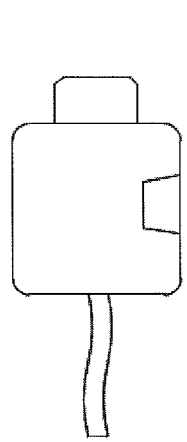
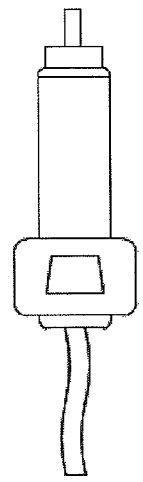
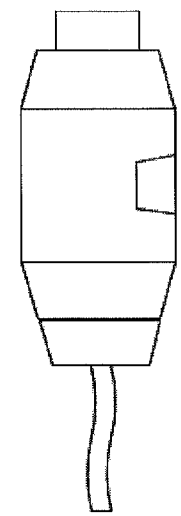
FIG. 23A     FIG. 23B     FIG. 23C
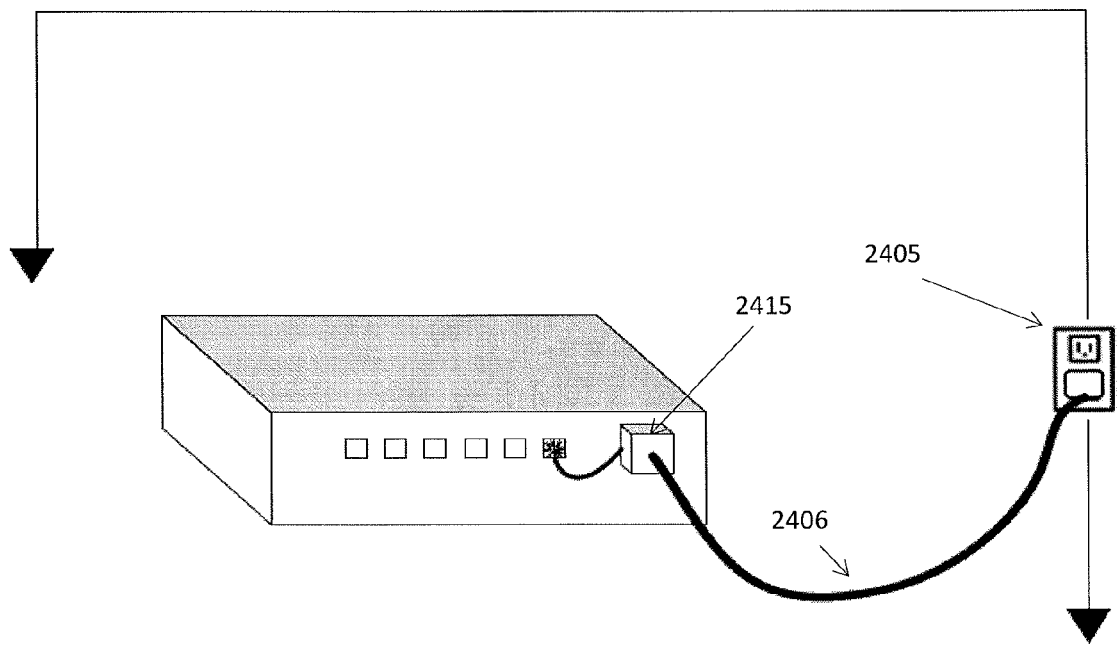
FIG. 24

POWER RECEPTACLE WIRELESS ACCESS POINT DEVICES FOR NETWORKED LIVING AND WORK SPACES

CROSS REFERENCE TO RELATED APPLICATIONS

This patent application claims priority to the following provisional patent applications: U.S. Provisional Patent Application No. 61/949,918, filed Mar. 7, 2014, and titled "DIGITAL THERMOSTAT, POWER OUTLET, AND LIGHT DIMMER;" U.S. Provisional Patent Application No. 61/954,244, filed Mar. 17, 2014, and titled "MANAGING AN ARRAY OF ANTENNAE OF AN ACCESS POINT;" and U.S. Provisional Patent Application No. 62/031,106, filed Jul. 30, 2014, and titled "DEVICES AND METHODS FOR NETWORKED LIVING AND WORK SPACES." Each of these patent applications is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This disclosure is generally related to networking and/or automation of habitable structure. Described herein are outlets/switches with sensor arrays (e.g., camera, speaker, etc.), including 'smart' outlets and switches. Also described herein are outlets and switches, and adapters for standard outlets and switches, that a may be fed by power line communication and may act as wireless access points. Any of the switches and outlets described herein may be used with a local hub to allow 'smart' monitoring and control of the habitable structure (e.g., a home automation system), including network-controllable digital thermostats, power outlets, and light dimmers.

BACKGROUND

Home automation, or smart homes, has enhanced the quality of life of their users. A home automation system may enable centralized control of lighting, HVAC (heating, ventilation, and air conditioning), appliances, and other systems, thus providing improved convenience, comfort, energy efficiency, and security. Some automation systems provide a way to automate the control of a device based on timed or environmental factors, such as in an HVAC unit or a sprinkler system. However, these typical automation systems provide automated control for an individual type of appliance, and the different automation systems do not interface with one another to provide a complete home automation solution.

In contrast, in a smart home, electrical devices/appliances in the house are integrated together to provide convenience and a better living experience for its users. Moreover, the ubiquitousness of the Internet connection has also made it possible for a user to monitor and/or control his home remotely. For example, a true smart home may allow a user, while away from the home, to monitor activities in his home; and remotely turn on/off various home appliances, arm security measures, or track air quality indicators. Monitoring and control of various aspects of the habitable space, weather home, office or other types of spaces, has long been the goal of smart home systems. Unfortunately, this goal has proven difficult to achieve in practice. Currently available and proposed smart systems have not been able to keep up with an increasing number of components (e.g., sensors, controls, and appliances) that could be monitored and controlled. Further, even limited systems have proven to be expensive and difficult to operate. Most significantly, such systems often require a great deal of cost and effort to install, requiring wiring, including pulling cable and modifications to building infrastructures which make them difficult, if not impossible to use.

For example, typical home automation technologies are often implemented using specially designed control and monitor devices that that can be under the control of a third-party service. In the example of the home surveillance system, the surveillance system controller is connected to various specially designed sensors and/or cameras provided by the service provider. When the home owner contracts the service provider to install the service, the service provider may sell or lease each controller and sensor to the home owner at a premium. To make matters worse, the home owner may also need to pay a monthly subscription fee to the service provider to monitor and maintain the surveillance system. Hence, installing and using these third-party systems can be a large expense to users that prefer to install, configure, and monitor their own home automation system.

In general, it would be beneficial to provide apparatuses (e.g., systems and devices) that are capable of forming a network for use in controlling and/or monitoring a habitable space (e.g., home, apartment, office, factory, etc.).

SUMMARY OF THE DISCLOSURE

Described herein are devices, including switches, outlets and adapters for switches and outlets, that may be used to form a network of components as part of a smart (or automated) network. Any of the components described herein may be used separately or in any combination. In particular, any of the apparatuses described herein may be used as part of a smart network for a habitable space/structure.

For example, described herein are networks of various sensors and controllers (nodes) that may form a 'smart' wirelessly connected habitable space (e.g., home, office, work, etc.) network. Specific examples of smart networks are provided herein, and may include a digital hub that receives information from each of plurality of nodes, processes the information from the nodes, and applies one or more rules based on sensed data, and in particular combinations of sensed data. The digital hub may connect to an external server (e.g., a cloud computing), or be part of a cloud computing service. One or more access devices, such as smartphones, tablets, computers, etc. may connect to the smart network, including the hub. Thus, described herein are the devices, including a digital hub and a variety of different nodes that can communicate with the hub, as well as methods of operating them and methods of securing connecting them. In addition, any of the node devices described herein may be operated independently (e.g., as stand-alone devices) without requiring a digital hub. Any of the nodes described herein may also be operated as a local network without a digital hub (e.g., as a MESH network).

Also described herein are wireless access points that integrate directly with electrical outlets or wall switches and provide wireless connectivity to devices within a space via power line communication to a local area network, and may be referred to as power receptacle wireless access point (AP) devices or systems. These devices and systems may allow establishing multiple Wi-Fi access points (APs) thorough out an existing structure without requiring any additional cabling (e.g., Ethernet cabling). For example, a "standard" outlet or light switch may be converted into an AP, wirelessly transmitting and received Wi-Fi signals and converting these signals for transmission via power line communication on the power line to a virtual switch that is also connected to the local power line. These converted outlets/light switches may also include one or more dedicated Ethernet ports or outlets, including PoE ports. Any of the power receptacle wireless access point (AP) devices and system described herein may also be integrated or included with the smart home networks described herein.

In general, the smart home networks are formed of a plurality of sensing and audio-visual nodes distributed throughout a habitable structure. Although the networks may be referred to as smart "home" networks or automated home networks, they may be applied in any habitable structure, including houses, apartments, commercial spaces, offices, factories, or the like. The nodes described herein are configured to wirelessly connect and may be adapted to interface with entertainment (e.g., music, video, etc.) libraries. In general, any of the smart networks described herein may include a digital hub receiving and processing information from each of the nodes.

Although smart homes (automated homes) have been described before, such systems are typically relatively one-dimensional; they include controls, timers and in some cases sensors (e.g., motion detectors, etc.) that can be programmed to act automatically, for example, to turn on or off an appliance at a certain schedule. What is missing is the higher dimensional functionality that may be possible when receiving information in a number of different data streams (e.g., different sensing modalities) for different locations within a structure. The digital hubs described herein may be operated with one or nodes (including the nodes described herein) to integrate information from a plurality of different data streams and make higher-level decisions based on these data streams.

For example, described herein are digital hub devices for communicating with and processing data from a plurality of sensing and audio-visual nodes distributed throughout a habitable structure, the device comprising: a base housing; a wireless module within the housing; a processor within the housing, wherein the processor is programmed to: receive data from the plurality of sensing and audiovisual nodes distributed throughout the habitable structure; parse the received data into a plurality of data streams, wherein each data stream corresponds to a pre-defined parameter and includes data related to that parameter, wherein data within each data stream is associated with a location relative to the habitable structure; monitor the plurality of data streams to determine if one or more parameter values from one or more (e.g., a plurality) of the data streams meets a triggering condition for applying a rule; and apply the rule when the triggering condition is met; and a memory coupled to the processor storing trigger conditions and rules.

A digital hub device for communicating with and processing data from a plurality of sensing and audio-visual nodes distributed at different locations throughout a habitable structure may include: a base housing; a wireless module within the housing; a display on an outer surface of the base housing; a processor within the housing, wherein the processor is programmed to: receive data from the plurality of sensing and audiovisual nodes distributed at different locations throughout the habitable structure; parse the received data into a plurality of data streams, wherein each data stream corresponds to a pre-defined parameter and wherein data within each data stream is associated with a location relative to the habitable structure, further wherein at least two of the parameters are selected from the group comprising: temperature, motion, humidity, sound, smoke concentration, CO2 concentration, NO2 concentration, CO concentration, electrical current, light intensity, volatile organic compound concentration, and combustible gas concentration; analyze the plurality of data streams to determine occupancy of each location; monitor the plurality of data streams to determine if one or more parameter values from one or more of the data streams meets a triggering condition for applying a rule; and apply the rule when the triggering condition is met; and a memory coupled to the processor, the memory storing trigger conditions and rules.

In some variations, a digital hub device for communicating with and processing data from a plurality of sensing and audio-visual nodes distributed at different locations throughout a habitable structure, the device comprising: a base housing; a wireless module within the housing; a display on an outer surface of the base housing; a processor within the housing, wherein the processor is programmed to: receive data from the plurality of sensing and audiovisual nodes distributed at different locations throughout the habitable structure; parse the received data into a plurality of data streams, including an air quality data stream, a temperature data stream, a visual data stream, and an audio data stream; monitor the air quality data stream to determine air quality at each of a plurality of locations relative to the habitable structure, and trigger an alert if the air quality falls outside of a predetermined air quality threshold range; monitor the temperature data stream to determine the temperature at each of a plurality of locations relative to the habitable structure, compare the temperature at each of the plurality of locations to a predetermined set temperature or set temperature range, and trigger a temperature adjustment based on the comparison; and determine occupancy of each region of the structure using the visual data stream, the audio data stream or the visual data stream and audio data stream for each of the plurality of different locations relative to the structure.

A digital hub device may generally include a connector on the base housing configured to connect to a data storage expansion unit. Thus, the hub may be modular, allowing expansion of the storage and/or processing by stacking (or otherwise adding) additional modules. The digital hub may also include a display (e.g., a screen, touchscreen, etc.) on an outer surface of the device.

In general, the hub processor may be programmed to parse the received data into the plurality of data streams, wherein each data stream corresponds to a pre-defined parameter. Parameters may be selected from the group comprising: temperature, motion, humidity, sound, smoke concentration, $CO_2$ concentration, $NO_2$ concentration, CO concentration, electrical current, light intensity, volatile organic compound concentration, and combustible gas concentration. Each parameter typically corresponds to the sensed information. Additional (second order) parameters may be derived by the node from the sensed data, including combinations of sensed data. An example of parameters may include motion (e.g., from video data), occupancy (e.g., from audio, motion/video data, etc.) or the like.

The processor may be programmed to communicate with an outside processor (e.g., smartphone, tablet, PC, etc.) such as a handheld device, to display information about the parameters based on the received data. The processor may be further programmed to apply the rule by transmitting control instructions using the wireless module to one or more elements within the habitable structure. The processor may be programmed to apply the rule by transmitting an alert, using the wireless module, to an emergency services provider (e.g., ambulance, police, fire, etc.). The processor may be further programmed to apply the rule by transmitting an alert, using the wireless module, to a registered user. The processor may be configured to receive input from a user for modifying or adding to the trigger conditions and rules.

Also described herein are methods of communicating with and processing data from a plurality of sensing and audiovisual nodes distributed at different locations throughout a habitable structure at a digital hub, the method comprising: receiving in a digital hub, data from the plurality of sensing and audiovisual nodes distributed throughout the habitable structure; parsing, in the digital hub, the received data into a plurality of data streams, wherein each data stream corresponds to a pre-defined parameter and includes data related to that parameter, wherein data within each data stream is associated with a location relative to the habitable structure; monitoring, in the digital hub, the plurality of data streams to determine if one or more parameter values from one or more of the data streams meets a triggering condition for applying a rule; and applying the rule when the triggering condition is met.

As mentioned above, a hub may be used with a node, to receive data and/or to execute a rule. For example, a node may include one or more sensors and/or one or more actuators. A node may generally be configured to be a wall-mounted, floor-mounted or ceiling-mounted device that includes one or more sensors and communicates wirelessly with the hub. In some variations the node may communicate with other nodes, and/or may be operated without a hub.

For example, a node may be a wall-mounted, interactive sensing and audio-visual node device for a networked living/working space. The node device may include: a faceplate having an outer surface; a camera module comprising a lens mounted in the faceplate; a microphone module mounted to faceplate; at least one sensor module mounted on the faceplate, the sensor module comprising one or more sensors selected from: a smoke detector, a CO detector, a combustible gas sensor, a temperature sensor, a humidity sensor, a $CO_2$ detector, dust sensor; a $NO_2$ sensor, a formaldehyde sensor, and a volatile organic compound (VOC) sensor; a wireless module configured to wirelessly transmit and receive data; a local controller configured to process information to and from the camera module, microphone module, and sensor module, wherein the local controller encodes and prioritizes information from each of the camera module, microphone module, and sensor module for transmission on the wireless module, and controls each of camera module, microphone module, and sensor module based on information received by the wireless transmitter and receiver; a wall power input configured to connect to a power line and to distribute power from the power line to each of the camera module, microphone module, sensor module, wireless module and local controller; wherein the faceplate is configured to be mounted to a wall so that the outer surface of the faceplate faces away from the wall.

Any of the nodes described herein may be wired directly to the electrical wiring of the structure (residence, office, etc.). For example, a wall-mounted, interactive sensing and audio-visual node device for a networked living/working space may include: a faceplate having an outer surface; a camera module comprising a lens mounted in the faceplate; a display module, comprising a touch screen, mounted on the faceplate; a microphone module mounted to faceplate; a speaker module having an output mounted on the faceplate; at least one sensor module mounted on the faceplate, the sensor module comprising one or more sensors selected from: a smoke detector, a CO detector, a combustible gas sensor, a temperature sensor, a humidity sensor, a $CO_2$ detector, dust sensor; a $NO_2$ sensor, a formaldehyde sensor, and a volatile organic compound (VOC) sensor; a wireless module configured to wirelessly transmit and receive data; a local controller configured to process information to and from the camera module, display module, speaker module, microphone module and sensor module, wherein the local controller encodes and prioritizes information from each of the camera module, display module, speaker module, microphone module and sensor module for transmission on the wireless transmitter and receiver, and controls each of camera module, display module, speaker module, microphone module and sensor module based on information received by the wireless transmitter and receiver; a wall power input configured to connect to a power line and to distribute power from the power line to each of the camera module, display module, speaker module, microphone module and sensor module, wireless module and local controller; wherein the faceplate is configured to be mounted to a wall so that the outer surface of the faceplate faces away from the wall.

The device may be incorporated as part of a light switch and/or power outlet. Any of these devices may include an opening through the faceplate for a light switch. The device of claim 1 or 2, wherein the local controller is configured to receive control information from a remote hub and to modify the operation of a one or more of the camera module, microphone module and sensor module based on information received from the remote hub.

The local controller may be configured to communicate with one or more other interactive sensing and audio-visual node devices in a distributed computing network, and to negotiate with the one or more other interactive sensing and audio-visual node devices to modify the operation of one or more of the camera module, microphone module and sensor module.

Any of these devices may include a power line communication (PLC) circuit. For example, the PLC circuit may be coupled to the faceplate, and configured to receive data from and transmit data on the power line connected to the wall power input, the PLC circuit connected to the local controller.

Any of these node devices may also include a USB port on the faceplate and/or an Ethernet connection on the faceplate. For example, the node may include a power over Ethernet (PoE) output plug on the faceplate.

In general, the lens of the camera module may be a very wide-angle lens. This may allow visualizing of greater than 120° of view relative to the faceplate. The controller may be configured to detect motion using the camera module. The sensor module may comprise a motion sensor. Alternatively a separate motion sensor may be included.

The faceplate may be configured to be mounted to an electrical box in a wall so that the faceplate covers the opening into the electrical box. For example, as mentioned above, the node may be used as a faceplate for an electrical wall outlet or switch (light switch) and may be adapted to include or allow passage of one or more outlets or switches. For example, the faceplate may be adapted to replace a traditional faceplate of a switch and/or outlet (for example, the node may include a switch, such as a light switch, configured to connect and disconnect power from the power line to a power output). In some variations the node includes an integrate outlet and/or switch and can replace the entire outlet and/or switch in the electrical box, rather than just covering it. However, in some variations the node components (modules) are compactly arranged on the faceplate so that they node can replace a traditional faceplate of a switch or outlet.

Any of the nodes described above may also be configured as wireless access points, which may connect (e.g., via an Ethernet connection and/or by a PLC circuit) to a router forming a local area network (LAN).

In addition, also described herein are switches/outlets that are wireless access points fed by power line communication. These device may not be nodes (e.g., do not include one or more sensors), though they may be used over or in place of a traditional wall outlet/switch. For example, a power receptacle wireless access point (AP) device may include: a wall power input configured to connect to a power line; a power line communication (PLC) circuit, the PLC circuit configured to receive data from and transmit data on a power line connected to the wall power input; at least one antenna; a wireless AP circuit connected to the PLC circuit, the wireless AP configured to receive data from the PLC circuit and to wirelessly transmit the data using the at least one antenna, and further configured to receive wireless data on the at least one antenna and to transmit the received data to the PLC circuit; and a mount configured to mount the device in or over an electrical box.

A power receptacle wireless access point (AP) device may include: a wall power input configured to connect to a power line; a power line communication (PLC) circuit, the PLC circuit configured to receive data from and transmit data on a power line connected to the wall power input; at least one antenna; a wireless AP circuit connected to the PLC circuit, the wireless AP configured to receive data from the PLC circuit and to wirelessly transmit the data using the at least one antenna, and further configured to receive wireless data on the at least one antenna and to transmit the received data to the PLC circuit; an electrical power outlet configured to receive electrical power from the power line and provide electrical power to a plug connected to the electrical power outlet; and a mount configured to mount the device in an electrical box.

A power receptacle wireless access point (AP) device, the device comprising: a wall power input configured to connect to a power line; a power line communication (PLC) circuit, the PLC circuit configured to receive data from and transmit data on a power line connected to the wall power input; at least one antenna; a wireless AP circuit connected to the PLC circuit and to the at least one antenna, the wireless AP configured to receive data from the PLC circuit and to wirelessly transmit the data using the at least one antenna, and further configured to receive wireless data from the at least one antenna and to transmit the received data to the PLC circuit for transmission on the power line; and a faceplate configured to fit over an electrical box, wherein the wireless AP circuit, antenna and power line communication circuit are connected to the faceplate.

Any of the PLC circuits and the wireless AP circuits for the power receptacle wireless access point devices described herein may receive power from the wall power input. In general, the PLC circuit may comprise a demodulator configured to demodulate a data signal from the power line and/or a modulator configured to modulate a data signal for transmission on the power line.

As mentioned, any of the devices described herein (including the power receptacle wireless access point devices, may be configured to include one or more electrical power outlet configured to receive electrical power from the power line, so that another device requiring power can be plugged into the power outlet. In some variations the power receptacle wireless access point (AP) device may be configured as a faceplate to go over a standard power outlet, and connect to the power line, so that an integrated power outlet is not necessary.

As also mentioned above, any of the devices described herein (including the power receptacle wireless access point devices) can be configured to include a light switch (including a manual/toggle style switch, a three-way switch (or other multi-way switch), a touch switch, a dimmer switch, or the like. Thus, the device may include a switch configured to connect power from the power line to a power output; the power outlet may be connected to a light and/or other fixture, including a power outlet.

In general, any of the devices (and particularly the power receptacle wireless access point devices) described herein may include a housing configured to house the PLC circuit, antenna and wireless AP circuit, and any other components. Any of the power receptacle wireless access point devices may also include a faceplate configured to fit over an electrical box in a wall/ceiling/floor, wherein the wireless AP circuit, antenna and power line communication circuit are connected to the faceplate.

The antenna in the power receptacle wireless access point device may be any appropriate antenna for establishing a wireless access point, and may include multiple antennas, such as a transmission antenna and a receiving antenna, or the like. For example, the at least one antenna may be a Wi-Fi antenna. In general, the AP circuit may include any components necessary for establishing a Wi-Fi access point, including a wireless radio, transceiver, Wi-Fi controller, and the like. For example, the wireless AP circuit may include a Wi-Fi radio circuit.

Any of the devices described herein and particularly the power receptacle wireless access point devices, may include an Ethernet (PoE) output plug into which an Ethernet cable can be plugged. Thus, the outlets described herein may also provide a wired connection to the AP through such an Ethernet plug, and may provide PoE to a connected device.

In any variations described herein, the power receptacle wireless access point devices may be adapted to be placed into a standard-sized power box inserted into a wall, floor or ceiling. The power receptacle wireless access point device may be retrofitted into an existing power outlet or power switch and may be sized to fit a standard electrical box for a power outlet/power switch. In variations in which the power receptacle wireless access point device includes a faceplate for covering the power box, the device may include a mount (e.g., screws, etc.) for securing over a power box, including securing to an existing power outlet. For example, a mount may be a screw and/or an opening for a screw, to which the device may be coupled. In variations in which the faceplate comprises an opening for an electrical outlet (e.g. the power receptacle wireless access point device is applied over an existing outlet), the faceplate may be configured to screw into the outlet and/or box, or separate to the wall. The circuitry within the power receptacle wireless access point (AP) device in this example may be configured to fit around the existing outlet, including recessing into the power box and/or extending out of the wall away from the outlet.

In addition to variations in which the power receptacle wireless access point (AP) adapter device is configured to connect into a wall, floor or ceiling (e.g., in a standard power box), also described herein are power receptacle wireless access point devices in which the devices are configured as power strips that may plug into an existing outlet, or plug adapters/extenders (e.g., 3 prong to 2 prong plug adapters, etc.). For example, a power receptacle wireless access point (AP) device may include: a wall power input configured to connect to a power line comprising a plug configured to insert into a wall outlet; a power line communication (PLC) circuit, the PLC circuit configured to receive data from and transmit data on a power line connected to the wall power input; at least one antenna; a wireless AP circuit connected to the PLC circuit, the wireless AP configured to receive data from the PLC circuit and to wirelessly transmit the data using the at least one antenna, and further configured to receive wireless data on the at least one antenna and to transmit the received data to the PLC circuit. The power receptacle wireless access point device may also include a plurality of electrical power outlets configured to receive electrical power from the power line and provide electrical power to a plug connected any of the electrical power outlets.

Also described herein are specific examples of networks of various sensors and controllers (nodes) that may form a 'smart' wirelessly connected habitable space, including or configured as thermostats or temperature controllers.

For example, described herein are networked digital thermostats that monitor one or more network-accessible sensors to control a heating and air-conditioning (HVAC) system. During operation, the digital thermostat can select a zone to monitor, and obtains temperature measurements from one or more network-accessible temperature sensors associated with the selected zone. The digital thermostat then adjusts the zone's temperature based on the obtained temperature measurements.

In some example, the devices/systems described herein include node that is configured to sense and/or control power at an electrical outlet. For example, a system may include a networked power outlet device that can monitor an energy output from an outlet port. During operation, the power outlet device can select an outlet port to monitor, and measures energy output from the port. The system also analyzes triggering conditions for one or more rules to identify a rule triggered by the outlet port's energy output, and performs the identified rule's action description.

As mentioned above, in some variations, the system includes a node that monitors/controls a light switch or other power switch. For example, any of the variations described herein may include a networked light-dimmer device that comprises a touch-screen interface that accepts touch-screen gestures as input for controlling one or more light fixtures. During operation, the light-dimmer device can determine a gesture performed by a user on the touch-screen interface, and determines a target output lighting level based on the gesture. The light-dimmer device then configures an energy level for a target light fixture based on the target output lighting level.

Also described herein are integrated power line communication (PLC) adapter/data power cable devices. Any of these devices may generally include PLC adapters that also provide cabling and connection directly to a specific networking device. The PLC adapter may be integral with the cable, and may be positioned near the proximal end of the cable/cord, opposite the end that plugs into an electrical outlet. For example, a PLC adapter/data power cable device may include: a wall power plug configured to connect to wall power outlet; an elongate power cord coupled to the wall power plug at a distal end of the elongate power cord; an adapter housing coupled to the elongate power cord near a proximal end of the elongate power cord; a PLC circuit within the adapter housing, the PLC circuit configured to receive data from and transmit data on a power line connected to the wall power plug; a power connector at the proximal end of the device, the power connector configured to connect to a power inlet of a networking device; and an Ethernet connector coupled to the adapter and connected to the PLC circuit to transmit and receive the data.

In some variations, the integrated power line communication (PLC) adapter/data power cable device may include: an elongate length of power cord; a plug at the distal end of the elongate length of power cord; an adapter housing integrated into the cabling within 24 inches of the proximal end of the elongate length of power cord; a PCL circuit within the adapter housing comprising a modem configured to transmit and receive a data signal on a power signal; an Ethernet connector coupled to the adapter housing and connected to the PLC circuit to transmit and received the data signal; and a power connector extending from the proximal end of the device and configured to mate with a power port on a networking device.

For example, an adapter housing may be integrally mounted to the elongate power cord. The adapter housing may be within 24 inches (e.g., within 20 inches, 18 inches, 16 inches, 14 inches, 12 inches, 11 inches, 10 inches, 9 inches, 8 inches, 7 inches, 6 inches, 5 inches, 4 inches, 3 inches, 2 inches, 1 inch, etc.) of the proximal end of the elongate power cord.

The Ethernet connector may include an Ethernet port on the adapter housing. For example, the Ethernet connector may comprise an Ethernet cable extending from the adapter housing. The adapter housing may further include an AC adapter circuit configured to convert AC wall power received from the plug at the distal end of the elongate power cord into DC power at the power connector extending from the proximal end of the device.

Also described herein are methods to connect a networking device to a power line communication (PLC) network, e.g., using any of the devices described herein. For example a method of connecting a networking device to a power line communication (PLC) network may include: connecting a plug at a distal end of an integrated PLC adapter/data power cable device to a power outlet coupled to a line power; connecting a power connector extending from a proximal end of the integrated PLC adapter/data power cable device to a power port on a networking device; connecting an Ethernet cable in communication with a PLC circuit within an adapter housing near a proximal end of the integrated PLC adapter/data power cable device to an Ethernet port on the networking device; and transmitting signals encoded on the line power and decoded by the PLC circuit to the networking device through the Ethernet cable.

Connecting the plug may include connecting the plug to a wall outlet. Connecting the power connector may comprise plugging the proximal end of the integrated PLC adapter/data power cable device into the power port of the networking device.

Power may be supplied to the networking device using the same cord (integrated PLC adapter/data power cable), which may convert, in the adapter housing, the line power from AC to DC for supplying to the networking device through the power port of the networking device.

Connecting the Ethernet cable may include connecting a first end of the Ethernet cable to an Ethernet port on the adapter housing and connecting a second end of the Ethernet cable to an Ethernet port on the networking device.

Data may be transmitted in both directions (e.g., to/from the networking device) using this method. For example, a method may include receiving signals from the networking device through the Ethernet cable, encoding the received signals and transmitting the signals on the line power.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1B is a flowchart illustrating a method for FIG. 1A.

FIGS. 2E and 2F also illustrate a UI display for adjusting a thermostat temperature setting.

FIG. 4A is a flow chart illustrating a method for detecting temperature-sensing devices of a computer network. FIG. 4B is a flow chart illustrating a method for detecting motion-sensing devices of a computer network. FIG. 4C is a flow chart illustrating a method for controlling a heating, ventilation, and air conditioning (HVAC) system.

FIG. 5A illustrates a power outlet node. FIG. 5B illustrates a side view of an exemplary faceplate. FIG. 5C illustrates an exemplary power outlet node. FIG. 5D illustrates a side view of an exemplary faceplate. FIG. 5E illustrates a variation of a power outlet node. FIG. 5F illustrates a side view of a faceplate. FIG. 5G illustrates a variation of a power outlet node.

FIGS. 15D-15F illustrate variations of systems using an integrated sensor panel node.

FIGS. 16A-16B illustrate a standard (prior art) power outlet and faceplate.

FIGS. 16C-16F illustrate one variation of a power receptacle wireless access point (AP) device (node).

FIGS. 16G-16J illustrate another variation of a power receptacle wireless access point (AP) device (node).

FIGS. 16K1 and 16L illustrate another variation of a power receptacle wireless access point (AP) device (node).

FIG. 16K2 illustrates the variation of FIGS. 16K1 and 16L installed on an existing electrical outlet.

FIG. 16M is another variation of a power receptacle wireless access point (AP) device (node).

FIGS. 17C-17E illustrate one variation of an antenna emitter (feed) portion of an antenna for RF transmission that may be connected to a wireless AP circuit (which may also connect to the PLC circuit). The antenna is configured to wirelessly transmit RF signals to/from the wireless AP circuit for transmission to/from the PLC circuit.

FIGS. 23A-23C illustrate views of an adapter region of integrated PLC adapter/data power cables as described herein.

FIG. 24 shows one variation of an integrated PLC adapter/data power cable connected to a power line and the front of a network-enabled device, similar to FIG. 20B.

DETAILED DESCRIPTION

Figure 1A:
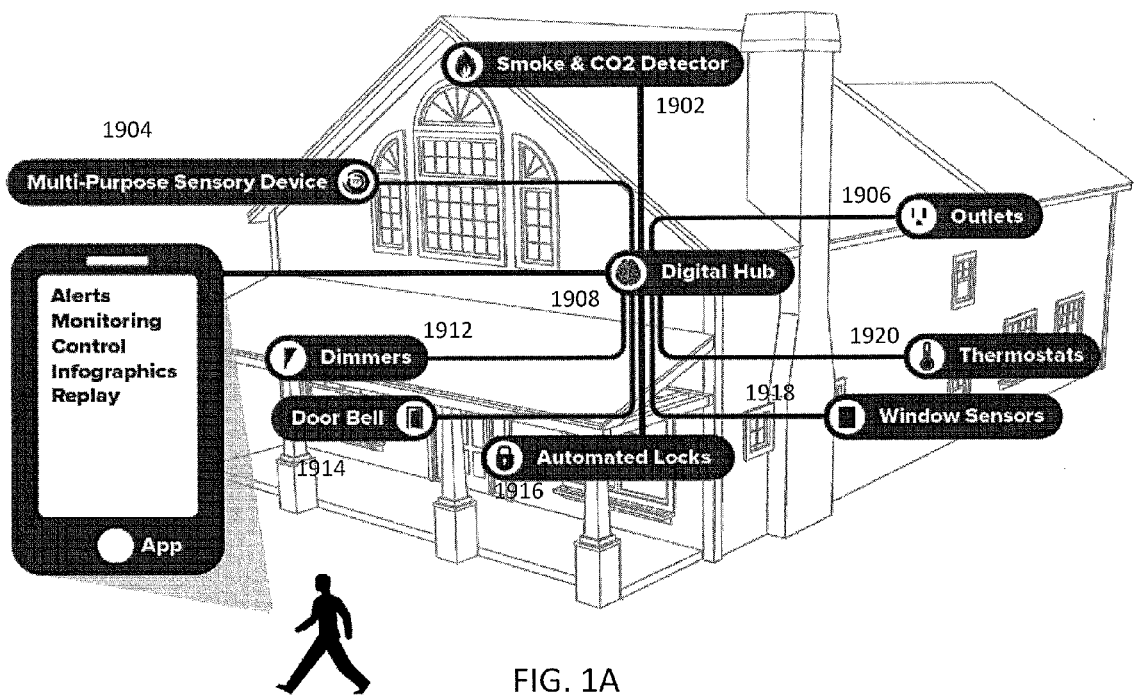
FIG. 1A illustrates one example of a networked "smart" home including a plurality of nodes reporting to a digital hub, as described herein.

In general, described herein are devices and systems for monitoring, controlling, and networking a habitable structure such as a home/residence, office, laboratory, hotel, factory, commercial building, or the like. The system and devices described herein include a variety of "nodes" which may act as either autonomous, networked, or slaved sensors and/or actuators for monitoring one (or preferably more) parameter and wirelessly communicating the parameter(s) to other nodes and/or a digital hub, and/or wirelessly receiving control instruction to control one or more attached devices. A node may generally be mounted in or to a wall, ceiling or floor, for directly connecting to a power line in the structure. The node may be retrofitted into a power box and/or power outlet, light switch, phone jack, or the like. In some variations the node may be configured to include or fit around/over a power outlet and/or switch (e.g., light switch), or to replace an existing outlet and/or switch. In some variations, the node may include a faceplate for a power box (e.g., light switch or outlet face place) and may be attached or mounted to the power box. Some of the nodes described herein are surface-mounting but do not install (or require installation) into a power box or connect directly to a power line. For example, any of these nodes may be configured to be battery powered and/or separately wired.

In general, the nodes described herein may include one or (more preferably) a plurality of sensors for detecting and/or monitoring one or more parameters. Parameters may include: temperature, motion, humidity, sound, smoke concentration, $CO_2$ concentration, $NO_2$ concentration, CO concentration, electrical current (and/or electrical resistivity, voltage, etc.), light intensity, volatile organic compound concentration, and combustible gas concentration. Any of the nodes described herein may generally include video camera (which may be included instead or in addition to a motion sensor), and/or audio detector (microphone). In addition to these sensor inputs, any of the nodes described herein may also or alternatively include one or more outputs, including a speaker (or any other audio output), video (including touch screens or the like), LEDs, etc.

Any of the nodes described herein may also include one or more user inputs, such as switches, toggles, sliders, buttons, levers, or the like. The user output and user input may be combined, e.g., a touchscreen.

In general, the nodes described herein may include one or more wireless communication modules, for wirelessly sending and receiving information, including the sensor information/data and/or control information. For example, any of the devices described herein may be configured for wirelessly connecting via Wi-Fi (or Bluetooth, etc.). The wireless module may include one or more antennas and associated control circuitry for wirelessly communicating. In some variations the nodes described herein include a power line communication (PLC) circuit configured to receive data from and transmit data on a power line connected to the wall power input. A PLC circuit may be included in addition to or instead of the wireless (e.g., Wi-Fi) communication module.

Any of the nodes described herein may be referred to as wall-mounted, interactive sensing and audio-visual nodes (or node devices). Such nodes may generally include an outer surface that may be exposed to a room of a habitable space. The outer surface may be the outer surface of a faceplate, e.g., configured to cover a power box, or an outer surface of a housing that may be mounted to a wall (as used herein "wall" may refer to any surface of a room, including floor and ceiling, unless the context specifies otherwise). For example, a node (e.g., wall-mounted, interactive sensing and audio-visual node), may include a faceplate having an outer surface, a camera module comprising a lens mounted in the faceplate, a microphone module mounted to faceplate; a speaker module mounted to the faceplate; at least one sensor module mounted on the faceplate, the sensor module comprising one or more sensors selected from: a smoke detector, a CO detector, a combustible gas sensor, a temperature sensor, a humidity sensor, a $CO_2$ detector, dust sensor; a $NO_2$ sensor, a formaldehyde sensor, and a volatile organic compound (VOC) sensor; a wireless module configured to wirelessly transmit and receive data; a local controller configured to process information to and from the camera module, microphone module, and sensor module, wherein the local controller encodes and prioritizes information from each of the camera module, microphone module, and sensor module for transmission on the wireless module, and controls each of camera module, microphone module, and sensor module based on information received by the wireless transmitter and receiver; and a wall power input configured to connect to a power line and to distribute power from the power line to each of the camera module, microphone module, sensor module, wireless module and local controller. As mentioned, the faceplate may be configured to be mounted to a wall so that the outer surface of the faceplate faces away from the wall.

In general, the nodes described herein may be used as part of a smart home, and may communicate with a digital hub that can receive and analyze the multiple types of data streams and provide control information among the nodes and/or to a user or third party based on the data streams. The different types of data streams may include lighting (light intensity), video (wide-angle video monitoring, motion sensing, etc.), sound (audio, ultrasound, etc.), air quality (smoke, CO2, NO2, CO, etc.) or the like. In general, the hub, which may be referred to as a digital hub, receives data streams from each of the nodes and may process the data streams to determine one or more parameters. In particular, the devices described herein may combine information from a plurality of data streams to derive information. The derived information and/or the data stream information from the sensors may be monitored and may trigger one or more actions. In general, the nodes typically transmit both the information from the individual sensor(s) as well as identifying (e.g., location) information. The hub may include a map of the identifying information indicating the spatial relationship between various nodes (zones, regions, rooms, etc.).

The digital hub may generally reside within the structure being monitored, and may communicate with one or more outside devices (e.g., cloud computing). In some variations the hub is a virtual hub that resides off-site (e.g., in a cloud computing environment). In general, any of the nodes described herein may be securely networked with the hub (e.g., registered); the network may be closed, encrypted, secured, or the like.

In general, the digital hub may be accessed by a user (e.g., homeowner, etc.) either locally (at the hub) where a physical digital hub is present, or remotely (e.g., via a laptop, phone, pad, desktop computer, etc.). The digital hub may be programmable or controllable, and may include software/firmware/hardware (or any combination thereof) that allows a user to access and control the digital hub, including providing rules or instructions to the hub. In some variations the hub may be pre-set with a predefined set of rules so that a user does not need to program the device but may have the option to customize the device. For example, in some variations the hub may be adapted to operate as (among other things) a smart thermostat that is configured to maintain the temperature within a habitable structure within desired ranges. The temperature ranges and energy efficiency settings may be preset to optimize comfort and energy efficiency, and may include deriving habitation in certain room regions based on one or more additional data streams (in addition to temperature and/or humidity data streams), such as light sensors, noise and/or motion (video) sensors, etc.

For example, a digital hub device for communicating with and processing data from a plurality of sensing and audiovisual nodes distributed throughout a habitable structure may generally include a processor that is programmed to: receive data from the plurality of sensing and audiovisual nodes distributed throughout the habitable structure; parse the received data into a plurality of data streams, wherein each data stream corresponds to a pre-defined parameter and includes data related to that parameter, wherein data within each data stream is associated with a location relative to the habitable structure; monitor the plurality of data streams to determine if one or more parameter values from one or more of the data streams meets a triggering condition for applying a rule; and apply the rule when the triggering condition is met.

FIG. 1A and illustrates one example of a smart home, that is networked to allow monitoring, control and automation. In FIG. 1A, the system is shown used in a home setting. As mentioned, it may be used in any habitable structure (or multiple structures). In this example, a digital hub 1908 provides central control to deployed devices. Deployed devices can access the nodes, including environmental controls, e.g. lighting 1912, heating, air conditioning, thermostats 1920, hot water heaters, and gas detectors 1902. The deployed devices may monitor usage of the environmental controls, e.g. energy consumption or time. Deployed node devices may include multi-sensory node devices 1904, power outlets 1906, window sensors 1918, automated locks 1916, doorbells 1914, and the like. The user may access the digital hub 1908, (which may include a user display) either locally or remotely, through smartphones, tablets, and computers.

In another variation, each room may include a node having a light sensor or integrated sensor panel connected into the established network. The digital hub may receive the light sensor signal (and any additional sensor data) as a data stream that includes information identifying the source (node) of the data, and may adjust the environmental parameters based on the light sensor signal. Rather than lights being turned on at a set time, as in typical security scenarios, the lights are turned if there is insufficient lighting—a more realistic homeowner in residence scenario. The hub may also include processing to determine occupancy of the room, e.g., based on extrapolating from the data stream (e.g., motion sensing, infrared camera, sound, etc.) and may adjust lighting based on the occupancy as well.

Any of the nodes incorporated as part of the network forming the smart home may include one or more actuator for controlling a device connected to or through the node. For example, when the nodes is a power outlet/light switch, the power supplied by the outlet/switch may be regulated by commands provided from the node. This may allow control of remote device. Alternatively a device (e.g., stereo, computer, television, etc.) may be directly connected as a node and my wirelessly connect to the hub.

For example, devices requiring adult supervision are inserted into the access points. These devices include but are not limited to computers, stereos, televisions, etc. Remotely from a smartphone, a parent can limit access to media devices or adjust the sound level. Alternatively, the digital hub may be programmed to initialize the household devices in a desired order in the event of a power disruption or to keep off line devices sensitive to electrical spikes until the user has returned home.

In another variation, node devices may be registered to the cloud and can be accessed, monitor, and/or controlled through the cloud. As shown in FIG. 1B, in step 1902, the device requests control of the network through the cloud. In step 1904, the device receives permission. In step 1906, it is determined if any application or application updates are required. If yes, in step 1908, the device acquires any needed application updates. In step 1910, status updates of devices on the network are requested and received. In step 1912, commands based on the status updates are issued. The commands may be user initiated.

Figure 1C:
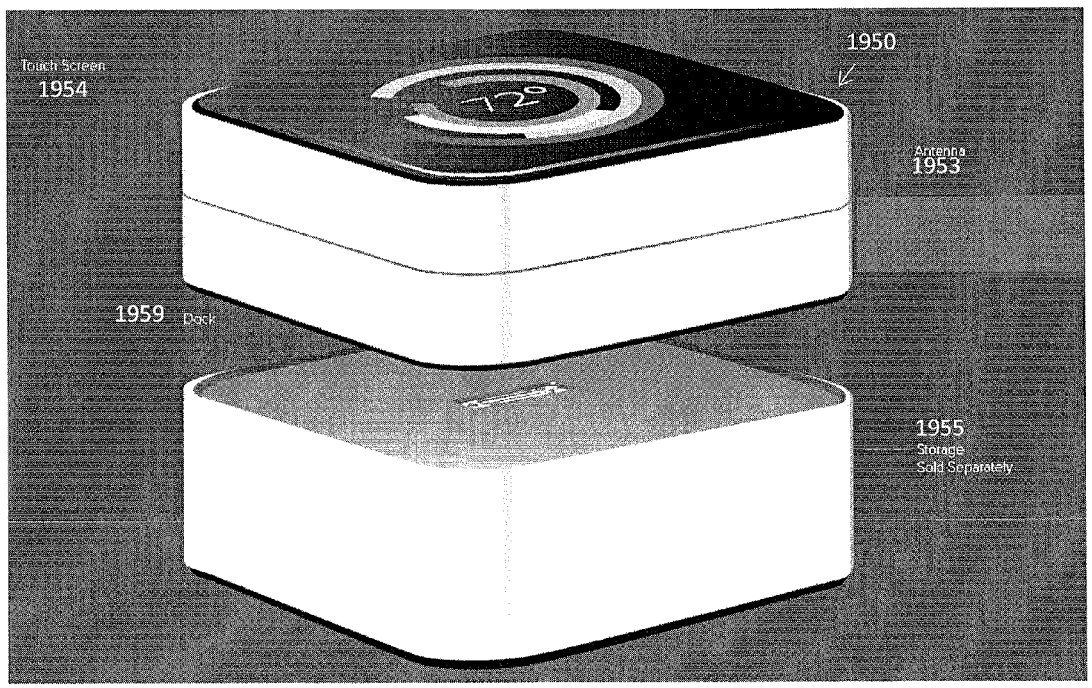
FIG. 1C illustrates one variation of a digital hub configured to receive data streams from multiple sensor nodes throughout a structure.
Figure 1B:
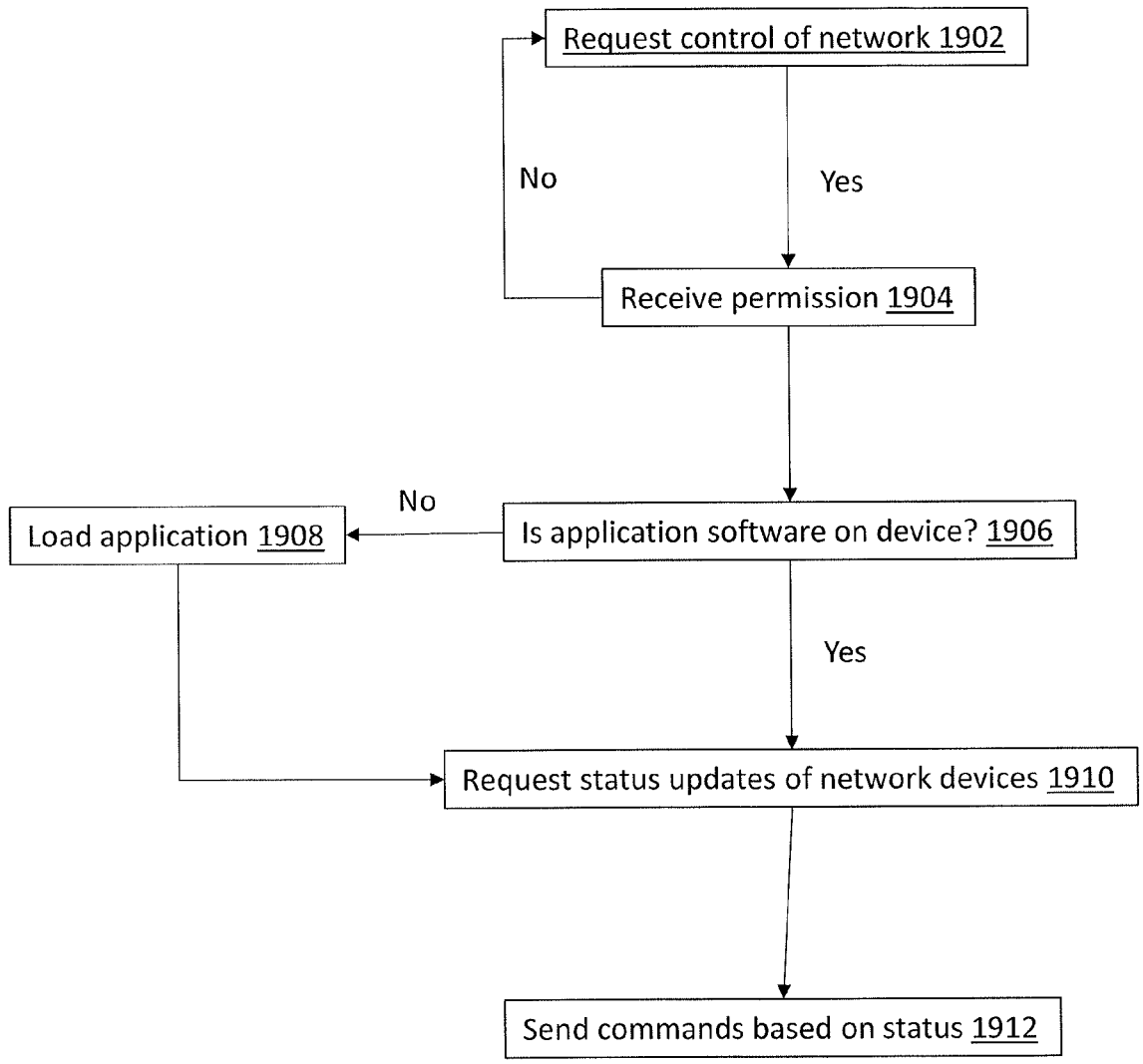
FIG. 1B is a variation of the system used in a home setting.

FIG. 1C shows one example of a digital hub that may be used. In this example, the digital hub includes a processor within the housing 1950 enclosing the device. An outer surface (in this example, the upper surface) of the hub includes a screen (touchscreen 1954) that can be used to display and/or control the operation of the hub locally. Internally, the hub also typically includes a Wi-Fi transmitter/receiver (including antenna 1953) for sending/receiving information to the various nodes connected to the device. The hub shown in FIG. 1C is modular, and may include a docking region 1959 on the bottom for connecting to one or more additional modules, including data storage modules 1955. The data storage modules in this example may stack with the rest of the hub, and interface therewith.

In general, the hub may include a memory (which may be expandable by the addition of the data storage module) for storing data (e.g., historical data) from the nodes or for including the command structures (e.g., rules) applied when monitoring the data streams received from the nodes. The module may be self-contained, and may also be configured to communicate with one or more remote processors.

In another variation, the node devices may be configured in a distributed computing fashion such that there is not a single primary controller. The devices cooperate with each other to serve as a functional unit. Each new device added to the system may negotiate amongst the devices. The tasks are completed in a distributed computing approach.

Example

Digital Thermostat

In one example, the smart home systems described herein may be configured as a digital thermostat, or may include the functionality of a digital thermostat. For example, FIG. 2A illustrates an exemplary digital thermostat 100. In this example, the digital hub is configured to include functionality as a digital thermostat. Digital hub (thermostat) 100 can include a front face 102, a cover 104, and capacitive-touch display 106. Front face 102 can be manufactured of a plastic or glass material, to have a black semi-transparent surface with a glossy finish. Cover 104 can be manufactured of a metallic material (e.g., aluminum) with an argent color. A front-facing surface of cover 104 (e.g., a surface parallel to front face 102) can be manufactured to have a glossy finish, and a side-facing surface of cover 104 can be manufactured to have a textured finish.

In general, the digital hub 100 shown may be adapted to display on the local hub the thermostat information, as illustrate (e.g., local temperature, regional/zone temperatures, humidity, etc.). The digital hub typically communicates with a plurality of different nodes located throughout the habitable structure, including in different rooms. These nodes may typically include a sensor for sensing temperature, humidity, and the like as well as additional parameters (forming additional data streams that are linked to the placement location of the node).

Returning to FIG. 2A, the capacitive-touch display 106 can display information to a user, and can include a matrix of capacitive-touch sensors for receiving input from a user. The capacitive-touch sensor can detect an increase in capacitance on the surface of display 102 when a user touches the touch-sensitive sensor. Each capacitive-touch sensor may generate an analog voltage which corresponds to the amount of capacitance that was detected on the surface of display 106 over the sensor.

Digital hub (thermostat) 100 can detect a user input by analyzing information obtained from capacitive-touch display 106. The user input can include any gestures made by the user by touching and/or dragging a finger or stylus on capacitive-touch display 106. The gestures can include a "tap" gesture on a portion of capacitive-touch display 106 (e.g., a touch event to select a display item), and a "swipe" gesture that moves along a surface path of capacitive-touch display 106 (e.g., a drag event to scroll a display item).

A Digital hub 100 can also include a proximity sensor to detect when the user or the user's hand is within a close proximity of capacitive-touch display 106, and generates an analog signal based on the proximity of the detected object to the proximity sensor. For example, the proximity sensor can include an infrared proximity sensor, which emits an infrared signal from an infrared emitter, and generates the analog signal based on an amount of infrared light detected by an infrared detector (e.g., infrared light that reflected off the user's hand).

In some embodiments, digital hub 100 can include a standby mode while the user is not immediately in front of digital hub 100. For example, the user interface presented in the stand-by mode may be non-interactive, and displays environmental information and status information for the HVAC system. This user interface can be optimized to allow the user to view the displayed information from a distance. Then, when digital hub 100 detects a user's proximity to front face 102, digital hub 100 can transition into an interactive mode that presents interactive user-interface elements to the local user. The user-interface elements can allow the user to adjust the target temperature range, a fan setting, or any other configuration settings for the HVAC system. In some other embodiments, digital hub 100 can dim or turn off display 106 while in standby mode. Then, when digital hub 100 detects a user's proximity, digital hub 100 can turn on display 106 for the local user.

Figure 2B:
FIGS. 2A and 2B show one variation of a digital hub operating in a thermostat mode.
Figure 2A:
Figure 2C:
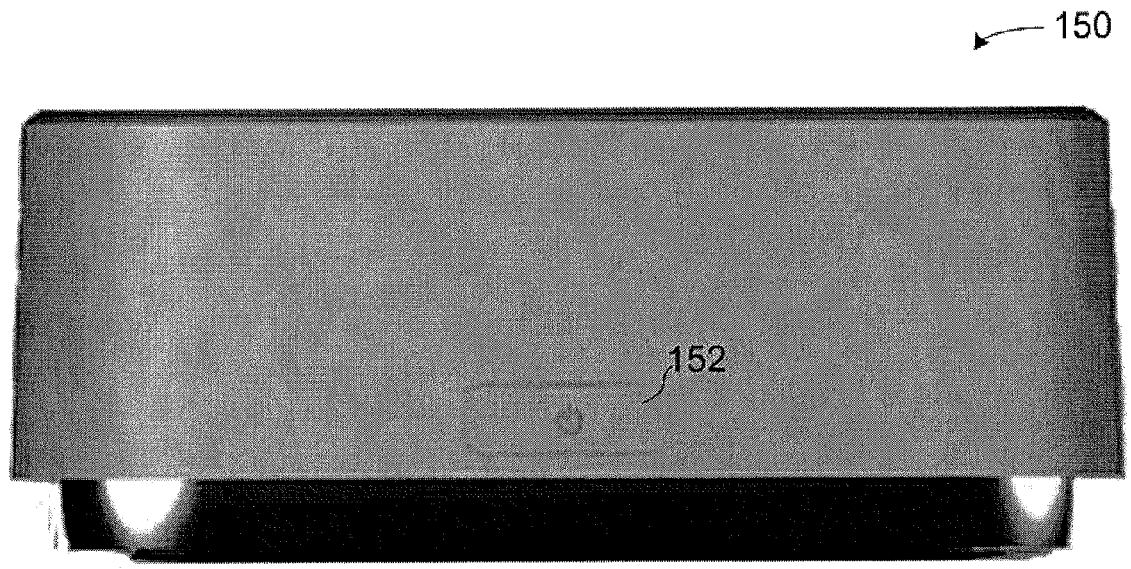
FIGS. 2C and 2D show top and bottom views, respectively, of the digital hub of FIGS. 2A and 2B.

FIG. 2C illustrates a top surface 150 of an exemplary digital hub in accordance with this example. Specifically, top surface 150 can be manufactured of a metallic material (e.g., aluminum) or a plastic material to have a textured metallic finish with an argent color. Top surface 150 can include a power button 152, manufactured of a plastic material to have an argent color. Reset button 152 can have a gray power symbol printed or engraved on a top surface.

A digital hub can include an on-screen power button. For example, display 106 of digital hub 100 (FIG. 2A) can display an interactive user-interface element that allows the user to toggle between an "off" state, an "auto" state, and a "manual" state. The "off" state turns off the digital hub, or places the digital hub on standby. When operating as a thermostat, the "manual" state can hold a zone's temperature at a current temperature setting. The "auto" state can run a schedule or program to adjust a zone's temperature according to the schedule or program. The program can, for example, change a zone's temperature based on the schedule, as well as other dynamic information. The dynamic information can include information from one or more node sensors, such as a motion sensor, a proximity sensor, a humidity sensor, a temperature sensor, and/or from other sensors. A user can create the program by specifying a set of rules that includes an action description, and includes conditions for executing the rule's action descriptions.

Figure 2D:
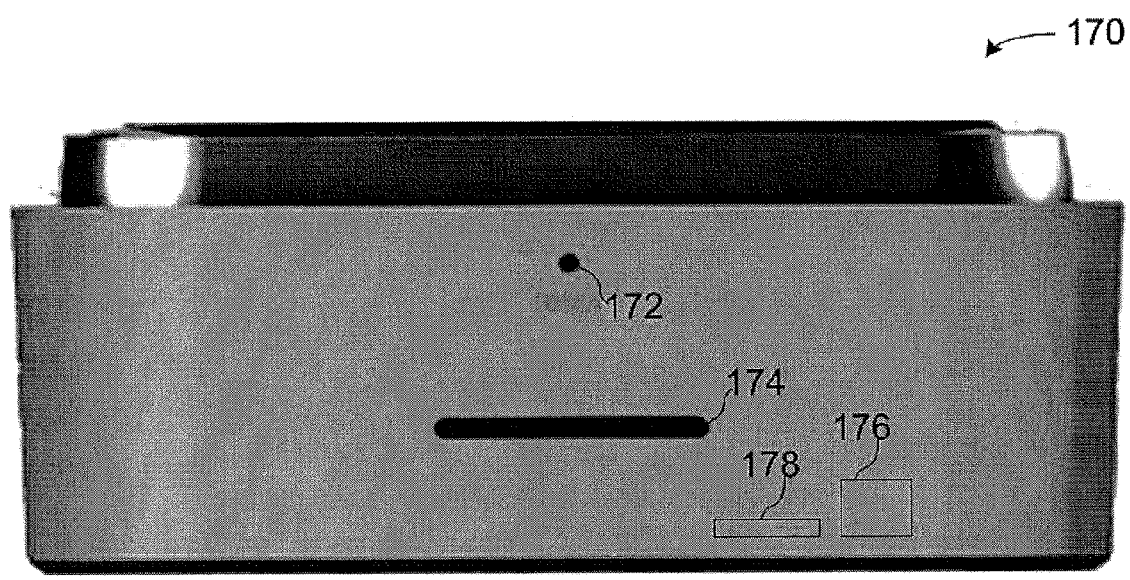

FIG. 2D illustrates a bottom surface 170 of an exemplary digital hub. Specifically, bottom surface 170 can be manufactured of a metallic material (e.g., aluminum) or a plastic material to have a textured metallic finish with an argent color. Bottom surface 170 can include a reset button 172 and a sensor 174. A user can press and hold reset button 172 for a predetermined time interval (e.g., 10 seconds) to cause the digital hub to reboot or to re-install a default firmware image. Sensor 174 can include, for example, a temperature sensor, a humidity sensor, a microphone, or any other sensor now known or later developed. Thus, any of the digital hubs described herein may also include an integrated node (having sensors, etc.).

In general, the digital hub and various nodes that communicate with the hub may be connected securely. This connection may be performed by using manual or in some examples, automatic or semi-automatic, authentication.

For example, in some embodiments, the digital hub (and/or nodes) can include an optical code 176 and a secret number 178 printed over a portion of the digital hub's body. For example, optical code 176 and secret number 178 can be printed over a portion of a bottom surface of the digital hub. The digital hub can use a built-in wireless device to host a closed Wi-Fi network, which the user can use to interface a personal computing device (e.g., a smartphone) to the digital hub. The user can gain access to the closed Wi-Fi network by entering secret number 176 as a secret key.

As another example, the digital hub can host an open Wi-Fi network, which the user can use to establish a network connection between his personal computing device and the digital hub. Alternatively, the digital hub can use any wireless technology to establish a peer-to-peer network connection with the personal computing device, such as near field communication (NFC) or Bluetooth Low Energy. The user can run an application on his personal computing device to send and/or receive data to/from the digital hub over the network connection. The user can scan optical code 176 using an image sensor on his personal computing device, and the device signs the data sent to the digital hub using information encoded in optical code 176 (e.g., secret number 178). The application can use optical code 176 to generate a one-way secure hash value that is used to sign data. Alternatively, the application can use optical code 176 during a challenge-response handshake protocol with the digital hub that establishes a secure connection with the digital hub. During this handshake protocol, the application and the digital hub can exchange digital signatures that are then used to sign any data transferred between the two devices.

In some embodiments, a plurality of unprovisioned node devices (e.g., power outlets, light dimmers, thermostats, etc., configured as nodes as described herein) can each host an unsecured Wi-Fi network with a common Service Set Identification (SSID). The user can use a provisioning application on the user's personal computing device to provision individual devices via the common SSID. Each time the application detects a Wi-Fi network at the common SSID, the application can provision the first device it connects to using this SSID. The application can provision the device automatically (e.g., using an optical code and secret key pair which the user has previously scanned), or can interact with the user to present a sequence of device-provisioning steps. After the digital hub becomes provisioned, the digital hub may bring down its Wi-Fi network, which can allow the application to connect with any other unprovisioned node device via the common SSID. The application will not detect a Wi-Fi network with the common SSID if no unprovisioned devices remain.

In some embodiments, an access point can host an additional Wi-Fi network with an SSID that is dedicated for device provisioning. Each device can be pre-configured to connect to the device-provisioning Wi-Fi network by default by searching for the device-provisioning SSID. The application can detect an unprovisioned device by joining this device-provisioning SSID, or by querying the access point while connected to the main Wi-Fi network (via a different SSID). While provisioning the digital hub, the application can configure the digital hub to connect to the main Wi-Fi network. After the digital hub becomes provisioned, the digital hub will disconnect from the device-provisioning Wi-Fi network, and connects to the main Wi-Fi network.

Alternatively, when the digital hub joins the device-provisioning Wi-Fi network of the access point, the access point can redirect the network connection for the digital hub to a device-provisioning server that is in charge of provisioning node devices into the network. The device-provisioning server can store pairs of optical codes and secret keys for each node device that is to be provisioned or has been provisioned, and uses this information to provision the digital hub. If the server does not have an optical code and secret key stored for the digital hub, the device-provisioning server can notify a system administrator that an unrecognized device has been detected, and requests the administrator to scan optical code 176 and secret key 178 from the digital hub into the system.

FIG. 2B illustrates a user interface (UI) display 200 of a digital hub when operating as a thermostat. UI display 200 can include environmental information for a zone of an HVAC system, and can include status information for the HVAC system. The environmental information can include a time and date 202, a zone temperature 204, and a zone humidity level 206. The status information can include a zone 210 that indicates an HVAC zone that is being monitored and controlled via UI display 200. The status information can also include a system mode 212 (e.g., "auto" or "manual"), an HVAC mode 214 (e.g., "heating" or "cooling"), a fan mode 216 (e.g., "auto," "on," or "off"), and an auxiliary heat indicator 218.

In some embodiments, when a user approaches the digital hub or taps on display 200, the digital hub can present the user with an alternative UI that allows the user to control one or more HVAC parameters. For example, the digital hub can present one or more additional UI elements that allow the user to change one or more HVAC settings.

Figure 2F:
FIGS. 2E and 2F illustrate an exemplary digital hub operating in a thermostat mode including a user interface (UI).
Figure 2E:

FIG. 2E illustrates one example of a configurable UI display 230 of a digital hub operating as a thermostat. UI display 230 can include environmental information 232, and a target temperature 234. Environmental information 232 can indicate, for example, a current temperature and a current humidity of an HVAC zone. If the current temperature is above (or below) target temperature 234 by a predetermined threshold, the digital hub can activate an air conditioner (or heater) to lower (or raise) the temperature to target temperature 234. Also, in some embodiments, if the current humidity is above a predetermined target humidity, the digital hub can activate the air conditioner to lower the zone's humidity to below the target humidity.

UI display 230 can also include a temperature range 232, which the user can interact with to change the temperature. For example, the user can either drag a temperature slider 234 along temperate range 232, or can tap on a portion of temperature range 232 that indicates a desired temperature. In some embodiments, when the user taps and holds on a portion of temperature range 232, the digital hub updates UI display 230 to move temperature slider 234 to the selected portion of temperature range 232. Then, while holding a finger on temperature range 232, the user can fine-tune the selected temperature by dragging his finger across temperature range 234. As the user drags his finger, the digital hub updates UI display 230 to move temperature slider 234 below the user's finger and along temperature range 232.

UI display 230 can also include other interactive UI elements. For example, UI display 230 can include a fan-controlling icon, which the user can tap on to select a desired state for the fan. The possible states can include "on," "off," and "auto." UI display 230 can also include a screen indicator 242 that informs the user when the user can navigate to one or more other UI "screens" or "pages." Screen indicator 242 can display, for example, a dot for each "screen" that the user can navigate to. A brightest dot (e.g., a white dot) can indicate which screen is currently being presented to the user, and other dimmer dots (e.g., a grey dot) indicate other pages to which the user can navigate. A horizontal row of dots indicates that the user can use a horizontal-swipe gesture to navigate between screens, and a vertical row of dots (not shown) indicates that the user can use a vertical-swipe gesture to navigate between screens. The other screens can present advanced configuration options to the user, or can present apps that the user has installed into the digital hub.

FIG. 2F is another example a UI display 260 for adjusting a thermostat temperature setting. Specifically, UI display 260 can include a scroll wheel 262 that a user can "scroll" by using a vertical "swipe" gesture over scroll wheel 262. A center portion 268 of scroll wheel 262 displays a target temperature, an upper portion 270 of scroll wheel 262 displays temperatures above the current target temperature, and a lower portion 272 of scroll wheel 262 displays temperatures below the current target temperature. In some embodiments, the temperatures displayed within center portion 268 are larger than the temperatures displayed within upper portion 270 and lower portion 272.

In some embodiments, the digital hub can display scroll wheel 268 over a dominant portion of UI display 270 in response to a user tapping on, hold a finger over, or performing a vertical swipe gesture over a UI element that displays the current target temperature (e.g., UI element 234 of FIG. 2B). Also, as the user adjusts the target temperature, the digital hub can adjust the placement of a temperature slider 264 so that temperature slider 264 is centered on a portion of a temperature range 266 that corresponds to the target temperature.

Figure 3:
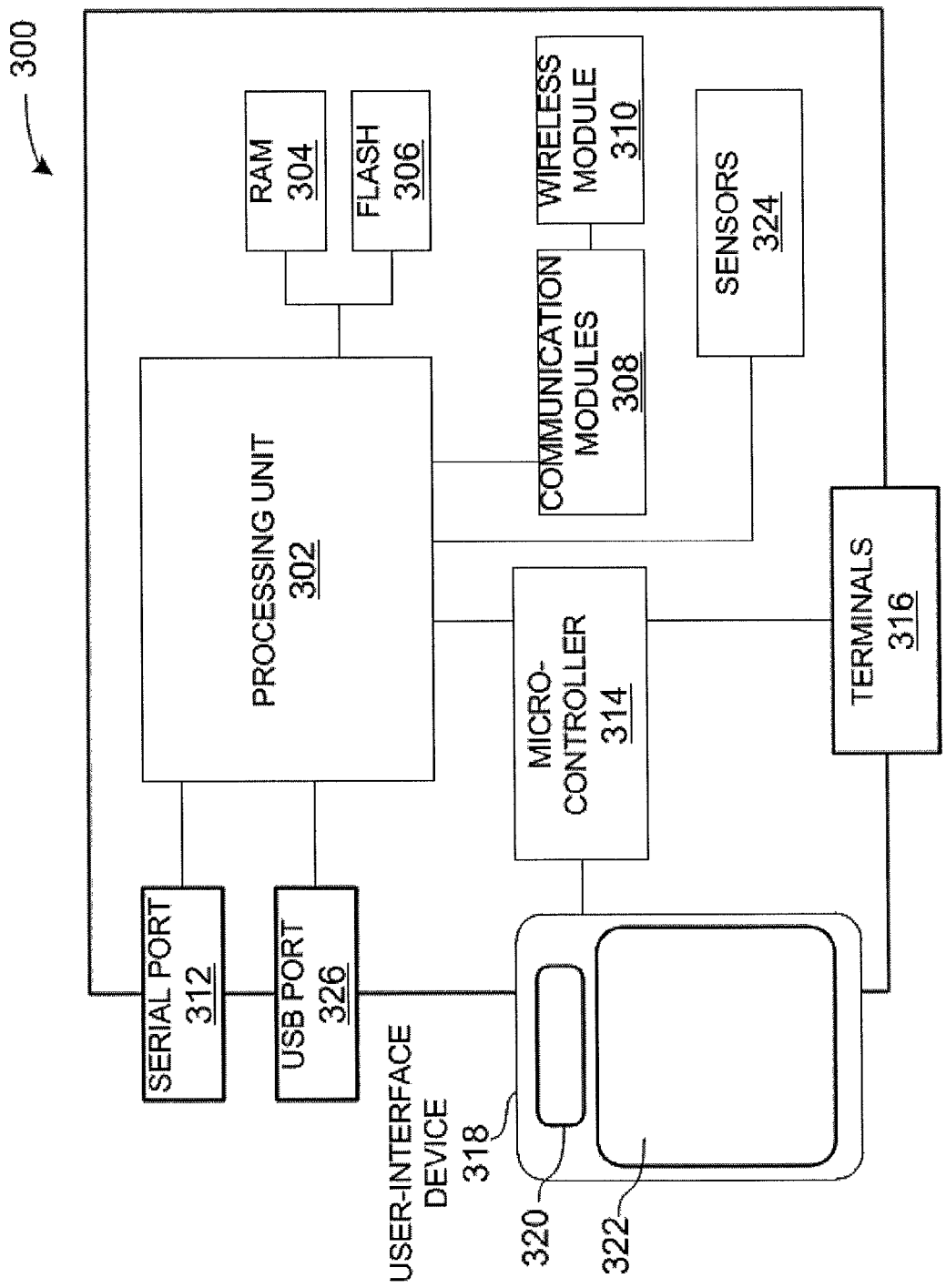
FIG. 3 is a block diagram of an exemplary digital hub operating as a thermostat.

FIG. 3 illustrates a block diagram of an exemplary digital hub 300. Digital hub 300 can include terminals 316 that can be coupled to a furnace (either by wired connection, as shown, or wirelessly) and/or an air-conditioning unit to control an HVAC system. Digital hub 300 can also include a flash storage device 306 that stores data and software instructions for operating the digital hub, as well as a processing unit 302 and a memory device 304 for executing the instructions. In some embodiments, the instructions can include an operating system that controls the HVAC system, and can also execute one or more applications installed by the use.

Digital hub 300 can also include one or more modules for communicating with external node devices. For example, digital hub 300 can include communication modules 308, which can include an Ethernet module coupled to an Ethernet port, and/or can include or be coupled to a wireless module 310 (e.g., a Wi-Fi module, or a Bluetooth module). Digital hub 300 can also include a serial port 312 (e.g., an RS-232 jack for a UART port), which can be coupled to an external peripheral device, and can be used by processing unit 302 to monitor and/or control the peripheral device. The peripheral device can include an appliance (e.g., an HVAC system), or any electronic or computing device that can communicate via serial port 312.

Digital hub 300 can also include a user-interface device 318 for accepting input from a user. Specifically, user-interface device 318 includes a proximity sensor 320 that detects a user's proximity to the digital hub, and includes a touch-screen display 322 that displays a user interface to a user. Touch-screen display 322 can also detect one or more screen portions touched by the user. For example, touch-screen display 322 can include a capacitive-touch screen, a resistive-touch screen, or any other touch screen technology now known or later developed.

Microcontroller 314 can monitor proximity sensor 320 to detect when the user is in front of touch-screen display 322, at which point microcontroller 314 can turn on touch-screen display 322. Also, when microcontroller 314 detects a user's presence, processing unit 302 can present an interactive user interface on touch-screen display 322 for the user. Microcontroller 314 can also monitor touch-screen display 322 to detect touch-screen gestures from the user. Processing unit 302 can process the gestures that interact with the user interface.

In some embodiments, the digital hub can discover nodes, including nodes having digital thermometers and motion sensors within a computer network. These digital thermometers and motion sensors can be deployed across one or more HVAC zones, which the digital hub can use to control the HVAC system for each of these zones.

Digital hub 300 can include one or more sensors 324, such as a temperature sensor, a humidity sensor, an ambient-light sensor, a motion sensor, a proximity sensor, or any other sensor device now known or later developed. In some embodiments, processing unit 302 can interface with sensors 324 via a serial interface, such as an Inter-Integrated Circuit (I2C) interface or a Serial Peripheral Interface (SPI) bus.

Digital hub 300 can also include a universal serial bus (USB) port 326 (e.g., via a micro-USB connector), which can be used to perform diagnostics on digital hub 300, to load firmware to digital hub 300, or to provision digital hub 300. A user can perform diagnostics, for example, by interfacing a personal computing device (e.g., laptop) to digital hub 300 via USB port 326, and running diagnostics software on the personal computing device. The diagnostics software can aggregate information from digital hub 300, can analyze this information to present configuration information to the user, and to detect or diagnose any malfunctions.

The user can provision digital hub 300 using USB port 326, for example, by attaching a USB drive (e.g., a flash drive) into USB port 326, such that this USB drive contains configuration and/or provisioning parameters (e.g., Wi-Fi parameters) for digital hub 300. When digital hub 300 detects configuration information in the USB drive, digital hub 300 can display a confirmation prompt on user-interface device 318, which asks the user to confirm that he wishes to load the configuration information from the USB drive. If the user has set an administrator password, digital hub 300 can prompt the user to enter his password before loading the configuration information. The user can also interact with power outlet 600 via a web page hosted by power outlet 600, or via a pre-installed application on a personal computing device that interfaces with power outlet 600.

Figure 4A:
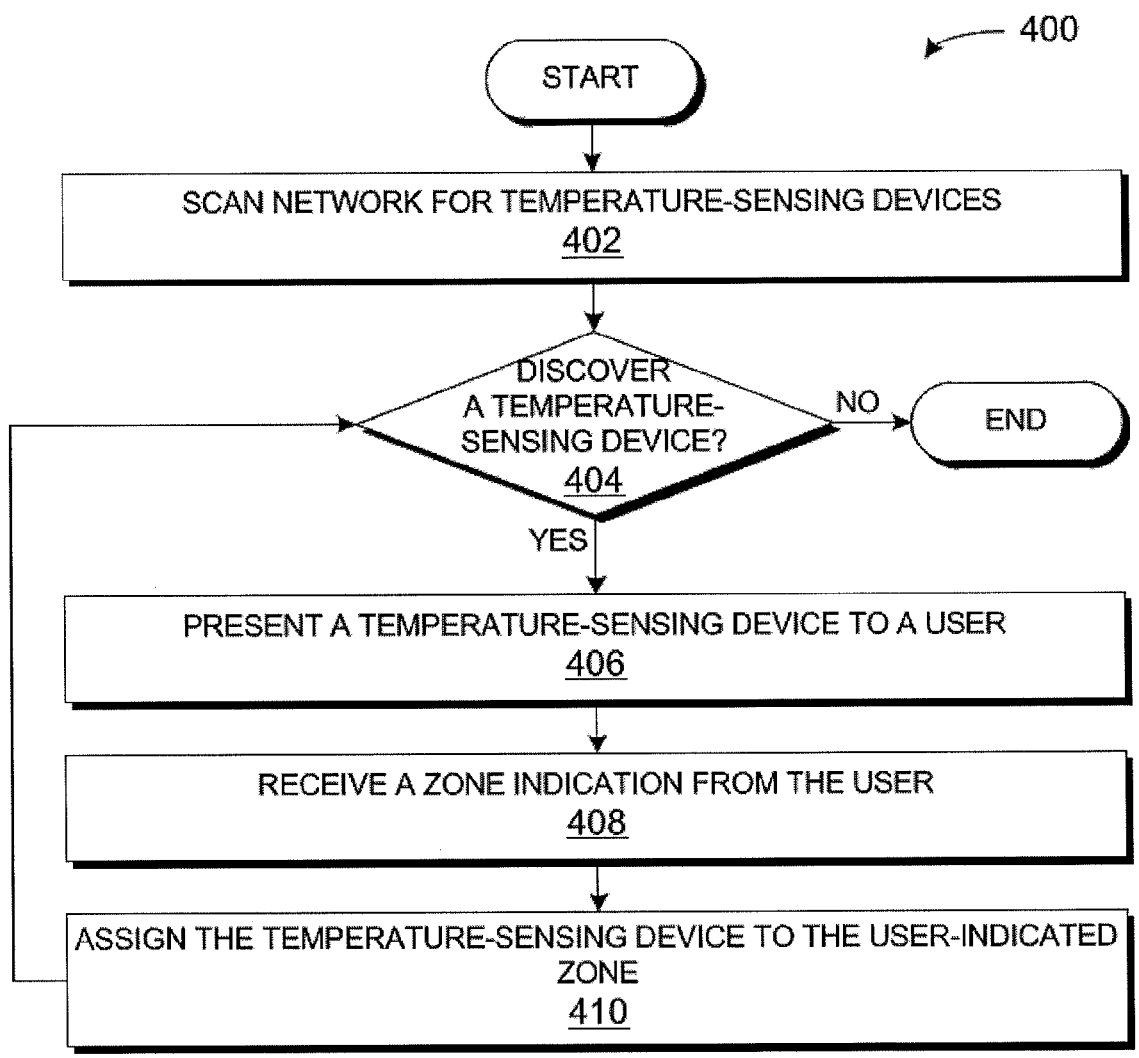
FIGS. 4A-4C are process flow charts illustrating methods for detecting sensing devices using a digital hub.

FIG. 4A presents a flow chart illustrating a method for detecting temperature-sensing devices of a computer network. During operation, the digital hub can scan a computer network to detect one or more temperature-sensing devices (operation 402). These temperature-sensing devices can include, for example, a digital thermometer coupled to a network-accessible interfacing device. The digital hub then determines whether a temperature-sensing device was discovered (operation 404).

In some variations, the hub may detect nodes and data streams. For example, if a temperature-sensing device has been discovered, the digital hub may present the temperature-sensing device to a user (operation 406), and can receive a zone indication from the user for the temperature-sensing device (operation 408). The system then assigns the temperature-sensing device to the user-indicated zone (operation 410), and returns to operation 304 to search for other temperature-sensing devices.

The digital hubs described herein may be operated in a variety of modes, to control a variety of devices through the associated nodes or other associated device (e.g., HVAC, home appliances, etc.). In general, the hub may receive information (sensor data) as data streams from specified locations/devices (nodes) and may monitor the data streams and, in particular, combinations of data streams, to trigger one or more actions.

Figure 4B:
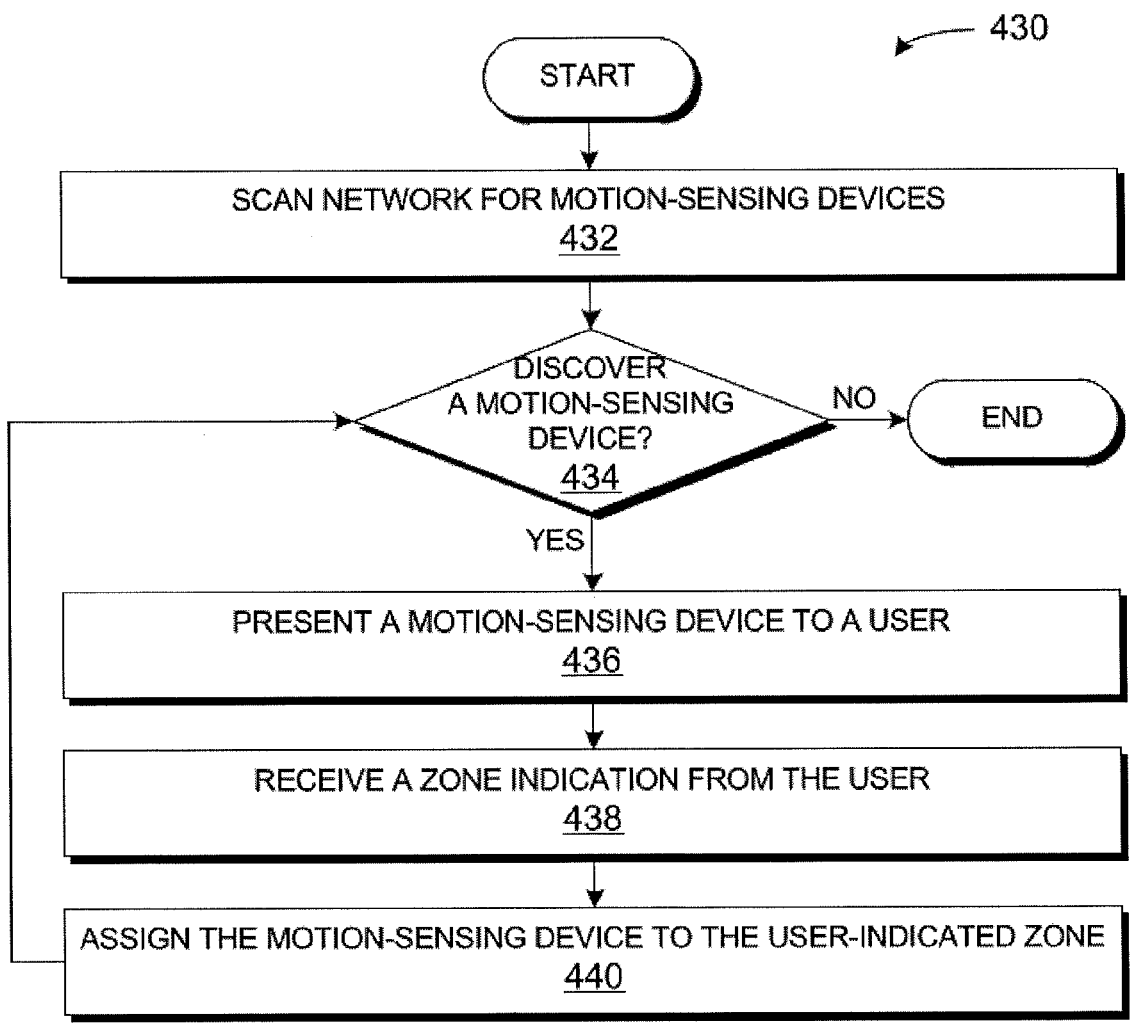

For example, FIG. 4B presents a flow chart illustrating a method for detecting motion-sensing devices of a computer network. During operation, the digital hub can scan a computer network to detect one or more motion-sensing devices (operation 432). These motion-sensing devices can include, for example, a proximity sensor or a motion sensor coupled to a network-accessible interfacing device.

If the digital hub discovers a motion-sensing device (operation 434), the digital hub presents the motion-sensing device to a user (operation 436). The digital hub can receive a zone indication from the user for the motion-sensing device (operation 438), and in response, assigns the motion-sensing device to the user-indicated zone (operation 440). The system can return to operation 334 to search for other motion-sensing devices.

Figure 4C:
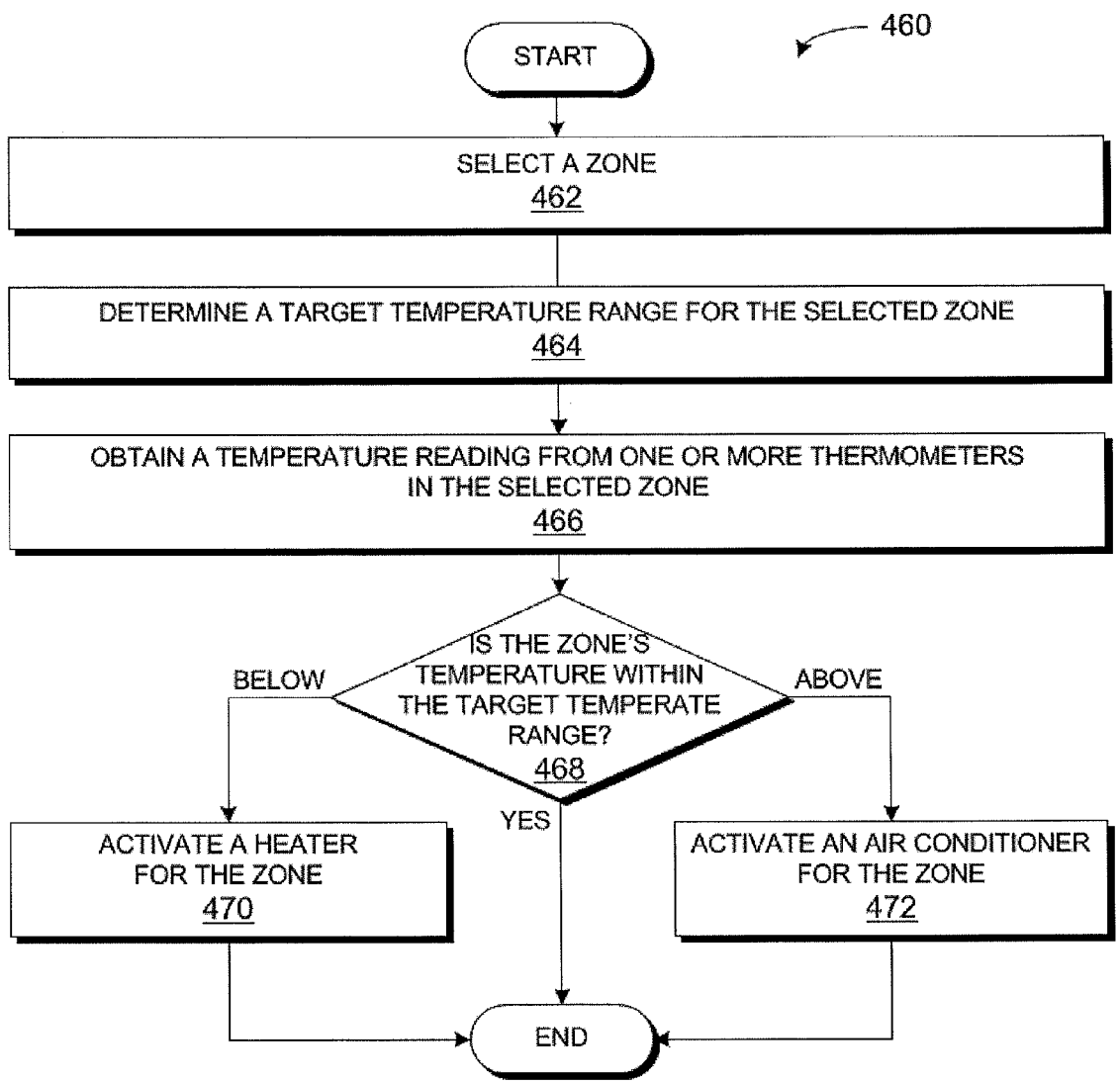

Returning to the example of operating the digital hub as (at least in part) a digital thermostat, FIG. 4C presents a flow chart illustrating a method for controlling a heating, ventilation, and air conditioning (HVAC) system. During operation, the digital hub can select an HVAC zone to control (operation 462), and determines a target temperature range for the selected zone (operation 464). In some embodiments, the digital thermometer can determine the target temperature range by determining whether the HVAC zone is vacant. For example, the digital thermometer can periodically monitor motion sensors deployed within the zone, and can label the HVAC zone as "vacant" when motion has not been detected for more than a predetermined threshold time interval. The digital thermometer can select the target temperature range that corresponds to whether the HVAC zone is occupied or vacant.

The digital hub then obtains a temperature reading from one or more thermometers in the selected zone (operation 466), and determines whether the zone's temperature is within the target temperature range (operation 468). If the zone's temperature is below the target temperature range, the digital hub can activate a heating unit that corresponds to the HVAC zone to raise the zone's temperature to within the target range (operation 470). On the other hand, if the zone's temperature is above the target temperature range, the digital hub can activate an air-conditioning unit that corresponds to the HVAC zone to lower the zone's temperature to within the target range (operation 470).

Although the digital hub illustrated in the examples and figures described above is configured as a digital thermostat, the digital hub described herein may be configured to control a large number and variety of operations in the home, allowing user control and automation. For example, a digital hub may be configured to control lighting, either to automatically regulate on/off and lighting levels within the habitable structure, or to maximize energy efficiency of lighting. In some variations the digital hub may be configured to generally optimize energy efficiency within the structure. In any of these variations, the digital hub may track occupancy by analyzing a plurality of sensors to deduce occupancy and/or user habits. For example, occupancy information (actual and predicted occupancy of various rooms within a structure) to regulate lighting, electrical power, audio equipment, and HVAC. The occupancy tracking possible may be quite sophisticated, in part due to combining of different data streams, including optical (e.g., camera, IR camera/sensors, etc.), microphone (audio), motion (direct motion sensor, motion sensing derived from camera), etc.

Any of the systems described herein may generally use one or more nodes, as discussed above. Examples of some types of nodes, including wall-mounted, interactive sensing and audio-visual node devices for a networked living/working space are described herein.

Figures 5A, 5B:
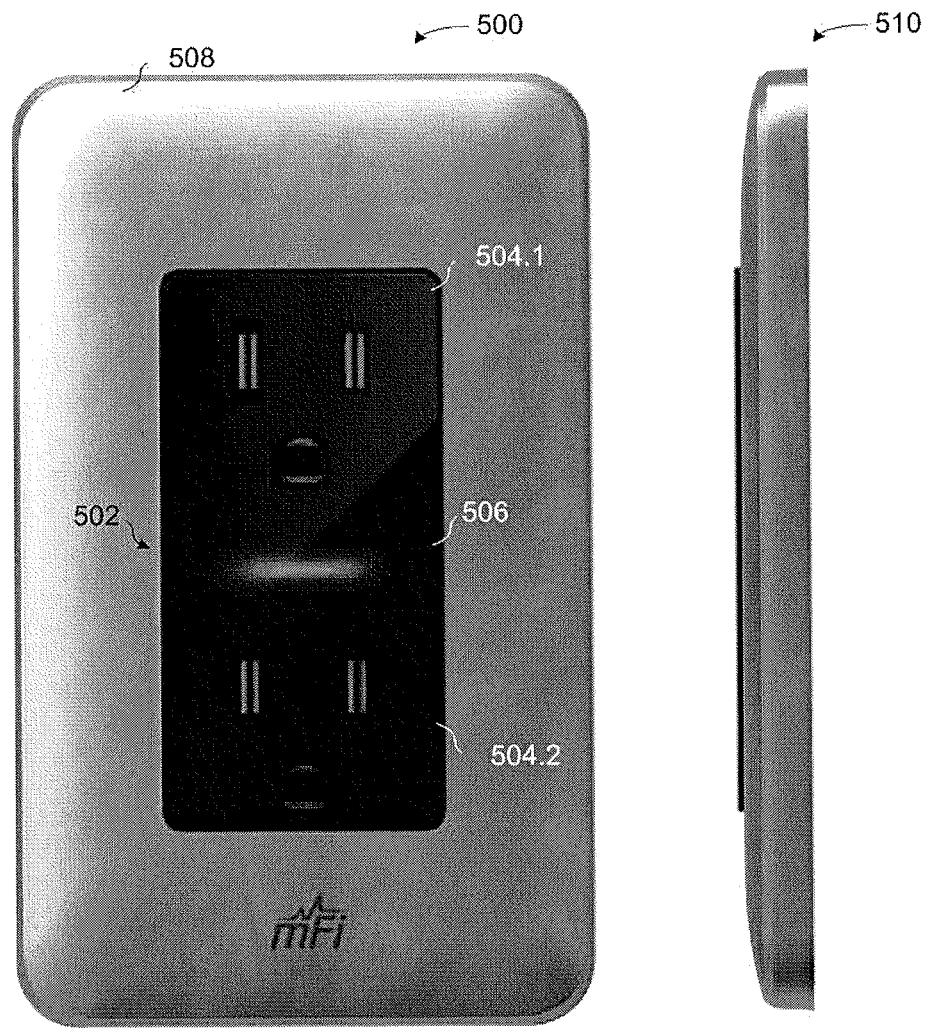
FIGS. 5A-5G illustrate view of a node configured as a power outlet node for monitoring and/or controlling power through the outlet(s).

For example, in FIG. 5A illustrates a node configured as a power outlet. In this example, the nodes device is configured as a power outlet 500 that has a black socket cover 502 that provides access to two sockets 504.1 and 504.2. Socket cover 502 may be manufactured of a plastic material to have a glossy finish. Also, power outlet 500 can include a light-emitting diode (LED) indicator 506, which can include two or more LEDs. For example, socket cover 502 may be semi-transparent black plastic to reveal light emitted by the LEDs behind socket cover 502, without revealing the LEDs when they are not emitting light. In some embodiments, LED indicator 506 can include a red LED and a blue LED. When both LEDs are on, socket cover 502 reveals a purple color. When only the red or blue LED is on, socket cover 502 reveals a red or blue color, respectively. On the other hand, when no LED is on, socket cover 502 does not reveal the LEDs.

Power outlet 500 also includes a metallic faceplate 508. In some embodiments, faceplate 508 may be manufactured of aluminum, with a dark anodized finish.

FIG. 5B illustrates a side view of an exemplary faceplate 510. Specifically, faceplate 510 has a small bevel along a perimeter of the front face, and may be manufactured of aluminum with a dark anodized finish.

Figures 5C, 5D:
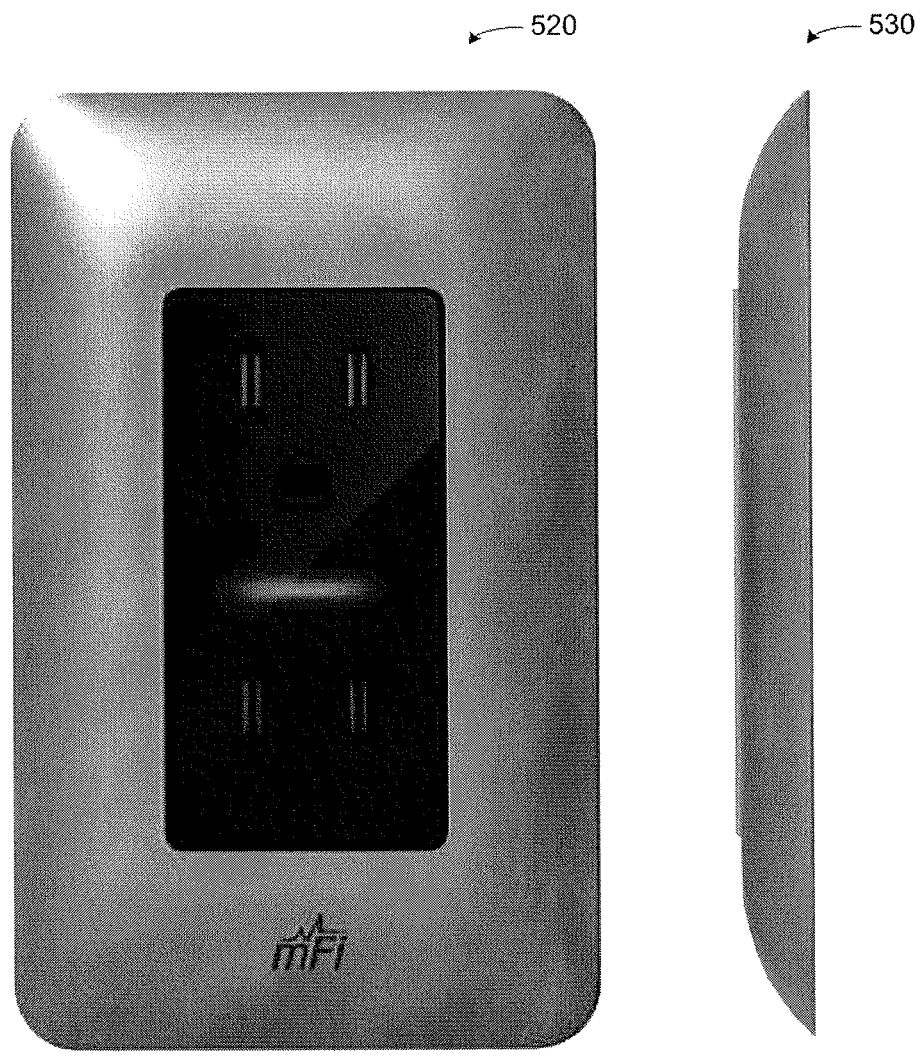

FIG. 5C illustrates an exemplary power outlet 520. Specifically, power outlet 520 includes a metallic faceplate 508 with a curved edge. In some embodiments, faceplate 508 may be manufactured of aluminum, with a dark anodized finish.

FIG. 5D illustrates a side view of an exemplary faceplate 530. Specifically, faceplate 530 includes a curved edge. Faceplate 530 may be manufactured of aluminum, with a dark anodized finish.

Figure 5G:
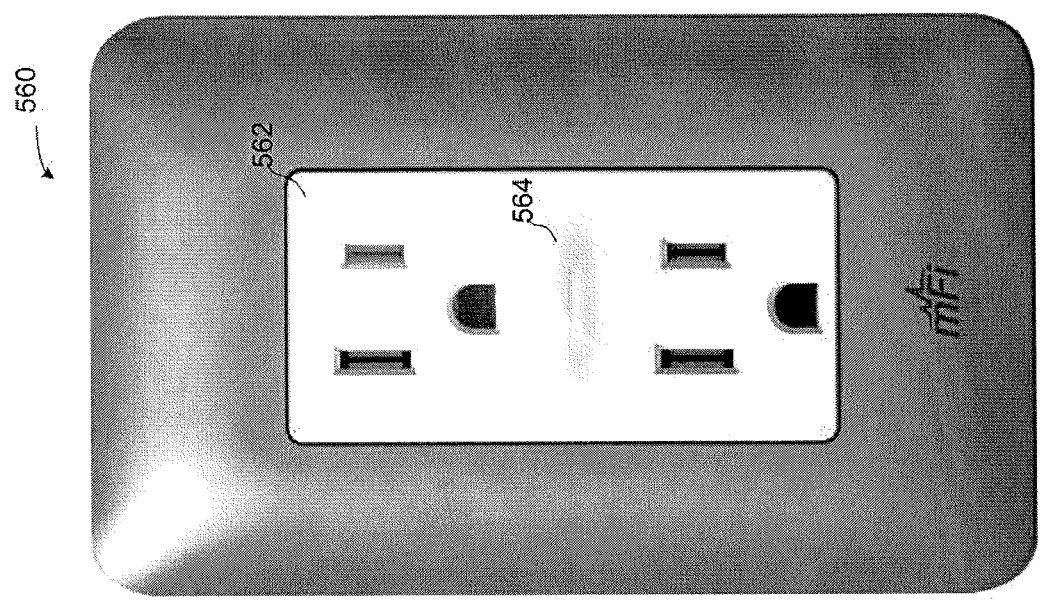
Figure 5F:
Figure 5E:
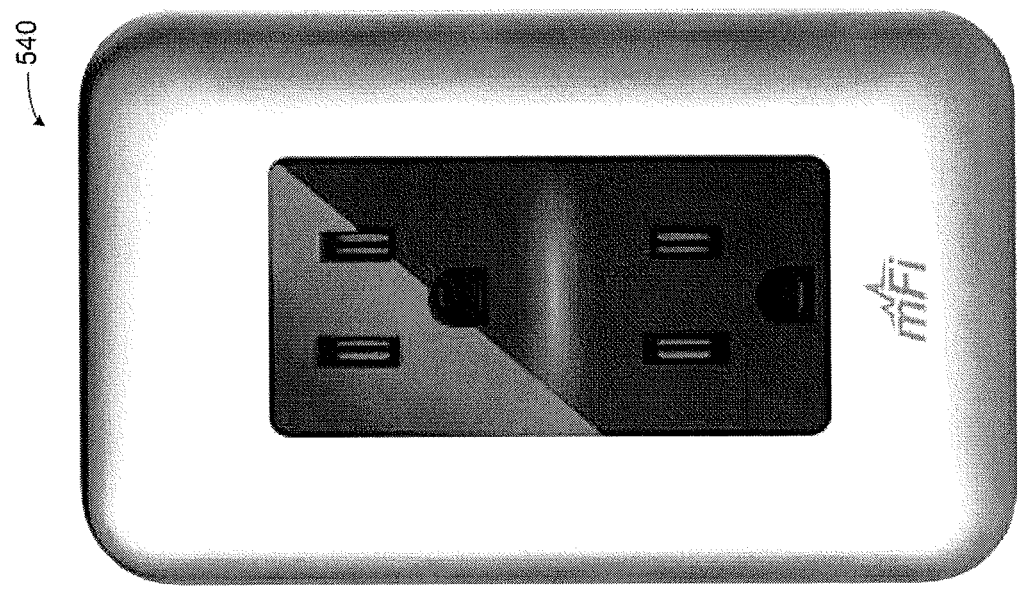

FIG. 5E illustrates an exemplary power outlet. Specifically, power outlet 520 includes a light-colored metallic faceplate 508 with a beveled edge. In some embodiments, faceplate 508 may be manufactured of aluminum, with a light-colored anodized finish.

FIG. 5F illustrates a side view of an exemplary faceplate 550. Specifically, faceplate 550 has a small bevel along a perimeter of the front face, and may be manufactured of aluminum with a light-colored anodized finish.

FIG. 5G illustrates an exemplary power outlet. Specifically, power outlet 560 can include a white socket cover 562, which may be manufactured of a plastic material to have a glossy finish. Socket cover 562 may be semi-transparent white plastic to reveal light emitted by LEDs behind the socket cover (e.g., emitted light 564), without revealing the LEDs when they are not emitting light.

The node device illustrated in FIGS. 5A-5G may also include one or more sensors (not visible in FIG. 5A, including a power (e.g., current, voltage, etc.) sensor for sensing the load applied on one or both outlets. This power outlet node device may then communicate this information (and receive control information), including wirelessly communicate it to a node, as described.

Figure 6:
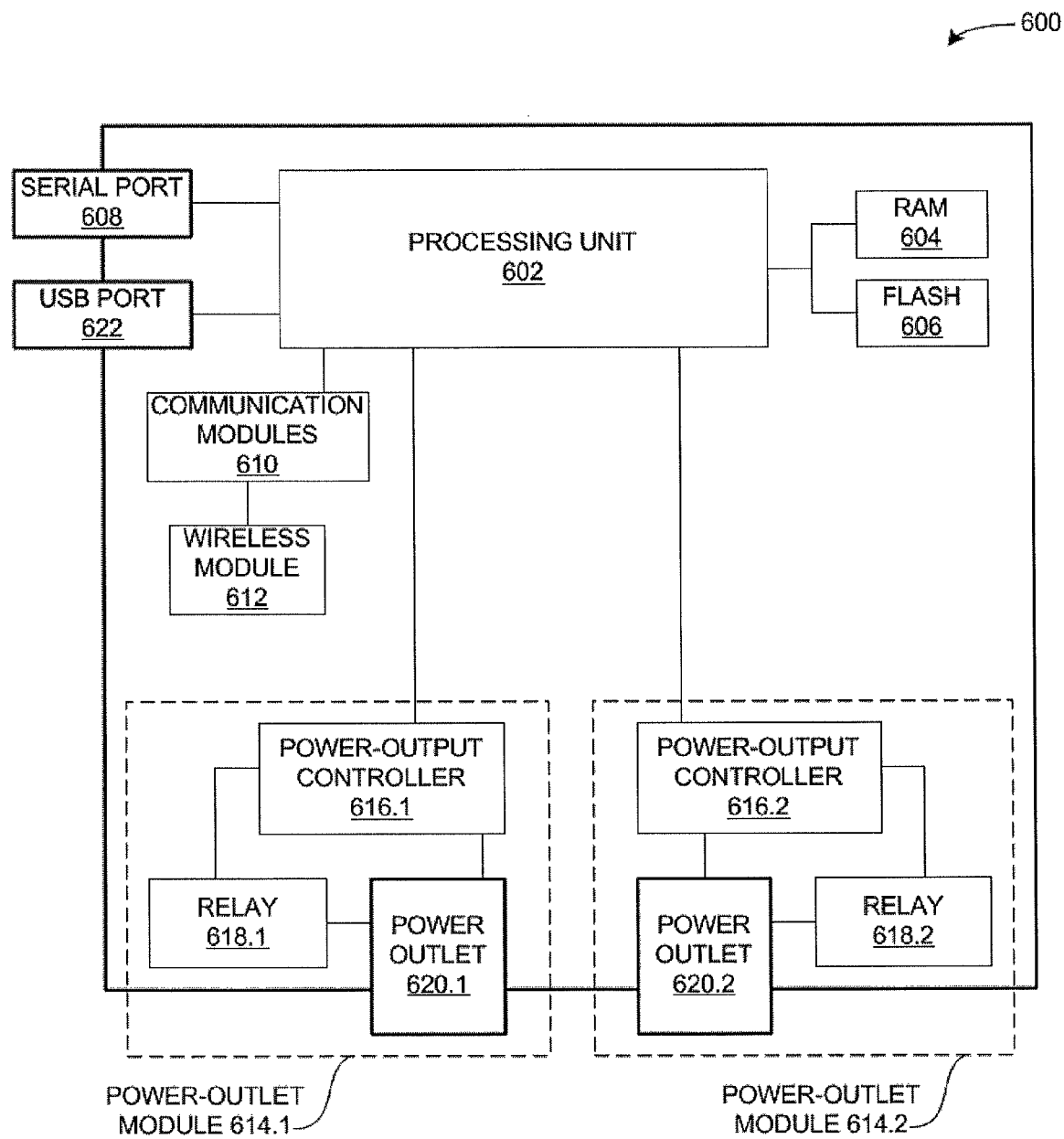
FIG. 6 is a block diagram of an exemplary power outlet node.

FIG. 6 illustrates a block diagram of an exemplary power outlet 600. Power outlet 600 can include a flash storage device 606 that stores data and software instructions for operating power outlet 600, as well as a processing unit 602 and a memory device 604 for executing the instructions. Power outlet node 600 can include two power-output modules 614.1 and 614.2, and each power-output module 614 can include a power-output controller 616 (e.g., a Prolific PL7221 integrated circuit (IC) device), a relay 618, and a power outlet 620. Each relay 618.1 and 618.2 can be controlled individually, to enable or disable power to each of power outlets 620.1 and 620.2 independent of the other. Also, each of power outlets 620.1 and 620.2 can output up to 240 V. Processing unit 602 can enable or disable power transmitted via a power outlet 620 by controlling the corresponding power-output controller 616 via digital interface pins or via a serial bus, at which point power-output controller 616 can generate an electrical signal for opening or closing relay 618 to enable or disable the power transmission to power outlet 620.

Processing unit 602 can configure power-output controller 616 to monitor or sample physical quantities of the power signal on a power outlet 620, and can obtain the sampled value via the digital interface pins or the serial bus. The sampled physical quantities can include an electric current, an electric voltage, a real power, a reactive power, an apparent power, and/or other physical quantities of a power signal. Hence, processing unit 602 can use power-output controllers 616.1 and 616.2 to perform energy monitoring, or to perform analytics computations. The analytics computations can be performed to investigate an energy cost over time for devices attached to power outlet 620.1 or 620.2, or to investigate an energy usage for a given region (e.g., a bedroom) or for a given system (e.g., a home-theater system, or an HVAC system).

As mentioned, in some embodiments, power outlet node 600 can include a current-regulating device (e.g., a TRIAC device, not shown) to control an amount of power that is provided to an external device. Power-output controller 616 can provide a trigger pulse to the current-regulating device for a determinable time interval, when the power signal's phase reaches a certain phase angle, to provide a desired power level to the external device. When power outlet 620 is coupled to a light fixture, for example, power-output controller 616 can control the current-regulating device as a means to adjust the light fixture's brightness level. As another example, when power outlet 620 is coupled to an induction motor (e.g., a ventilation fan), power-output controller 616 can control the current-regulating device as a means to adjust the rotational speed of the motor's shaft (e.g., the fan's blades).

Power outlet node 600 can also include a serial port 608, such as for a UART serial interface, an I2C serial interface, or any other serial interface now known or later developed. For example, power outlet 600 can implement a "dumb" power outlet that does not include a wireless communication module. Power outlet 600 can interface with a "smart" power outlet via serial port 608 to receive commands, and/or to communicate measurements made by a power-output controller 616.

In some other embodiments, power outlet 600 implements a "smart" power outlet that includes one or more modules for communicating with external devices over a computer network. For example, power outlet 600 can include communication modules 610, which can include an Ethernet module coupled to an Ethernet port (not shown), and/or can include or be coupled to a wireless module 612 (e.g., a Wi-Fi module, or a Bluetooth module). Hence, power outlet 600 can receive "events" from one or more remote devices, such as a temperature measurement, a motion-detection event, a central controller, etc. If the received events satisfy a rule's condition, processing unit 602 can execute the rule's action description to perform a desired action. The desired action can include, for example, measuring various parameters of a power-outlet module 614, and activating or disabling a power-outlet module 614. Power outlet 600 can also use serial port 608 to interface with one or more "dumb" power outlets to forward events from a network controller.

Power outlet node 600 can also include a universal serial bus (USB) port 622 (e.g., via a micro-USB connector), which can be used to perform diagnostics on power outlet 600, to load firmware to power outlet 600, or to provision power outlet 600. A user can perform diagnostics, for example, by interfacing a personal computing device (e.g., laptop) to power outlet 600 via USB port 622, and running diagnostics software on the personal computing device. The diagnostics software can aggregate information from power outlet 600, can analyze this information to present configuration information to the user, and to detect or diagnose any malfunctions.

The user can provision power outlet node 600 using USB port 622, for example, by attaching a USB drive (e.g., a flash drive) into USB port 622, such that this USB drive contains configuration and/or provisioning parameters (e.g., Wi-Fi parameters) for power outlet 600. The user can interact with power outlet 600 via a web page hosted by power outlet 600, or via a pre-installed application on a personal computing device that interfaces with power outlet 600. When power outlet 600 detects configuration information in the USB drive, power outlet 600 can display a confirmation prompt to the user via the web page or application, which asks the user to confirm that he wishes to load the configuration information from the USB drive. If the user has set an administrator password, power outlet 600 can prompt the user to enter his password before loading the configuration information.

Figure 7:
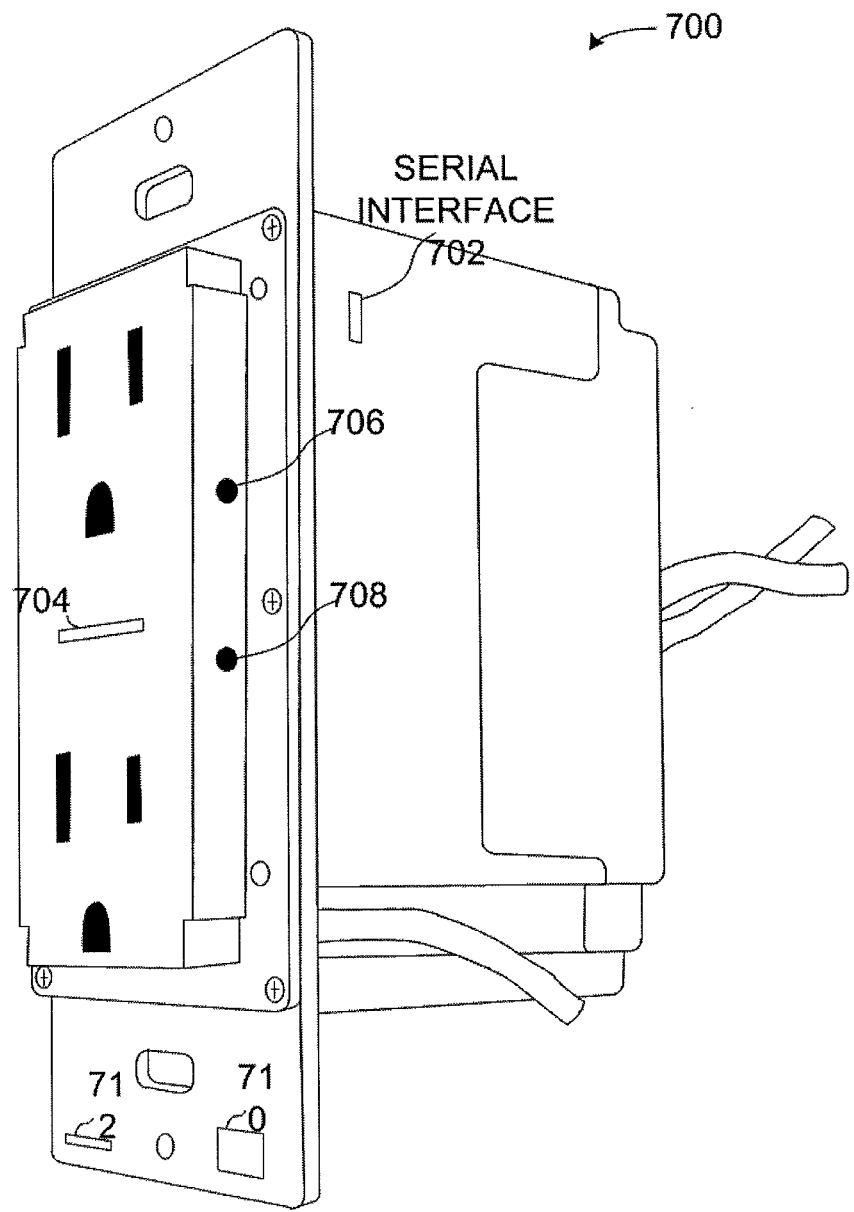
FIG. 7 is a side perspective view of an exemplary power outlet node.

FIG. 7 illustrates an angled view of an exemplary power outlet node 700.

Specifically, power outlet 700 can include a serial interface 702 (e.g., an 12C interface), LED indicators 704, a reset button 706, and an "INIT" button 708. Serial interface 702 can include a 4-pin micro connector with electrical insulation, which can be used to interface power outlet 704 with a remote device (e.g., a power outlet or light dimmer).

When reset button 706 is depressed for a predetermined time interval (e.g., 10 seconds), a microprocessor of power outlet 700 initiates a power cycle. Also, when INIT button 708 is depressed for a predetermined time interval (e.g., 10 seconds), the microprocessor re-initializes the device to factory settings. In some embodiments, the microprocessor can be reinitialized to factory settings by loading a factory-installed firmware image into a flash storage device of power outlet 700.

LED indicators 704 can include two LED lights of different colors. In some embodiments, LED indicators 704 can include a red LED and a blue LED, which can each be turned on or off programmatically by a processor of power outlet 700. Hence, LED indicators 704 can emit a red light, a blue light, a purple light (e.g., when both red and blue LEDs are on), or no light (e.g., when neither the red or blue LED is on). For example, the red LED can be turned on when the top (or bottom) power outlet is activated, and the blue LED can be turned on when the bottom (or top) power outlet is activated. Hence, LED indicators 704 will be dark when none of the power outlets are activated, or may emit a purple light when both of the power outlets are activated.

In some embodiments, the color emitted by LED indicators 704 can be used to indicate a network connectivity, a network packet being transmitted, a network packet being received, a power source status, or any other user-defined condition or event. In some other embodiments, the color emitted by LED indicators 704 can indicate that an electrical attribute of an outlet satisfies predetermined criteria (e.g., a power level or current level is above or below a predetermined threshold). For example, the microprocessor may activate the red LED when the top outlet satisfies the predetermined criteria, and may activate the red LED when the bottom outlet satisfies the criteria.

A microprocessor of power outlet node 700 can also control LED indicators 704 based on a user-defined rule, such as to implement a night light functionality by turning on both LEDs. In some embodiments, the user-defined "night light" rule can turn on both LEDs during a predetermined time of day. Alternatively, a networked interfacing device can include or be coupled to a light sensor that measures a room's ambient light level. When the room's ambient light drops below a predetermined level, the interfacing device can send an event to one or more power outlets that are installed in the room via a computer network. This event can inform these power outlets that the room is dark. When a particular power outlet receives the event, the power outlet identifies a "night light" rule that is activated by this event, and can process the rule to turn on the power outlet's LEDs.

In some embodiments, power outlet node 700 can include an optical code 710 and a secret number 712 printed over a portion of power outlet 700. For example, optical code 710 and secret number 712 can be printed over a portion of power outlet 700 that is to be covered by a faceplate for power outlet 700. Optical code 710 can encode a MAC address for power outlet 700, and can encode secret number 712. Secret number 712 can include, for example, 6 hexadecimal or alphanumeric characters. A user can scan optical code 710, such as via a device-provisioning application on a mobile device, to provision the power outlet 700 to operate within a device network. The user can enter secret number 712 into the device-provisioning application to complete the provisioning process. For example, power outlet 700 can use a built-in wireless device to host a closed Wi-Fi network, which the user can use to interface a personal computing device (e.g., a smartphone) to power outlet 700. The user can gain access to the closed Wi-Fi network by entering secret number 712 as the secret key.

As another example, power outlet node 700 can host an open Wi-Fi network, which the user can use to establish a network connection between his personal computing device and power outlet 700. Alternatively, power outlet 700 can use any wireless technology to establish a peer-to-peer network connection with the personal computing device, such as near field communication (NFC) or Bluetooth Low Energy. The user can run an application on his personal computing device to send and/or receive data to/from power outlet 700 over the network connection. The user can scan optical code 710 using an image sensor on his personal computing device, and the device signs the data sent to power outlet 700 using information encoded in optical code 710 (e.g., secret number 712). The application can use optical code 710 to generate a one-way secure hash value that is used to sign data. Alternatively, the application can use optical code 710 during a challenge-response handshake protocol with power outlet 700 that establishes a secure connection with power outlet 700. During this handshake protocol, the application and power outlet 700 can exchange digital signatures that are then used to sign any data transferred between the two devices.

In some embodiments, a plurality of unprovisioned node devices (e.g., power outlets, light dimmers, thermostats, etc.) can each host an unsecured Wi-Fi network with a common Service Set Identification (SSID). The application can provision the device automatically (e.g., using an optical code and secret key pair which the user has previously scanned), or can interact with the user to present a sequence of device-provisioning steps. After power outlet 700 becomes provisioned, power outlet 700 will bring down its Wi-Fi network, which can allow the application to connect with any other unprovisioned device via the common SSID. The application will not detect a Wi-Fi network with the common SSID if no unprovisioned devices are within a predetermined distance to the personal computing device.

In some embodiments, an access point can host a device-provisioning Wi-Fi network with an SSID that is dedicated for provisioning devices. Each device can be pre-configured to connect to the device-provisioning Wi-Fi network by default (via the predetermined SSID). The application can detect an unprovisioned device by joining this device-provisioning SSID, or by querying the access point while connected to the main Wi-Fi network (via a different SSID). While provisioning power outlet 700, the application can configure power outlet 700 to connect to the main Wi-Fi network. After power outlet 700 becomes provisioned, power outlet 700 will disconnect from the device-provisioning Wi-Fi network, and connects to the main Wi-Fi network.

Alternatively, when power outlet node 700 joins the device-provisioning Wi-Fi network of the access point, the access point can redirect the network connection for power outlet 700 to a device-provisioning server that is in charge of provisioning devices into the network. The device-provisioning server can store pairs of optical codes and secret keys for each device that is to be provisioned or has been provisioned, and uses this information to provision power outlet 700. If the server does not have an optical code and secret key stored for power outlet 700, the device-provisioning server can notify a system administrator that an unrecognized device has been detected, and requests the administrator to scan optical code 710 and secret key 712 from power outlet 700 into the system.

Figure 8:
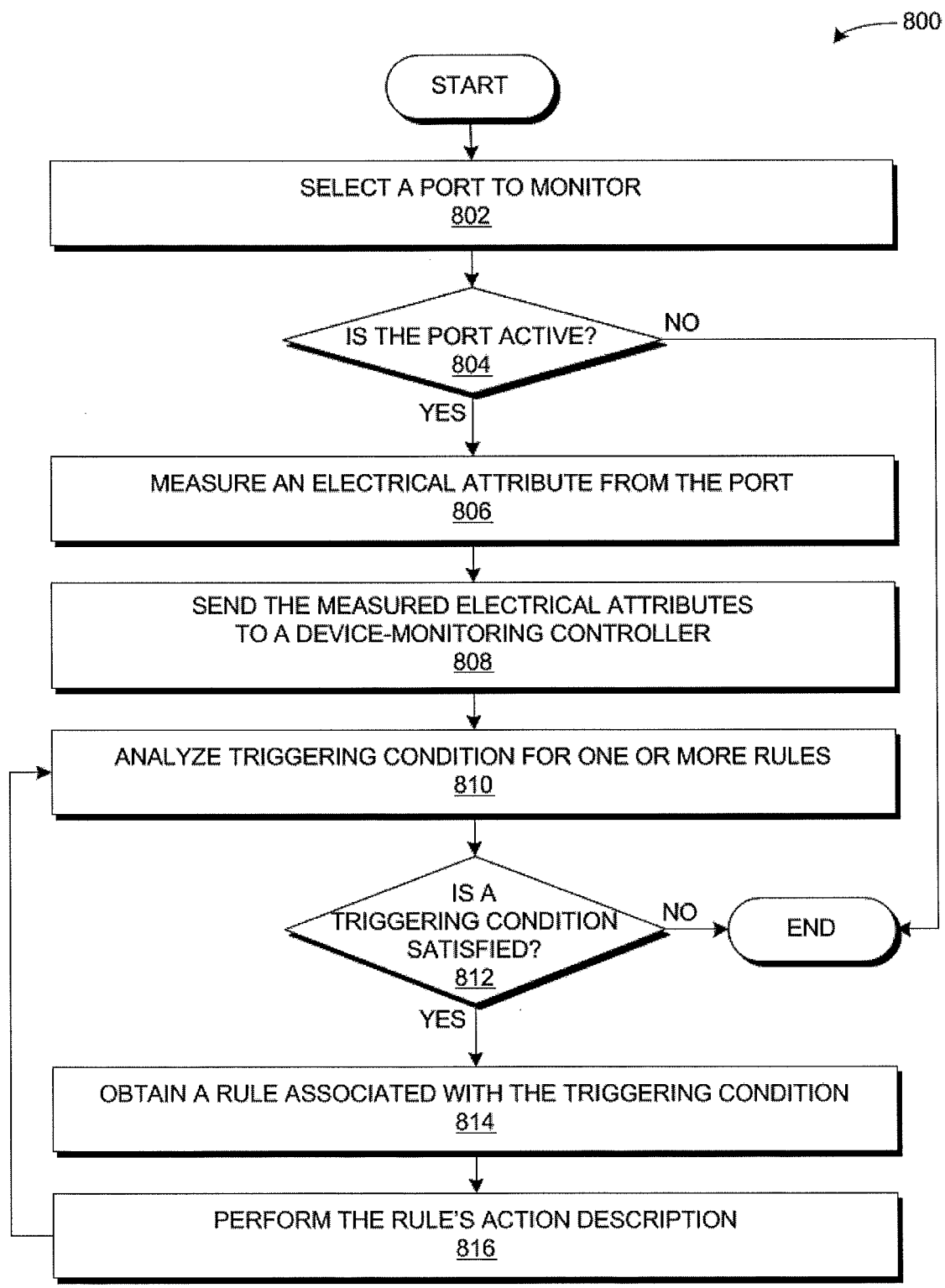
FIG. 8 is a flow chart illustrating a method for processing a measurement from a power outlet node.

FIG. 8 is a flow chart illustrating a method for processing a measurement from a power outlet node. During operation, the power outlet node can select an outlet port to monitor (operation 802), and determines whether the port is active (operation 804). If the port is active, the power outlet proceeds to monitor an electrical attribute from the port (operation 806). The electrical attribute can include, for example, a power output, a voltage, a current, a power energy sum, and/or other electrical attributes. The power outlet node can then send the measured electrical attributes to a device-monitoring controller (operation 808). In some embodiments, the device-monitoring controller can include a central computer that monitors an operating state for a plurality of devices, and can coordinate communication between these devices.

The power outlet node then analyzes triggering conditions for one or more rules (operation 810), and determines whether a triggering condition is satisfied by the measured electrical attributes (operation 812). If so, the system proceeds to obtain a rule associated with the triggering condition (operation 814), and performs the rule's action description (operation 816). The system then returns to operation 810 to analyze triggering conditions for other rules that remain to be processed.

Figure 9:
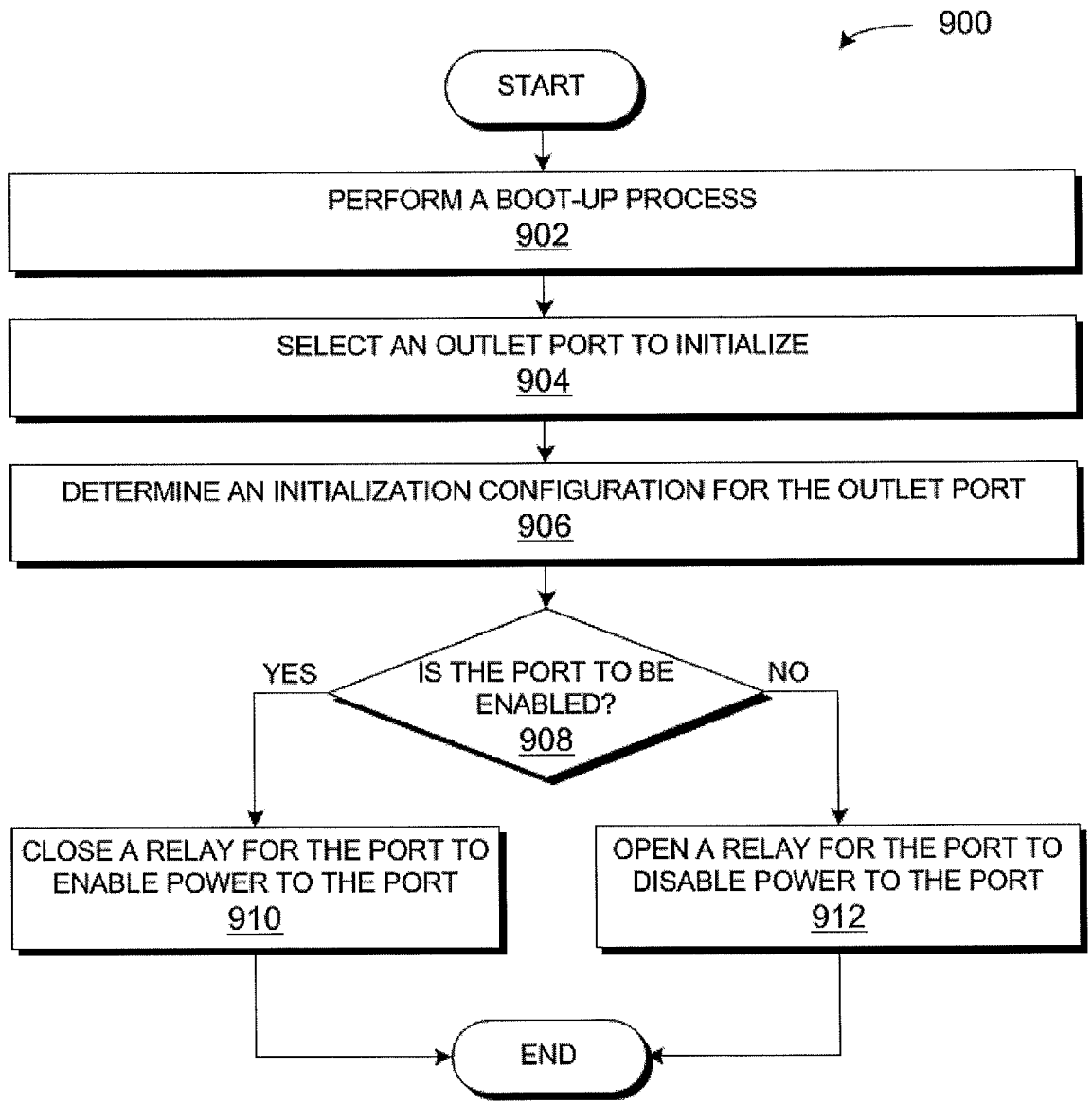
FIG. 9 is a flow chart illustrating a method for initializing a power outlet node.

FIG. 9 is a flow chart illustrating a method for initializing a power outlet node. During operation, the system can perform a boot-up process (operation 902), for example, in response to power returning to the home after an electrical blackout, or in response to a user turning on power to a home. The boot-up process can include loading a firmware image into memory, and initializing one or more electronic components of the power outlet node. For example, the power outlet node can initialize a wireless module to join a wireless network.

A power outlet node can also select an outlet port to initialize (operation 904), and determines an initialization configuration for the outlet port (operation 906). The power outlet node may then determine if the port is to be enabled (operation 908). If so, the power outlet node closes a relay for the port to enable power to the port (operation 910). Otherwise, if the port is not to be enabled, the power outlet node can open a relay for the port to disable power to the port (operation 912).

Figure 10:
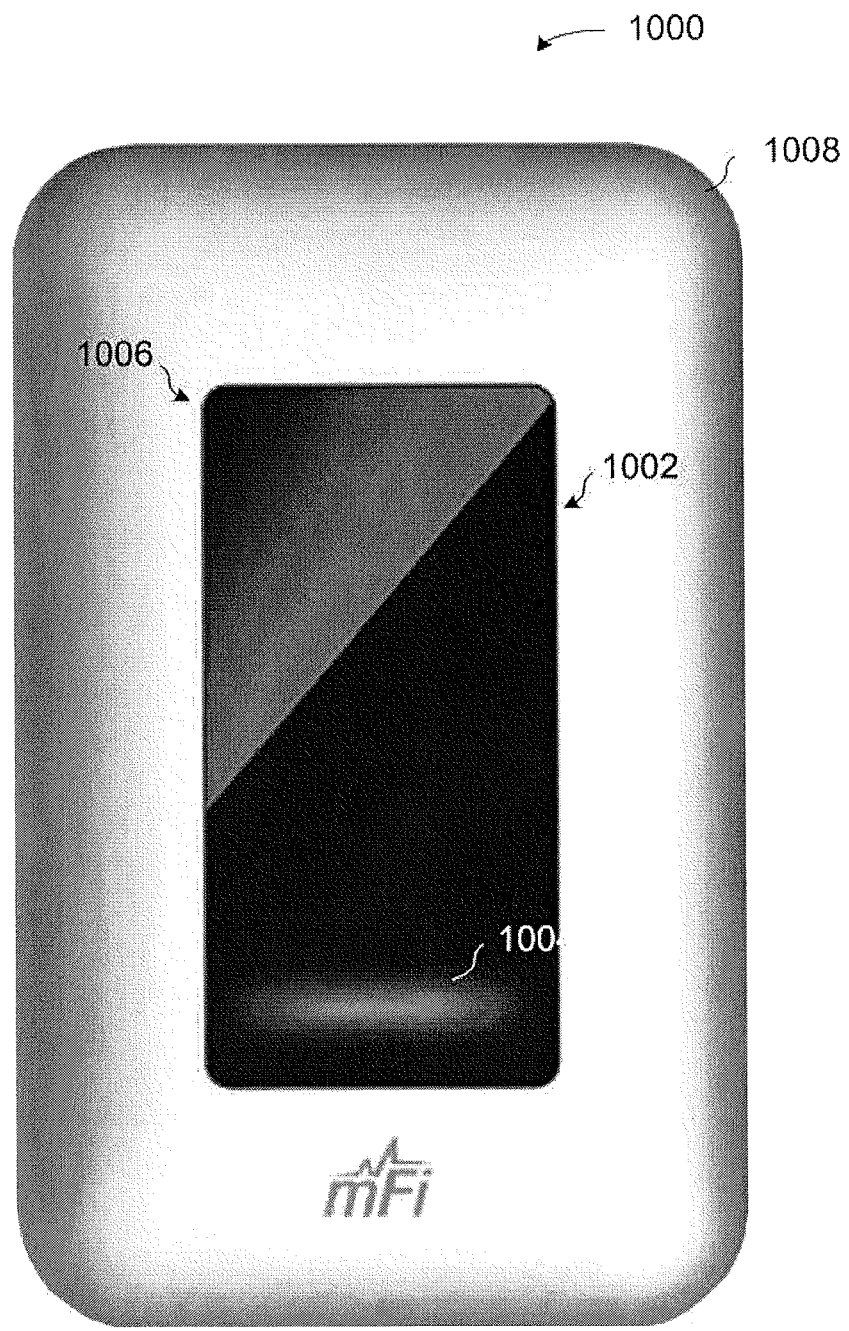
FIG. 10 illustrates an exemplary light dimmer node.

In some variations, the node may be configured as a light switch node and/or light dimmer node. For example, FIG. 10 illustrates an exemplary light dimmer node 1000. Light dimmer node 1000 can include a capacitive-touch display 1002 that can receive user input from the user. The user input can include any gestures made by the user by touching and/or dragging a finger on capacitive-touch display 1002. The gestures can include a "tap" gesture on a portion of capacitive-touch display 1002, and a "swipe" gesture that moves along a vertical direction over a portion of capacitive-touch display 1002.

Light dimmer node 1000 can also include a light-emitting diode (LED) indicator 1004, which can include two or more LEDs. For example, socket cover 1006 may be semi-transparent black plastic to reveal light emitted by the LEDs behind socket cover 1006, without revealing the LEDs when they are not emitting light. In some embodiments, LED indicator 1004 can include a red LED and a blue LED. When both LEDs are on, socket cover 1006 reveals a purple color. When only the red or blue LED is on, socket cover 1006 reveals a red or blue color, respectively. On the other hand, when no LED is on, socket cover 1006 does not reveal the LEDs. Light dimmer node 1000 can also configure one or both LEDs to pulsate at a predetermined frequency, for example, to indicate that light dimmer 1000 is in an "off" or "waiting" state.

A metallic faceplate 1008 can be attached over light dimmer node 1000. In some embodiments, faceplate 1008 may be manufactured of aluminum, with a dark anodized finish or a light-colored anodized finish. In some embodiments, capacitive touch display 1002 of light dimmer node 1000 can include a display (e.g., a liquid crystal display (LCD)) to provide information to the user. The display can present information to the user while the user is interacting with capacitive touch display 1002 to configure light dimmer node 1000, for example, by displaying an illustration for the current dim level and/or for any other state information. Also, the user can configure light dimmer node 1000 to display the state information when turned on (e.g., to display an illustration of a dim level when providing power to a light fixture), even if the user is not interacting with capacitive touch display 1002.

The display on capacitive touch display 1002 can also display other information for the user. For example, the display can present a user interface that allows the user to select a menu item, such as for a configuration setting, or for an installed application. The display can present one or more menu items per screen, and allows the user to navigate between screens by performing a vertical or horizontal swipe gesture. Once the user selects a menu item (e.g., by tapping on the menu item), light dimmer node 1000 can present a user interface for the menu item on the display, which allows the user to configure or interact with the selected menu item (e.g., to adjust a configuration setting).

In some embodiments, a menu item may correspond to a configuration interface for an external device, such as for a different light dimmer associated with the same user. For example, light dimmer node 1000 can present a user interface that illustrates a status for one or more external devices, such as light dimmers, power outlets, digital hubs, sensors, etc. If the user selects a device from the user interface (e.g., by tapping on the device's icon on capacitive touch display 1002), light dimmer node 1000 can present a device-configuring menu that allows the user to adjust the device.

If the selected device is a remote light dimmer node, the device-device-configuring menu can allow the user to interact with capacitive touch display 1002 as if it were the remote light dimmer node. Hence, the user can perform the advanced light-dimming gestures on light dimmer node 1000, and have these gestures be interpreted and/or executed by the remote light dimmer node. These gestures can correspond to device-configuring functions such as to program a default dim level, or can correspond to state-modifying functions such as to adjust a current dim level, or to turn the remote light dimmer node on or off.

On the other hand, if the selected device is a power outlet node, the device-configuring menu can allow the user to enable or disable power to the power outlet node. The device-configuring interface can also allow the user to view a status of the power outlet node, such as to view a snapshot of the current power consumption via a port of the power outlet node or to view power consumption statistics over a given time interval.

If the selected device is a digital hub, the device-configuring menu can allow the user to view a current temperature and/or thermostat settings for one or more zones. The user can also configure the thermostat settings for a zone, such as to set a temperature threshold for a heater and/or for an air-conditioning unit.

Figure 11:
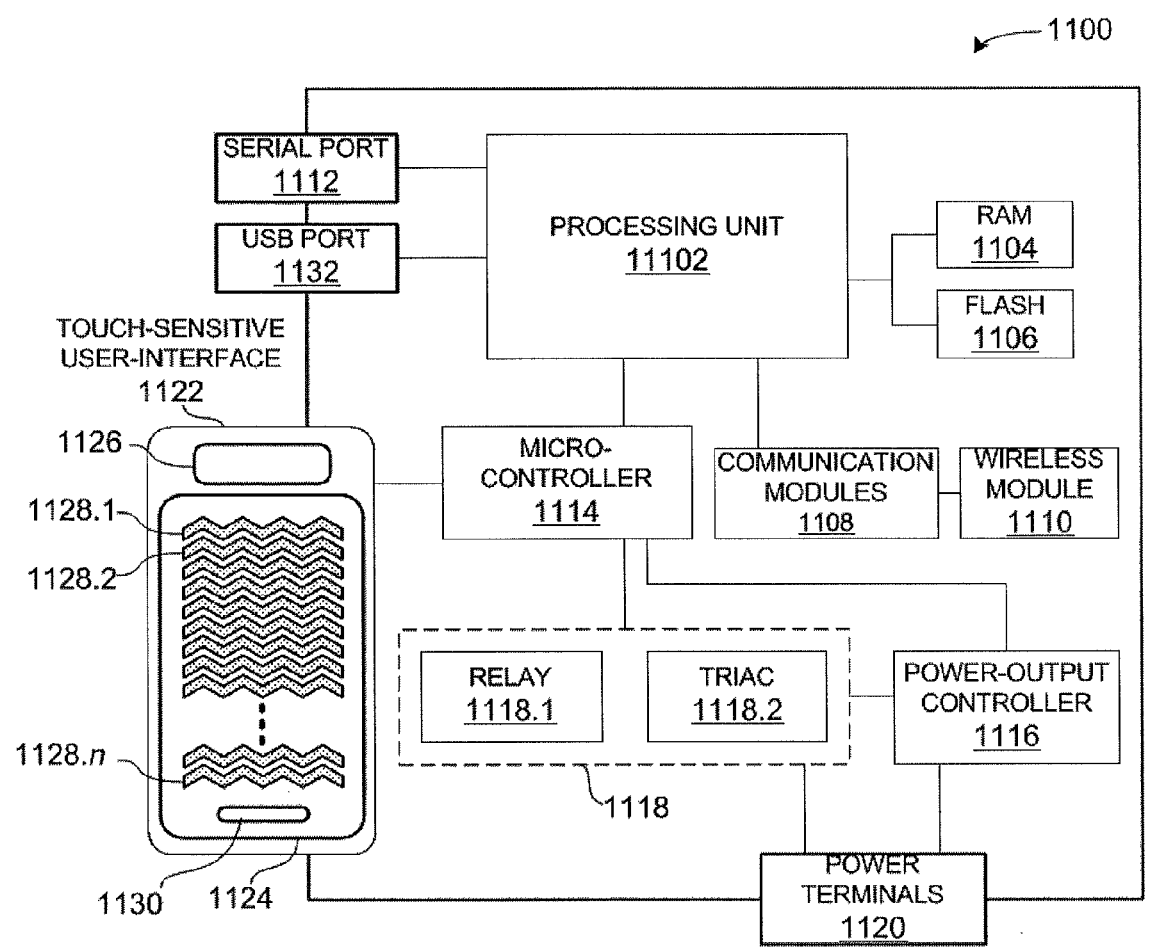
FIG. 11 is a block diagram of an exemplary light dimmer node.

FIG. 11 illustrates a block diagram of an exemplary light dimmer node 1100. Light dimmer node 1100 can include a flash storage device 1106 that stores data and software instructions for operating light dimmer node 1100, as well as a processing unit 1102 and a memory device 1104 for executing the instructions. Light dimmer node 1100 can also include a touch-sensitive user-interface 1122 and a microcontroller 1114 for controlling touch-sensitive user-interface 1122. Touch-sensitive user-interface 1122 can include one or more sensors 1126, a plurality of touch-sensitive sensors 1128, and a light-emitting diode (LED) indicator 1130.

LED indicator 1130 can include two or more LEDs to indicate at least four device states. For example, LED indicator 1130 can include a red LED and a blue LED. When both LEDs are on, LED indicator 1130 emits a purple color. When only the red or blue LED is on, LED indicator 1130 emits a red or blue color, respectively. On the other hand, when no LED is on, LED indicator 1130 does not emit light. These LED states can indicate the following four device states: "off," "standby," "switch," and "dimmer." The "off" state indicates that the light dimmer is not receiving any power, and the "standby" state indicates that the light dimmer is receiving power but is not providing power to a light fixture. The "switch" state indicates that the light dimmer is providing power to the light fixture using relay 1118.1, and the "dimmer" state indicates that light dimmer is providing power to the light fixture using triac 1118.2.

Sensors 1126 can include a proximity sensor, a motion sensor, a temperature sensor, a humidity sensor, an ambient light sensor, and/or other sensor devices now known or later developed. The proximity sensor can detect when an object (e.g., a user's hand) is within a close proximity of touch-sensitive user-interface 1122, and generates an analog signal based on the proximity of the detected object to sensors 1126. For example, the proximity sensor can include an infrared proximity sensor, which emits an infrared signal from an infrared emitter, and generates the analog signal based on an amount of infrared light detected by an infrared detector (e.g., infrared light that reflected off the user's hand).

The motion sensor can include an ultrasonic motion sensor, a microwave motion sensor, a tomographic motion sensor, or any motion-sensing technology now known or later developed. When a user or an object moves in front of touch-sensitive user-interface 1122, the motion sensor can detect the motion and can generate a binary value that indicates that an object has been detected. In some embodiments, the motion sensor can generate an analog or digital value that indicates, for example, a change in an ultrasonic measurement, a change in a microwave measurement, etc.

Touch-sensitive sensors 1138 can include capacitive-touch sensors, resistive-touch sensors, or any touch-screen sensors now known or later developed. For example, when a user touches a respective capacitive-touch sensor (e.g., sensor 1128.*n*), the touch-sensitive sensor detects an increase in capacitance on the surface of its touch screen, and generates an analog voltage which reflects the amount of capacitance that was detected.

A respective touch-sensitive sensor can include a jagged shape along one dimension, such as a plurality of chevron shapes adjoined along a horizontal dimension, and the set of touch-sensitive sensors 1128.1-1128.*n* can be arranged along a dimension of user-interface 1122 perpendicular to the jagged shape (e.g., along a vertical dimension of user-interface 1122). Further, two neighboring touch-sensitive sensors can be placed in close proximity, for example, so that a lowest point on one touch-sensitive sensor (e.g., sensor 1128.1) has a vertical coordinate along user-interface 1122 that is less than or equal to a highest point on a lower-neighboring touch-sensitive sensor (e.g., sensor 1128.2).

Alternatively, a respective touch-sensitive sensor can include any other shape suitable for implementing a touch-sensitive grid, and the set of touch-sensitive sensors 1128.1-1128.*n* can be arranged along two dimension of user-interface 1122 to create a touch-sensitive surface (e.g., a grid or any other user-interface pattern) associated with a pre-determined set of touch-surface gestures.

Touch-sensitive user-interface 1122 generates a digital output signal for each of proximity sensor 1130, touch-sensitive sensors 1128.1-1128.*n*, and sensors 1126. Touch-sensitive user-interface 1122 can include a circuit that provides a constant current source to charge each capacitive-touch sensor 1128. Touch-sensitive user-interface 1122 can also include an analog-to-digital converter (ADC) device or a Schmitt trigger device for each sensor, which converts the sensor's analog signal value to a digital binary signal that indicates whether the sensor is charged. Touch-sensitive user-interface 1122 can provide the digital binary signal to microcontroller 1114 via a parallel bus (e.g., a plurality of GPIO pins on microcontroller 1114), or via a serial bus (e.g., an SPI or an I2C bus on microcontroller 1114). Any of the sensors described herein may be incorporated into any of the nodes described.

Microcontroller 1114 can use CTMU to determine whether a user is touching a respective capacitive-touch sensor 1128. When a user touches a capacitive-touch sensor, the user's touch adds a small capacitance to the sensor's capacitor, which causes the current source to require a longer time duration to charge the sensor's capacitor. Microcontroller 1114 measures an amount of time it takes to charge each capacitive-touch sensor 1128, and determines whether a user is touching a respective sensor by determining whether the amount of time required to charge the sensor is greater than or less than a predetermined threshold time. Microcontroller 1114 determines that a user is touching the sensor if the time required to charge the sensor is greater than the predetermined threshold time, and determines that the user is not touching the sensor otherwise.

Microcontroller 1114 can periodically monitor the state for the various sensors of touch-sensitive user-interface 1122, for example, at approximately 15 millisecond intervals. In some embodiments, microcontroller 1114 samples the various sensors of touch-sensitive user-interface 1122 on or after the voltage from the alternating current (AC) power supply crosses the zero-voltage level, which reduces noise in the measurements from touch-sensitive user-interface 1122. If microcontroller 1114 determines that proximity sensor 1130 detects an object, microcontroller 1114 can activate a light source for touch-sensitive user-interface 1122 to allow the user to see user-interface 1122 while the user is entering a device-controlling command via user-interface 1122. Microcontroller 1114 can activate the light source, for example, by ramping up the brightness of the light source over a determinable time interval to a determinable level (e.g., to a fixed level, or to a level derived from an amount of ambient light).

Also, if microcontroller 1114 determines that a touch-sensitive sensor has detected an object's touch, microcontroller 1114 can determine a gesture based on the current state and the previous state of touch-screen user-interface 1122. For example, microcontroller 1114 can determine a current region of user-interface 1122 that the user is touching (e.g., the current state), and can determine a direction for a gesture based on a previous touch-sensitive sensor that detected an object's touch (e.g., the previous state). Once the user has completed his interaction with user-interface 1122, microcontroller 1114 can generate a gesture that indicates a speed and a direction of the user's gesture, and/or a distance traveled by the user's gesture. Thus, microcontroller 1114 may determine that the user is making an upward finger-swipe gesture or a downward finger-swipe gesture, as well as a speed and distance traveled by the finger-swipe gesture.

If the user is not swiping his finger across the surface of touch-sensitive user-interface 1122 (e.g., the previous state did not involve the user touching or swiping across user-interface 1114), microcontroller 1114 can determine a region of user-interface 1122 that the user has touched. Microcontroller 1114 can generate and store a gesture that indicates the surface portion of user-interface 1122 that the user has touched, for example, using a numeric value that indicates a vertical coordinate of the user-interface 1122 touched by the user. Processing unit 1102 can configure the power output to the light fixture to reach a light intensity that corresponds to the numeric value. Light dimmer 1100 can also include a vibrating mechanism (e.g., a vibrating motor) to provide haptic feedback to the user as the user swipes his finger across the surface of touch-sensitive user-interface 1122. This haptic feedback allows the user to feel a response that indicates the user's interaction with light dimmer 1100.

In some embodiments, processing unit 1102 periodically polls the sensor readings (e.g., at approximately 15 millisecond intervals) and/or gestures from microcontroller 1114. For example, microcontroller 1114 can send the current state of touch-sensitive user-interface 1122 to processing unit 1102, such that processing unit 1102 analyzes the current state and previous states of touch-sensitive user-interface 1122 to determine the user's gesture.

Also, processing unit 1102 can use the obtained data to select a set of rules to evaluate, and can perform an action associated with any rules whose conditions have been met. Processing unit 1102 can also select a set of remote devices that have subscribed to a piece of data (e.g., data for a detected motion and/or a detected gesture), and can send the piece of data to the selected devices using network addressing information associated with their corresponding network connections.

Light dimmer node 1100 can include one or more communication modules 1108 for communicating with external devices. Communication modules 1108 can include or be coupled to a wireless module 1110 (e.g., a Wi-Fi module, or a Bluetooth module), and/or can include an Ethernet module coupled to an Ethernet port (not shown). Device architecture 280 can also include a serial port 1112 (e.g., an RS-232 jack for a UART port), which can be coupled to an external device, and can be used by processing unit 1102 to monitor and/or control the peripheral device. The peripheral device can include a "dumb" light switch or power outlet, an appliance (e.g., an HVAC system), or any electronic or computing device that can communicate via serial port 1112.

Light dimmer node 1100 can also include power-controlling modules 1118 to control and/or regulate an output power signal, and can include a power-output controller 1116 to configure and monitor the power output by power-controlling modules 1118. Light dimmer 1100 can also include power terminals 1120 for providing the output power signal to an electrical load, such as a light fixture, an electric motor, an HVAC system, etc. In some embodiments, light dimmer 1100 implements a light switch, and power-controlling modules 1118 includes a relay 1118.1. Processing unit 1102 can configure microcontroller 1114 to close relay 1118.1 to provide power to an external load electrically coupled to power terminals 1120 (e.g., a light fixture), or to open relay 1118.1 to turn off power to the external load. Microcontroller 1114 opens or closes relay 1118.1 by configuring power-output controller 1116 to generate the electrical signals necessary for opening or closing relay 1118.1. Microcontroller can also configure power-output controller 1116 to monitor an amount of power dissipated by power-terminals 1120, for example, to periodically obtain a power measurement for an electrical load.

In some embodiment, light dimmer node 1100 can function as a dimmer (to control an average voltage to a light fixture) or as a switch (to turn on or off power to a light fixture). When operating as a dimmer, processing unit 1102 can configure triac 1118.2 to provide up to 5 amps of current to a light fixture via power terminals 1120. When operating as a switch, processing unit 1102 can configure relay 1118.1 to provide up to 15 amps of current to the light fixture via power terminals 1120. The user can toggle the functionality of light dimmer 1100, for example, by pressing and holding a finger on touch-sensitive user-interface 1122 for a predetermined time interval (e.g., 10 seconds).

When light dimmer node 1100 is configured to operate as a light switch, processing unit 1102 can close relay 1118.1 to enable power to a light fixture, and can open relay 1118.1 to turn off power to the light fixture. However, relay 1118.1 is oftentimes implemented as a mechanical switch that emits noise while opening or closing. In some embodiments, processing unit 1102 can use triac 1118.2 to silently enable or disable power to the light fixture.

When light dimmer node 1100 is configured to operate as a light dimmer, processing unit 1102 can detect a light-adjusting gesture from a user (e.g., via microcontroller 1114), and configures microcontroller 1114 to adjust a brightness level for the light fixture. For example, as the user performs an upward finger swipe on touch-sensitive user-interface 1122, processing unit 1102 can determine a brightness level for the light fixture based on the current (or most recent) position, direction, and/or velocity of the user's finger on touch-sensitive user-interface 1122. Processing unit 1102 can select the highest brightness level if the user taps on touch-sensitive sensor 1128.1, or can select the lowest (or off) brightness level if the user taps on touch-sensitive sensor 1128.n.

Processing unit 1102 can configure microcontroller 1114 to adjust the power output transmitted by triac 1118.2 to correspond to the user's desired brightness level. For example, microcontroller 1114 can configure power-output controller 1116 and triac 290.2 to clip an alternating-current (AC) waveform to produce a phase-clipped waveform that effectively reduces a brightness level for a light fixture electrically coupled to power terminals 1120.

In some embodiments, processing unit 1102 can store a programmed brightness level for the user. The user can perform an intensity-configuring gesture to program the brightness level to a desired level once. For example, the intensity-configuring gesture can include the user pressing and holding a finger (or two fingers) on touch-sensitive user-interface 1122 for a predetermined time interval (e.g., 5 seconds), and then dragging his finger (or multiple fingers on a two-dimensional capacitive-touch sensor) up or down to reach the desired brightness level. The user can turn the light on or off by tapping anywhere on touch-sensitive user-interface 1122, which configures power-output controller 1116 to enable or disable power to power terminals 1120 at the programmed lighting level. The user can also set the programmed brightness level by interacting with an application on a mobile device (e.g., a smartphone) that communicates the brightness level to light dimmer 1100. Alternatively, the user can use a web browser to load a web page hosted by light dimmer 1100, and can set the programmed brightness level using the web page.

Further, processing unit 1102 can quickly ramp up or ramp down the brightness level if the user performs a fast upward or downward finger swipe. Alternatively, processing unit 1102 can perform fine-grained adjustments to the light fixture's brightness level if the user performs a slow upward or downward finger swipe, for example, to increase or decrease the brightness level by a finer granularity than can be achieved by tapping on any of touch-sensitive sensors 1128.

Light dimmer node 1100 can use sensors 1126 to perform dynamic lighting control. Hence, light dimmer 1100 can turn on lights when the motion sensor detects a motion (e.g., when a user enters a room), and can turn off lights when no motion is detected for at least a predetermined time interval (e.g., the user has left the room). Light dimmer 1100 can also use the ambient-light sensor to auto-calibrate a dim level. For example, the dim level configured by a user can correspond to a brightness level in the room. Light dimmer 1100 can use the ambient-light sensor to adjust the phase-clipped waveform on triac 1118.2 based on the room's brightness to reach the user-configured brightness level. Hence, light dimmer 1100 can increase a power output to an aging bulb to maintain the user's desired brightness level. Also, light dimmer 1100 can adjust the phase-clipped waveform throughout the day to reach and retain the user's desired brightness level.

Light dimmer node 1100 can also use motion sensor 1126 as part of a security system, or as part of an HVAC system. A security system can use motion detected by the motion sensor to compile a historical motion-sensing record. The security system can trigger a security measure if motion is detected when a user is not expected to be nearby, such as to record video from a camera in the same room as light dimmer 1100. An HVAC system can transition between an "active" (e.g., occupied) and "standby" (e.g., vacant) state based on whether motion has been detected via the motion sensor, or other motion sensors within the HVAC zone. The HVAC system can set the zone to a user's comfort level when in the "active" state, and can set the zone to a low-energy configuration when in the "standby" state.

Unlike typical light dimmers, light dimmer 1100 can also be used in a master/slave configuration to control one or more light fixtures. Typical light dimmers include a physical slider that controls a light fixture's state, and the state can only be changed when a user manually slides the physical slider up or down. Another dimmer cannot be used to control that same light fixture because it would interfere with the signals from the first dimmer. In some embodiments, light dimmer 1100 can have its local state modified either manually by a user swiping a finger over the surface of touch-sensitive user-interface 1122, or from a remote network device. For example, light dimmer 1100 can receive a command from a remote device (e.g., a central controller, or a remote light dimmer) that indicates a target output voltage or brightness level. Alternatively, light dimmer 1100 can process rules that configure a new brightness level for a light fixture. Light dimmer 1100 can detect an event or can receive an event that triggers the rule (e.g., a local event, or an event received from a central controller or a remote light dimmer), and processes the rule's action description to adjust the light fixture's brightness level.

In some embodiments, processing unit 1102 can control a light fixture that is not electrically coupled to power terminals 1120. When processing unit 1102 detects a gesture event performed by the user (e.g., via microcontroller 1114), processing unit 1102 can send the gesture event to a remote light dimmer, a power outlet, or an interfacing device that has subscribed to events from the local light dimmer. When the remote interfacing device receives the gesture event, the remote interfacing device can use the event information to control power to a light fixture based on a rule stored in the device's local rule repository.

In some embodiments, power-output controller 1116 also monitors an amount of current, an amount of power, and/or a phase of the power being transmitted via power terminals 1120. Microcontroller 1114 can calibrate power output controller 1116, based on the measured values, to stabilize the power transmitted via power terminals 1120. If microcontroller 1114 detects a change in the electrical load, for example due to a dimming light fixture, microcontroller 1114 can adjust power output controller 1116 to compensate for the change in the electrical load to reach a desired power output. Thus, microcontroller 1114 can use power output controller 1116 to implement a feedback loop that adjusts power to a light fixture to ensure a steady (non-fluctuating) light intensity, even as the light fixture ages over time.

Typical dimmers don't always work well with all bulb types. Using an incompatible bulb in a "dimmed" mode can cause the bulb to not emit a sufficient amount of light, or may cause the bulb to emit a "humming" noise. In some embodiments, light dimmer 1100 can detect when a light bulb is not compatible with a light-dimming functionality, when a light bulb has failed, or has started to fail. If a failed or failing bulb is detected, light dimmer 1100 can alert the user to replace the bulb. If an incompatible bulb is detected, light dimmer 1100 can alert the user that the bulb cannot be dimmed, and/or can transition into a "light switch" mode using either mechanical relay 1118.1 or solid-state triac 1118.2. Light dimmer 1100 can also use an energy-monitoring functionality of 1116 to determine a lowest possible dim level for a light bulb, and configures this dim level as a minimum "dim" level for the light fixture. Light dimmer 1100 can turn off power to the light fixture if a user issues a command to lower a light level below this minimum dim level.

In some embodiments, touch-sensitive user-interface 1122 can include a display device (e.g., a liquid crystal display (LCD) device). Also, touch-sensitive sensors 1128 can include a vertical array of capacitive-touch sensors (e.g., as displayed in FIG. 11), or can include a two-dimensional array or grid of capacitive-touch sensors (not shown). Touch-sensitive sensors 1128 can detect, in real-time, when a user is touching touch-sensitive user-interface 1122 with one or more fingers, and display device can display near-real time feedback to the user while the user interacts with user-interface 1122. For example, the display device can display an updated dim level as the user is performing a gesture to adjust a light fixture's dim level. The display device can also display other information and/or other interactive UI elements to the user. For example, light dimmer 1100 can use the display device to present a device-configuring menu to the user, which allows the user to select a Wi-Fi network, and to enter Wi-Fi credentials for a secured network. The device-configuring menu can also allow the user to register a password that needs to be entered when making changes to the device, and can allow the user to configure whether configuration changes can be made over the Wi-Fi network. Light dimmer 1100 can also use the display device to display a device-provisioning menu, which can add light dimmer 1100 to controller (e.g., a server) that monitors, configures, and/or controls one or more devices in a smart-home network.

In some embodiments, the user can switch between the dimmer's default screen (which, for example, can indicate a current lighting level), the device-configuring menu, and the device-provisioning menu by performing a side-swipe gesture. In response to detecting a side-swipe gesture, light dimmer node 1100 can animate a transition from one display screen to the next. This animation can include a screen-sliding effect, which slides at a horizontal rate that matches the user's side-sliding gesture. When the user selects a field of a display screen, light dimmer node 1100 can present a data-input UI element that allows the user to enter characters into the input field. The data-input UI element can include or resemble a keyboard, a slider, an input wheel, or any other graphical user interface (GUI) element now known or later developed.

Light dimmer node 1100 can also include a universal serial bus (USB) port 1132 (e.g., via a micro-USB connector), which can be used to perform diagnostics on light dimmer node 1100, to load firmware to light dimmer node 1100, or to provision light dimmer node 1100. A user can perform diagnostics, for example, by interfacing a personal computing device (e.g., laptop) to light dimmer node 1100 via USB port 1132, and running diagnostics software on the personal computing device. The diagnostics software can aggregate information from light dimmer node 1100, can analyze this information to present configuration information to the user, and to detect or diagnose any malfunctions.

The user can provision light dimmer node 1100 using USB port 1132, for example, by attaching a USB drive (e.g., a flash drive) into USB port 1132, such that this USB drive contains configuration and/or provisioning parameters (e.g., Wi-Fi parameters) for light dimmer 1100. The user can interact with light dimmer node 1100 via a web page hosted by light dimmer 1100, or via a pre-installed application on a personal computing device that interfaces with light dimmer node 1100. When light dimmer node 1100 detects configuration information in the USB drive, light dimmer node 1100 can display a confirmation prompt to the user via the web page or application, which asks the user to confirm that he wishes to load the configuration information from the USB drive. If the user has set an administrator password, light dimmer node 1100 can prompt the user to enter his password before loading the configuration information. In some embodiments, touch-sensitive user-interface 1122 can include a display device, which the user can interact with to confirm that he wishes to perform diagnostics on light dimmer node 1100, to load firmware to light dimmer node 1100, or to provision light dimmer node 1100.

Figure 12:
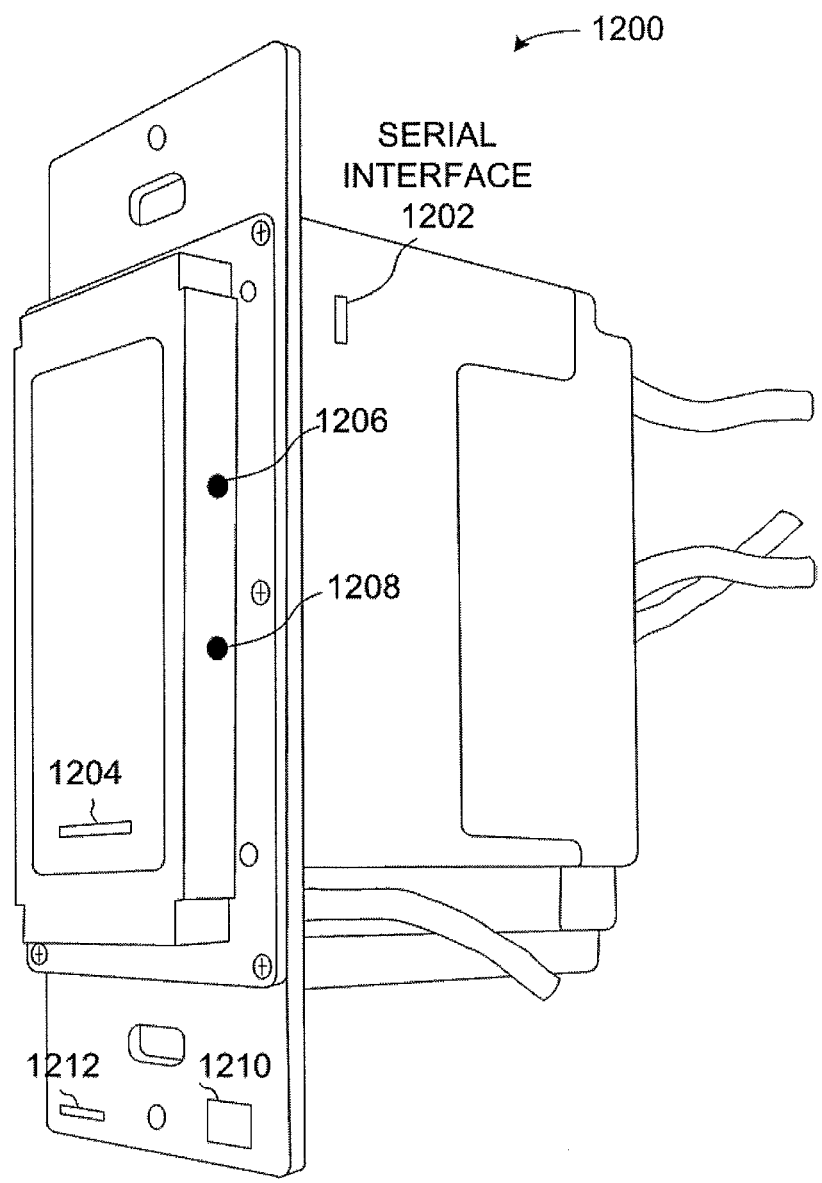
FIG. 12 is a side perspective view of an exemplary light dimmer node.

FIG. 12 illustrates an angled view of an exemplary light dimmer node 1200. Specifically, light dimmer node 1200 can include a serial interface 1202 (e.g., an I2C interface), LED indicators 1204, a reset button 1206, and an "INIT" button 1208. When reset button 1206 is depressed for a predetermined time interval (e.g., 10 seconds), a microprocessor of power outlet 1200 initiates a power cycle. Also, when INIT button 1208 is depressed for a predetermined time interval (e.g., 10 seconds), the microprocessor re-initializes the device to factory settings. In some embodiments, the microprocessor can be reinitialized to factory settings by loading a factory-installed firmware image into a flash storage device of light dimmer node 1200.

LED indicators 1204 can include two LED lights of different colors. In some embodiments, LED indicators 1204 can include a red LED and a blue LED, which can each be turned on or off programmatically by a processor of light dimmer 1200. Hence, LED indicators 1204 can emit a red light, a blue light, a purple light (e.g., when both red and blue LEDs are on), or no light (e.g., when neither the red or blue LED is on). The color emitted by LED indicators 1204 can be used to indicate a network connectivity, a network packet being transmitted, a network packet being received, a power source status, or any other user-defined condition or event.

In some embodiments, the color emitted by LED indicators 1204 can indicate a status of light dimmer node 1200, such as to indicate whether a light fixture is off (e.g., by turning on the red LED, or not turning on any LEDs), whether the light fixture is on (e.g., by turning on the blue LED), or whether the light fixture is being dimmed (e.g., by turning on the red and blue LEDs to emit a purple light).

A microprocessor of power outlet/light dimmer node 1200 can also control LED indicators 1204 based on a user-defined rule, such as to implement a night light functionality by turning on both LEDs. In some embodiments, the user-defined "night light" rule can turn on both LEDs during a predetermined time of day. Alternatively, light dimmer 1200 can include a light sensor that measures the room's ambient light level. When the room's ambient light drops below a predetermined level, light dimmer 1200 can generate an event which indicates that the room is dark. Light dimmer 1200 can use this event to identify a "night light" rule that is activated by this event, and can process the rule to turn on the power outlet's LEDs.

Light dimmer node 1200 includes four terminals (illustrated as wires in FIG. 12): a load terminal, a ground terminal, a hot terminal, and a neutral terminal. Light dimmer node 1200 uses the neutral and hot terminals to power the electronics of light dimmer node 1200, and uses the load and ground terminals to provide power to an external light fixture.

Serial interface 1202 can include a 4-pin micro connector with electrical insulation, which can be used to interface light dimmer 704 with a remote device (e.g., a power outlet or light dimmer). A "smart" device can include additional features that are not included in a "dumb" device, such as a wireless module, a motion sensor, a temperature sensor, etc. The smart device can send signals to a dumb device, to allow the dumb device to perform the same functions of a smart device. For example, dumb devices can access a network connection from a smart device. Also, smart devices can send sensor readings from a sensor to dumb devices that don't include the sensor.

In some embodiments, light dimmer node 1200 can include an optical code 1210 and a secret number 1212 printed over a portion of light dimmer node 1200. For example, optical code 1210 and secret number 1212 can be printed over a portion of light dimmer node 1200 that is to be covered by a faceplate for light dimmer node 1200. For example, light dimmer node 1200 can use a built-in wireless device to host a closed Wi-Fi network, which the user can use to interface a personal computing device (e.g., a smartphone) to light dimmer node 1200. The user can gain access to the closed Wi-Fi network by entering secret number 1212 as the secret key.

As another example, light dimmer node 1200 can host an open Wi-Fi network, which the user can use to establish a network connection between his personal computing device and light dimmer node 1200. Alternatively, light dimmer node 1200 can use any wireless technology to establish a peer-to-peer network connection with the personal computing device, such as near field communication (NFC) or Bluetooth Low Energy. The user can run an application on his personal computing device to send and/or receive data to/from light dimmer node 1200 over the network connection. The user can scan optical code 1210 using an image sensor on his personal computing device, and the device signs the data sent to light dimmer 1200 using information encoded in optical code 1210 (e.g., secret number 1212). The application can use optical code 1210 to generate a one-way secure hash value that is used to sign data. Alternatively, the application can use optical code 1210 during a challenge-response handshake protocol with light dimmer node 1200 that establishes a secure connection with light dimmer node 1200. During this handshake protocol, the application and light dimmer node 1200 can exchange digital signatures that are then used to sign any data transferred between the two devices.

In some embodiments, a plurality of unprovisioned devices (e.g., power outlets, light dimmers, thermostats, etc.) can each host an unsecured Wi-Fi network with a common Service Set Identification (SSID). The provisioning application on the user's personal computing device can provision one device at a time via the common SSID. After light dimmer 1200 becomes provisioned, light dimmer 1200 will bring down its Wi-Fi network, which can allow the application to connect with any other unprovisioned device via the common SSID. The application will not detect a Wi-Fi network with the common SSID if no unprovisioned devices remain.

In some embodiments, an access point can host an additional Wi-Fi network with an SSID that is dedicated for device provisioning. Each device can be pre-configured to connect to the device-provisioning Wi-Fi network by default. The application can detect an unprovisioned device by joining this device-provisioning SSID, or by querying the access point while connected to the main Wi-Fi network (via a different SSID). While provisioning light dimmer node 1200, the application can configure light dimmer node 1200 to connect to the main Wi-Fi network. After light dimmer 1200 becomes provisioned, light dimmer node 1200 will disconnect from the device-provisioning Wi-Fi network, and connects to the main Wi-Fi network.

Alternatively, when light dimmer node 1200 joins the device-provisioning Wi-Fi network of the access point, the access point can redirect the network connection for light dimmer node 1200 to a device-provisioning server that is in charge of provisioning devices into the network. The device-provisioning server can store pairs of optical codes and secret keys for each device that is to be provisioned or has been provisioned, and uses this information to provision light dimmer node 1200. If the server does not have an optical code and secret key stored for light dimmer node 1200, the device-provisioning server can notify a system administrator that an unrecognized device has been detected, and requests the administrator to scan optical code 1210 and secret key 1212 from light dimmer node 1200 into the system.

Light dimmer node 1200 can also include a universal serial bus (USB) interface that allows a user to upload a configuration file. The USB interface can be accessed from behind a faceplate, such as on a side of light dimmer node 1200. The USB signals can be isolated from fluctuations in the light dimmer's power signals, for example, by using opto-couplers to prevent variations on the power signals from causing fluctuations on the USB signals.

Figure 13:
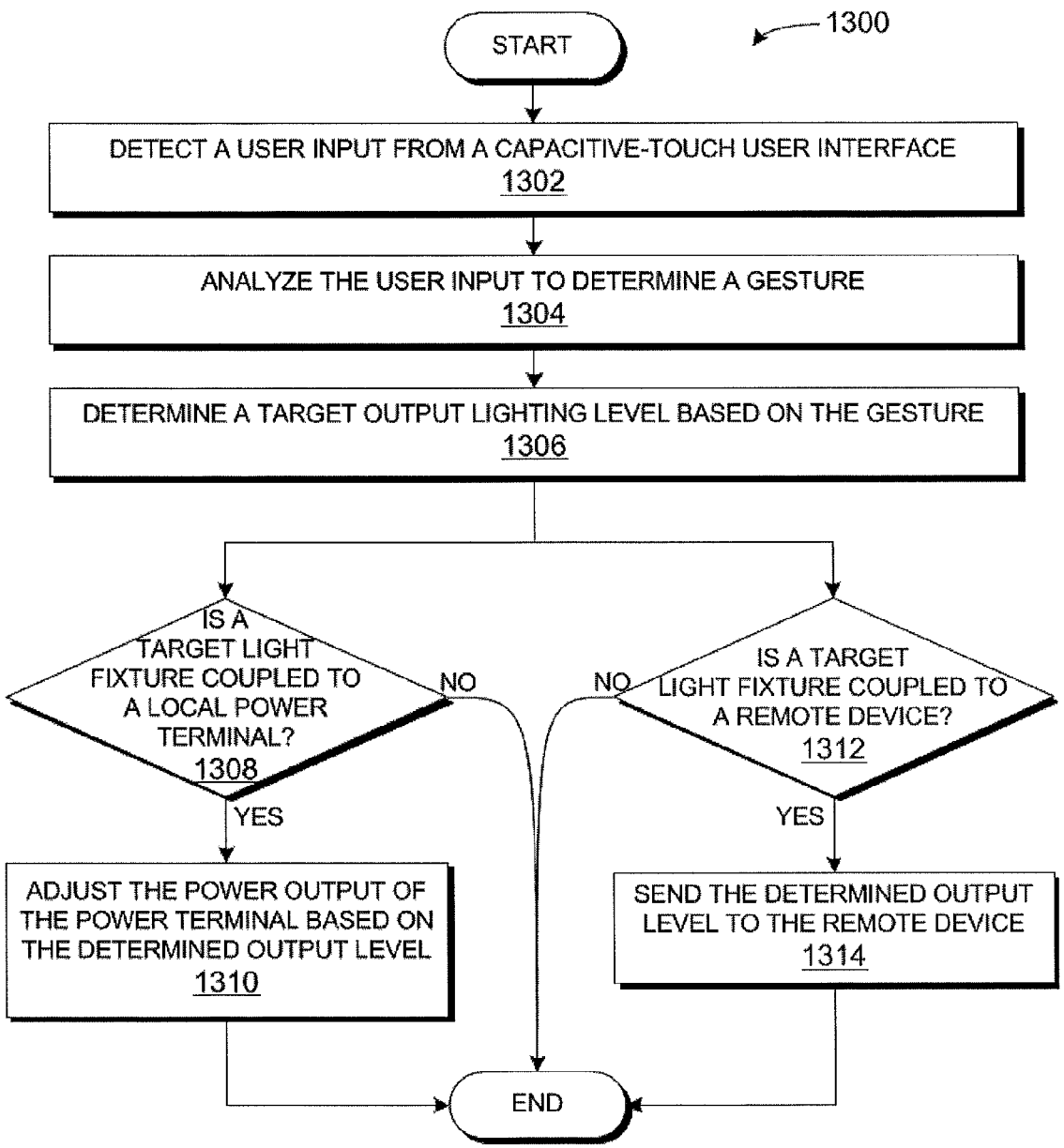
FIG. 13 is a flow chart illustrating a method for processing a user input for adjusting a brightness level.

FIG. 13 presents a flow chart illustrating a method 1300 for processing a user input for adjusting a brightness level. During operation, the light dimmer node can detect a user input from a capacitive-touch user interface (operation 1302), and analyzes the user input to determine a gesture (operation 1304). The gesture can include, for example, a tap gesture, a touch-and-hold gesture, and a swipe gesture. The tap gesture can include a touch-screen coordinate. The touch-and-hold gesture can include a touch-screen coordinate, and a time duration during which the touch screen was touched. The swipe gesture can include a starting coordinate, an ending coordinate, and a speed (or time interval) for the swipe gesture. The system then determines a target output lighting level based on the gesture (operation 1306). In some embodiments, the light dimmer node samples the capacitive-touch user interface on or after the voltage from the alternating current (AC) power supply crosses the zero-voltage level, which reduces noise from the capacitive-touch user interface.

In some embodiments, a light fixture can be coupled directly to the local light dimmer node. A light fixture can also be coupled to a remote light dimmer node or power outlet node that provides power to the light fixture. In some embodiments, the local light dimmer node can control power to multiple light fixtures by sending commands to one or more remote devices that provide power to these light fixtures. Hence, the light dimmer node can determine whether a target light fixture is coupled to a local power terminal (operation 1308), and if so, can adjust the power output of the power terminal based on the determined output level (operation 1310). The light dimmer node (e.g., acting on instructions from the digital hub) can also determine whether a target light fixture is coupled to a remote device (operation 1312), and if so, the light dimmer node can send the determined output level to the remote device (operation 1314).

Figure 14:
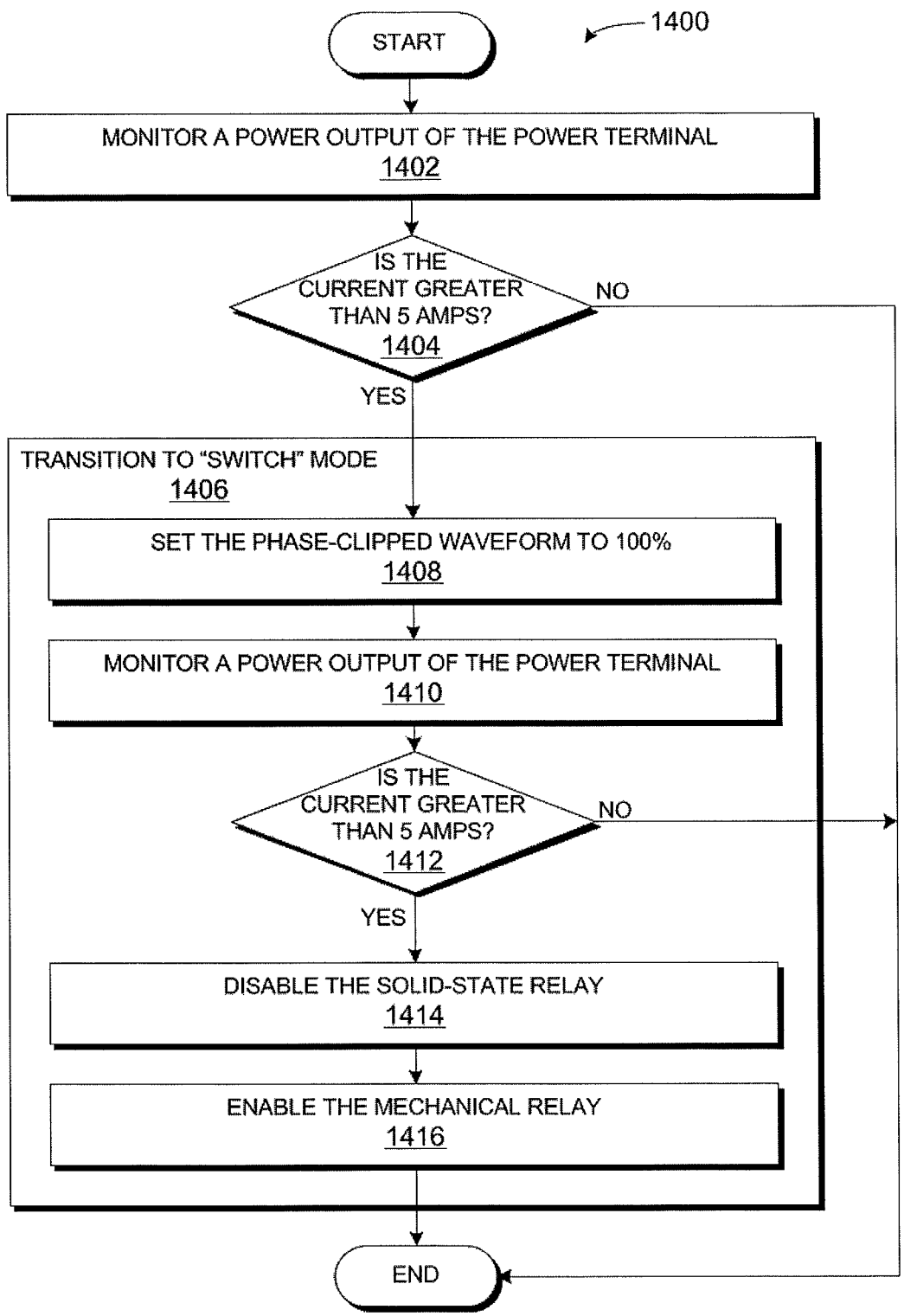
FIG. 14 is a flow chart illustrating a method for automatically adjusting an operation mode to accommodate a light fixture.

FIG. 14 presents a flow chart illustrating a method 1400 for automatically adjusting an operation mode to accommodate a light fixture. Recall that a light fixture includes a mechanical relay that can output 15 amps of current, and includes a solid-state relay that can output 5 amps of current. The mechanical relay can be used to enable or disable power to an external load, whereas the solid-state relay can be used to adjust an amount of power that is provided to the external load. During operation, the light dimmer node can monitor a power output of the power terminal (operation 1402), and determines whether the current is greater than 5 amps (operation 1404). If the current exceeds 5 amps, the light dimmer node can transition to a "switch" mode to ensure that the external load does not draw more power than can be provided by a relay.

Some light fixtures may consume more than 5 amps of current while in dimming mode, but may consume less than 5 amps of current when completely on. Hence, during operation 1406, the light dimmer can transition to "switch" mode by setting the phase-clipped waveform to 100% (operation 1408). The light dimmer node can monitor a power output of the power terminal once again (operation 1410), and again determines whether the current is greater than 5 amps (operation 1412). If setting the phase-clipped waveform to 100% does not drop the current to below 5 amps, the light dimmer can disable the solid-state relay (operation 1414), and enables the mechanical relay to provide up to 15 amps of current to the power terminal (operation 1416).

Figure 15A:
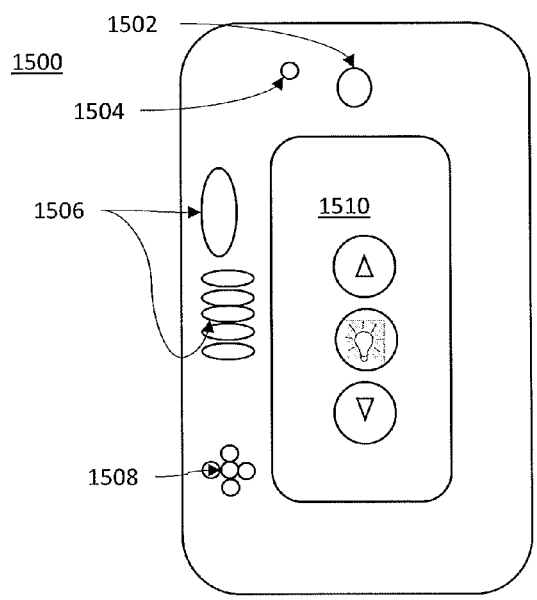
FIGS. 15A-15C illustrate variations of nodes configured as an integrated sensor panel.
Figure 15C:
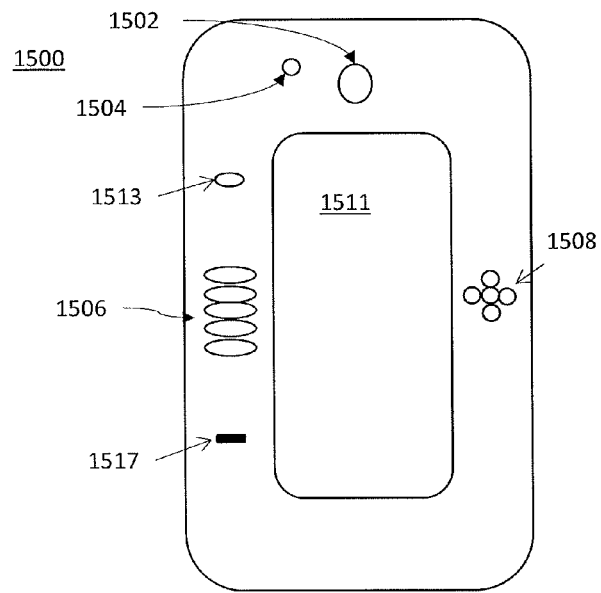

Another variation of a node, as mentioned above, is a wall-mounted, interactive sensing and audio-visual node device for a networked living/working space. Any of the exemplary nodes described above (e.g., power outlet nodes, light switch nodes, light dimmer nodes, etc.) may be wall-mounted, and may also be interactive sensing and audio-visual node devices for a networked living/working space. For example, FIGS. 15A and 15C schematically illustrate another variation of a wall-mounted, interactive sensing and audio-visual node device for a networked living/working space. In general, these devices are configured to be mounted onto a wall, and particularly over a power box in a wall (or ceiling or floor). These devices also typically include a plurality of sensors of different modalities (e.g., generating different characteristic data streams), as well as a wireless transmitter/receiver for transmitting the data stream and receiving instruction (e.g., from a digital hub).

As mentioned, a wall-mounted sensing and audio-visual node device may be configured to fit (e.g., retrofit) over a light switch and/or power outlet, or be mounted directly to (or in) a wall, including (but not limited to) in a power box connected to a wall power line. The wall-mounted sensing and audio-visual node devices described herein may also be referred to as an "integrated sensor panel" that can be used both for sensing one or more preferably more parameters and for displaying (and in some cases, interactively displaying) information. In general, these devices may communicate directly with other node devices (e.g., in a mesh) and/or with a digital hub, as discussed above. As such, they may be securely connected to the internal network with other nodes and/or hub, and authenticated as described above.

Figure 15B:
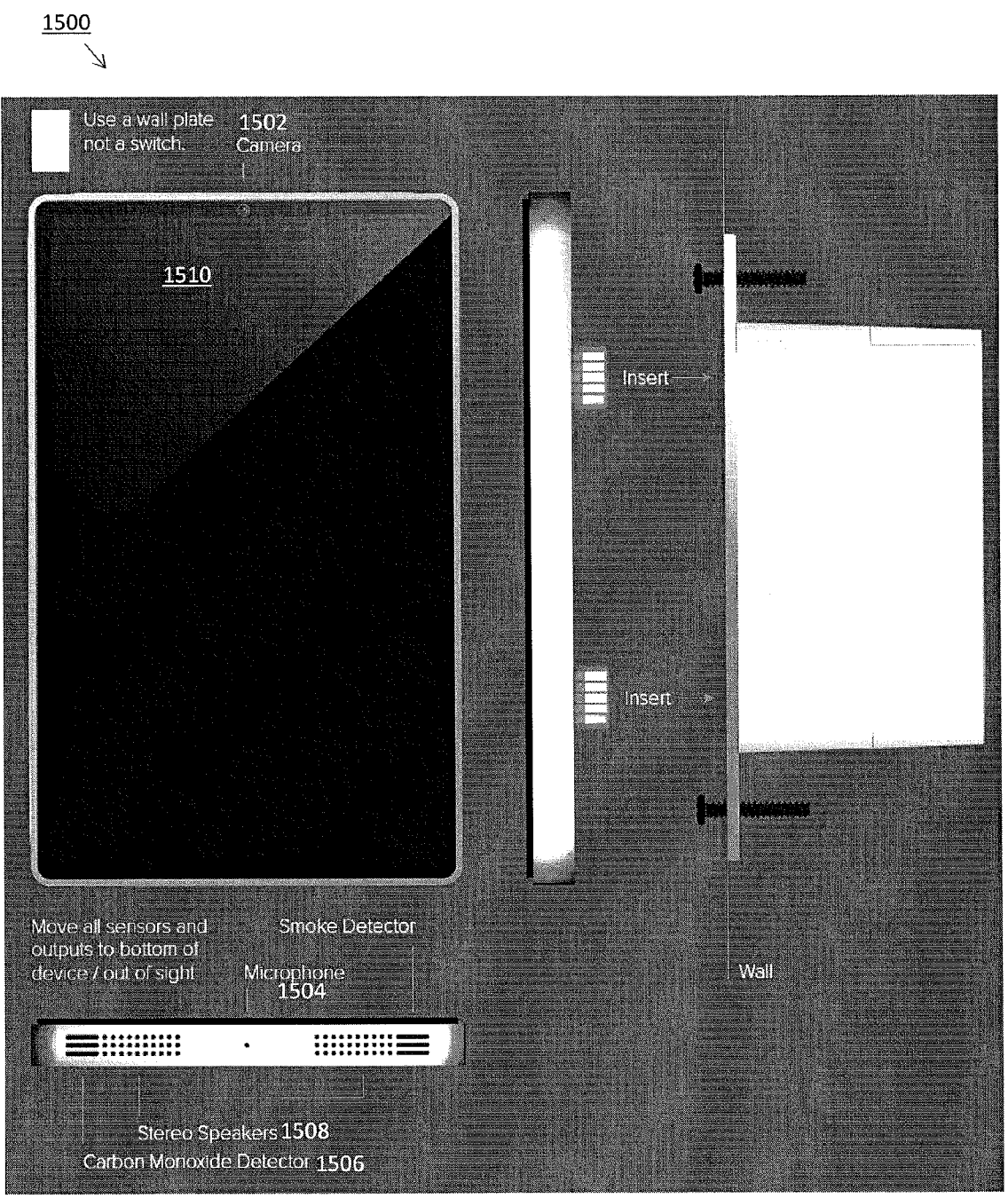
Figure 15G:
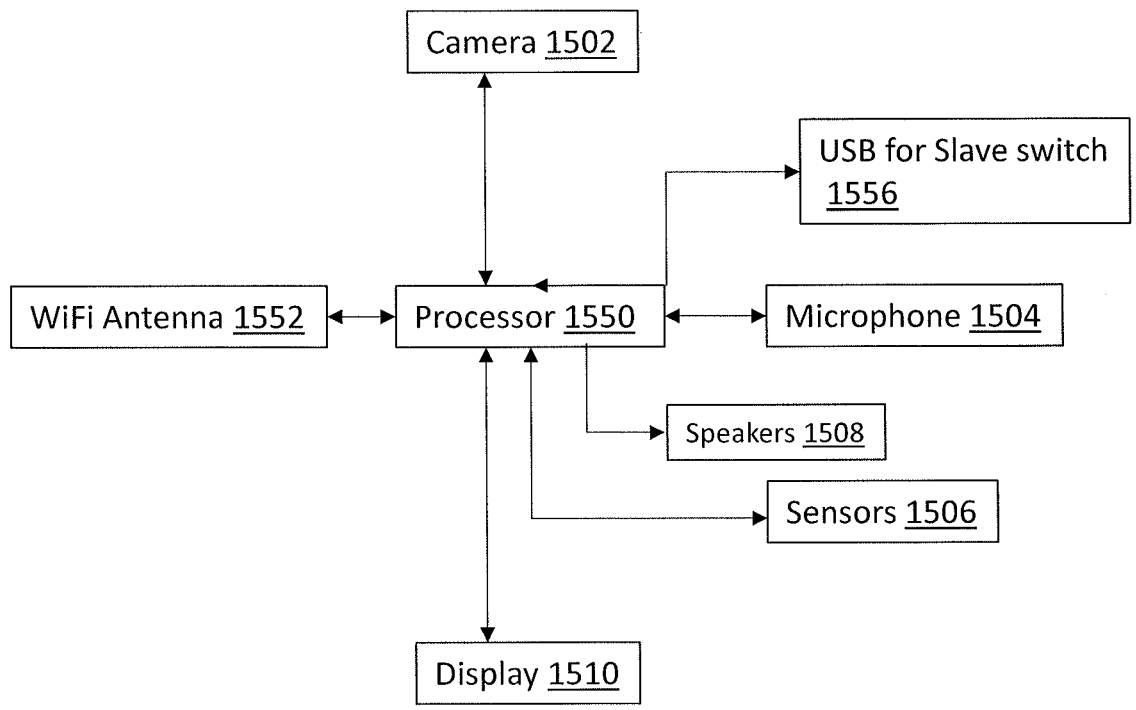
FIG. 15G illustrates a functional block diagram according to FIGS. 15A-15F.
Figure 15I:
FIGS. 15H-15K show exemplary displays for the wall-mounted interactive sensing and audio-visual nodes shown in FIGS. 15A-15C.

FIG. 15A shows a variation of an integrated sensor panel (a wall-mounted, interactive sensing and audio-visual node device for a networked living/working space). FIG. 15C illustrates another example of an integrated sensor panel (e.g., a wall-mounted, interactive sensing and audio-visual node device for a networked living/working space, or "node"). In FIG. 15A, the integrated sensor panel 1500 is similar in size to a light switch plate. The front of the panel includes a camera 1502, microphone 1504, detectors 1506 e.g. smoke and carbon monoxide, a speaker 1508, and a LED display 1510. FIG. 15B illustrates another variation of an integrated sensor panel 1500 that may be inserted and/or over into an existing electrical power receptacle (power box). The panel 1500 is similar in size to a light switch cover having depth. The microphone 1504, detectors 1506, and speaker 1508 have been moved from the front panel (when compared to FIG. 15A) to the side or bottom of the panel. The display 1510 is the front of the panel. In some variations the integrated sensor panel may include an optional data storage unit or local processor that enhances the system's capability, as described above for the hub (FIG. 1C). In FIG. 15C, the node includes an opening for a light switch 1511, and is configured as a faceplate covering the power box into which a switch is also positioned. In FIG. 15C, the front of the panel (faceplate) includes a camera 1502, microphone 1504, air quality sensors/detectors 1506 e.g. smoke and carbon monoxide, a speaker 1508, and a light sensor 1513, as well as a temperature sensor 1517.

FIGS. 15D and 15E illustrate variations of the integrated sensor panel 1500 that include a slave switch 1512. FIG. 15D is similar in size to a 2 gang light switch plate and has one slave switch 1512. FIG. 15E is similar in size to a 2 gang light switch plate and has one slave power outlet 1514. FIG. 15F is similar in size to a 3 gang light switch plate and includes two slave switches 1512. Although the integrated sensor panel 1500 is illustratively described in the leftmost gang position, the panel may be placed in any of the gangs. The integrated sensor panel 1500 acts as a master switch and may control the slave switch 1512 or slave power outlet 1514. The slave switch 1512 may control appliances plugged into a power outlet or hardwired appliances, e.g. fans, air conditioning, etc. A slave power outlet 1514 provides direct control of plugged in appliances.

The concept may be extended to any multiple gang switch unit. In variations, there may be additional integrated sensor panels.

FIG. 15F is an illustrative example of a block diagram of the integrated sensor panel according to FIGS. 15A-15E. A controller 1550 is in bidirectional communication with a Wi-Fi antenna 1552, an image processor 1554, USB port for the slave switch 1556, speakers 1508, microphone 1504, gas detector 1506, and a display 1510. The sensors 1506 may measure directly or indirectly gas, visible light, audio, or motion.

Figure 15H:
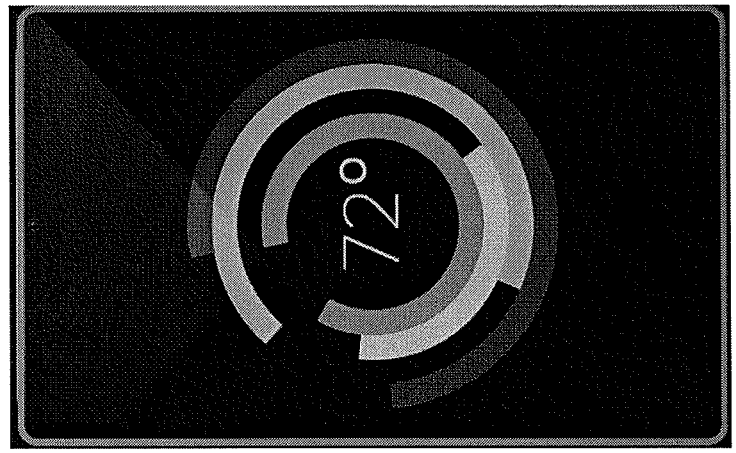
Figure 15K:
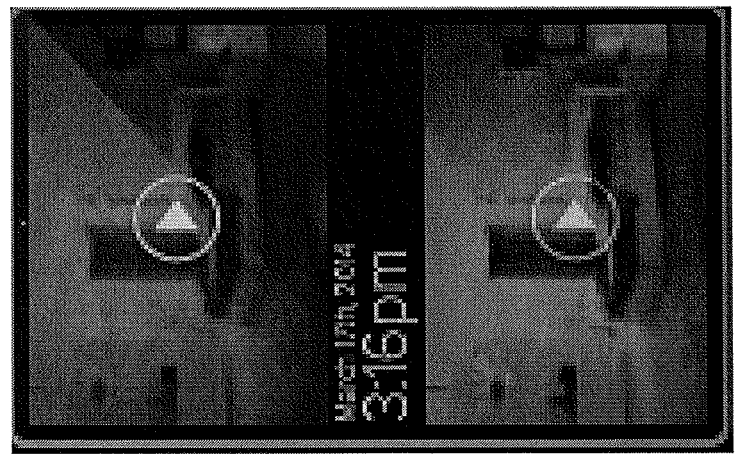
Figure 15J:
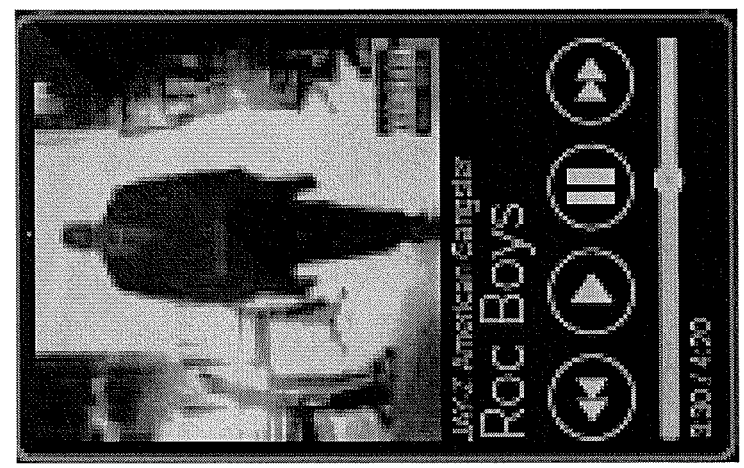

FIGS. 15H-15K illustrate various displays that may be shown on a sensor panel (wall-mounted, interactive sensing and audio-visual node device for a networked living/working space). In general, the display 1510 may be a touch capacitive display or an LED display. An LED display may show single function control, e.g. volume or temperature control. A touch capacitive display may show room health statistics, e.g. temperature, air quality, and occupation level, as shown in FIG. 15H. The integrated sensor panel 1500 may have access to other environment customization features. e.g. intercom 1510a (exemplary display shown in FIG. 15I), music 1510b (exemplary display shown in FIG. 15J), and surveillance 1510c (exemplary display shown in FIG. 15K). To illustrate, in intercom mode, the user of the integrated sensor panel has audio or visual from another location on site. In music mode, the user can access a playlist or change the volume from a stereo system, laptop, etc. In surveillance mode, the user has audio and visual access to a room that requires monitoring.

In one variation, the gas detector 1506 is a catalytic bead sensor. The sensor is used detect and measure combustible gases and vapors from 0-100% LEL (lower explosive limit). The sensor is less sensitive to temperature and humidity effects and offers repeatable performance. It is susceptible to poisoning and inhibition from some gases, which may decrease its sensitivity or damage the sensor.

In another variation, the gas detector 1506 is an electrochemical gas sensor that measure the concentration of a target gas by oxidizing or reducing the target gas at an electrode and measuring the resulting current. The sensor is used for the detection of toxic gases at the PPM level and for oxygen in levels of percent of volume. The toxic gases include but are not limited to carbon monoxide, hydrogen sulfide, sulfur dioxide, nitrogen dioxide, chlorine.

In another variation, the gas detector 1506 is a non-dispersive infrared absorption sensor. The sensor is used for the detection of methane, carbon dioxide, and nitric oxides. It is not susceptible to poisons and can be made specific to a particular target gas.

In another variation, the gas detector 1506 is a metal oxide sensor. The sensor is used for the detection of combustible gases, chlorinated solvents, and some toxic gases. The toxic gases include but are not limited to carbon monoxide and hydrogen sulfide. Sensor performance is affected by the output of the MOS sensors which varies logarithmically with the gas concentration, oxygen concentration, humidity, and temperature.

In another variation, the gas detector 1506 is a photoionization detector. The sensor is used for situations where high sensitivity, e.g. sub-PPM level, and limited selectivity, e.g. broad range coverage, is desired. This gas sensor is used for the detection of volatile organic compounds (VOCs), e.g. benzene/toluene/xylene, vinyl chloride, and hexane. PID performance is affected by sensor drift and humidity.

The aforementioned variations may include temperature and humidity compensation to improve accuracy. To illustrate, high humidity results in condensation at the walls of a structure, e.g. house or office building. Damp buildings may support the growth of mold and bacteria on indoor surfaces thereby increasing the levels of mold, bacteria, and their byproducts in indoor air. The level of indoor air humidity affects the indoor levels of house dust mites and house dust mite allergens.

For carbon dioxide sensing, the sensors 1506 may be semiconductors, solid electrolytes, optic fibers laser diodes, and non-dispersive IR (NDIR). NDIR sensors may be selected as they are stable and very robust against interference by other air components.

For carbon monoxide, the sensors 1506 may be electrochemical and MOS.

Wireless Access Points Fed by Power Line Communication

As mentioned above, any of the nodes described herein may also be configured to perform as wireless access points that are fed by power line communication.

Standard types of communication networks, such as a wireless local area network (WLAN) and a hard-wired local area network (LAN) are commonly used to achieve interconnectivity. In WLANs, radio frequencies, as opposed to physical connectors, serve as the means for communication between devices. Accordingly, WLAN set-up, expansion, and take down all require minimal time and physical effort because no wiring or significant renovation is involved. In contrast, a hard-wired LAN is formed with dedicated cables, wires, or the like that interconnect devices to each other within a localized area. Depending on the size and complexity of the LAN, set up or installation can be cumbersome and costly. There are, however, a few key advantages of hard-wired networks that perpetuate their use; greater security, reliability, and performance at speeds much faster than their wireless counterparts.

In general, a wireless access point allows the creation or extension of a wireless local area network (LAN) by wirelessly communicating with a plurality of client devices (each having a Wi-Fi connectivity). When setting up a wireless network, an access point may be connected, e.g., via Ethernet connection, to a router using a wired network (although the router may be an integral component of the access point), and may also connect to (or include) an Ethernet switch and/or broadband modem, and may ultimately connect to an internet service provider (ISP) to get internet access. The wireless access point (or access points when covering multiple regions/zones) may be positioned within a habitable structure to provide optimal wireless access throughout the structure. Typically, one disadvantage in setting up an access point in this manner is the requirement that it be hardwired (e.g., via Ethernet connection) to the source of the internet connection (which may include a switch). Thus, if one or more wireless access points are set up through a building, each access point (AP) is typically connected by cables. However, pulling cable can be expensive and difficult.

Described herein are wireless access points that may be integrated into existing buildings (habitable structures such as homes, apartments, offices, etc.), including integrating into an existing power box within a wall (e.g., wall, ceiling, floor, etc.), and connect via power line communication to provide internet connectivity. Power line communications can be used to interconnect devices using the existing electrical wiring in the home. This may allow connection between, for example, the wireless access point in one location and a virtual router in another location, without running dedicated network cables between the two. A widely deployed power line networking standard is from the HomePlug Powerline Alliance (HomePlug AV).

In general, described herein are power receptacle wireless access point (AP) devices that including a wall power input, typically configured to connect to a power line, a power line communication (PLC) circuit that is configured to receive data from and transmit data on a power line connected to the wall power input, at least one antenna, and a wireless AP circuit connected to the PLC circuit, the wireless AP configured to receive data from the PLC circuit and to wirelessly transmit the data using the at least one antenna, and further configured to receive wireless data on the at least one antenna and to transmit the received data to the PLC circuit. In particular, described herein are power receptacle wireless access point devices that are configured specifically to fit into a standard power box within a wall, floor or ceiling, and convert an otherwise "standard" outlet, switch, etc. into a wireless access point, without requiring a cable connection to the access point.

Power line communication (PLC) may also be described as broadband power line (BPL) networking and mains connection networking, and may utilize existing electrical wire or power lines installed within a house or building structure to form a network. Wires or cables that transmit or distribute electrical power are used to simultaneously transmit or communicate data, including voice and video, by using modulation. As mentioned above, a modem can be used to superimpose a modulated radio frequency (RF) carrier signal between 1.8-86 MHz at low energy levels on an alternating current (AC) signal with a frequency range of about 50-60 Hz that is carried by a typical power line. The RF carrier signal can then be demodulated and extracted at another location downstream along the power line. Network-capable devices coupled to components used to establish power line communications can achieve interconnectivity that may rival the network security afforded by LANs. Power line communications can be used for many types of applications, including, but not limited to, interconnecting computers, peripherals, and entertainment devices, and the like; providing internet access; and enabling home automation, VoIP, IPTV, HDMI, and VoD.

A computer-enabled device ("networking device") may form or join a PLC network by connecting to a PLC adapter with access to the PLC network or a power line that will be used to form it. The connection between the networking device and adapter may be wired. As an example, an Ethernet cable may be used to establish the wired connection. A wireless connection is also possible and may be accomplished using a transmitter, receiver, and antenna.

Described herein are power receptacle wireless access point devices that are configured to fit over a (e.g., standard) power box within a wall, floor or ceiling, and convert them to a wireless access point that may also typically include one or more power outlet and/or switches. Thus, the functionality of the power outlet (allowing electrical device to plug into the power outlet to receive power) and/or switch (light switch, 3-way switch, dimmer switch, etc.) may be preserved.

In general, any of the power receptacle wireless access point devices described herein may include a faceplate that resembles the faceplate of a standard power outlet/light switch. The faceplate may connect over an existing outlet and/or light switch or the power receptacle wireless access point device may include one or more integrate electrical outlet(s) and/or light switches. In general, these devices may be configured to cover and/or connect to a electrical box. For example, the power receptacle wireless access point devices may include a mount configured to mount the device in or over an electrical box, such as screws, opening for screws, bracing, and the like to hold the device in and/or over an electrical box within a wall, ceiling or floor.

In use, one or more power receptacle wireless access point devices may be installed in a habitable structure. For example, multiple rooms of a structure may be equipped with power receptacle wireless access point devices on one or more outlet (e.g. power outlet, light switch, etc.) for providing wireless connectivity with the room. Thus, in general, the power receptacle wireless access point devices may include a relatively weak or low-power wireless AP circuit. In addition, the wireless AP circuit may be configured or adapted to isolate or separate from other nearby APs to prevent interference between the adjacent and/or overlapping AP. For example, the wireless AP circuitry may be configured to shift the frequency on which the particular wireless AP operates.

Any of the nodes described above may be configured as power receptacle wireless access point devices. For example, a power receptacle wireless access point devices may include one or more sensors, and/or may wirelessly communicate with a hub. In the particular case of power receptacle wireless access point devices, the device may communicate the status of the AP to the hub, traffic through the access point, packet information (volume, rate, etc.), error codes, and the like.

FIGS. 16A and 16B illustrates one example of a prior art faceplate for a power outlet 1650 and a pair of power outlets 1651. Other commercially available faceplates for power outlets may include multiple (e.g., adjacent) pairs of power outlets. In general, the devices described herein (e.g., nodes and, in particular, power receptacle wireless access point devices) may be configured to fit over or replace a standard power outlet, or replace or fit over a standard face place for a power outlet, or fit into or over a standard power box. Although the power outlets, switches, faceplates, and power boxes described herein typically correspond to NEM type standard outlets used in the U.S., the devices and system described herein may be applied to and used with any type of power outlet, including any of the known standard types: NEMA 1-15 unpolarised, NEMA 1-15 polarised, JIS C 8303, Class II, NEMA 5-15, NEMA 5-20, JIS C 8303, Class I, CEE 7/16 (Europlug), CEE 7/17, GOST 7396 C 1, BS 4573, BS 546, CEE 7/5, CEE 7/4 Schuko, BS 1363, IS 401 & 411, MS 589, SS 145, SI 32, TIS 166-2549, AS/NZS 3112, CPCS-CCC, LRAM 2073, Swiss SEV 1011, Danish 107-2-D1, CEI 23-16/VII, South Africa SABS 164-1, Brazilian NBR 14136 (2 pin), Brazilian NBR 14136 (3 pin), South Africa SABS 164-2 (2 pin), South Africa SABS 164-2 (3 pin), etc.

In FIG. 16B, a power outlet includes a pair or power receptacles 1654, each including contact openings 1659 for connecting to a complementary plug, as well as retaining elements (bracket/mounting strap 1655 and retaining screw(s) 1657) and electrical connections/contacts that include terminal screws 1670, 1671 for securing to the wall power line (e.g., ground, neutral, and hot lines). Any of the nodes described herein may include a power outlet that also includes retaining elements for retaining the device or over a power box 1680, a power receptacle 1654, and electrical connections 1670, 1671 for connecting to the wall power.

For example, FIGS. 16C-16F illustrates one variation of a power receptacle wireless access point devices (node) that is configured as a power outlet and can be positioned in an existing ('standard') electrical box for holding a power outlet in a wall, ceiling or floor. For example, FIGS. 16E and 16F illustrates a side (profile) and front perspective view of the power receptacle wireless access point devices configured as a power outlet. In this example, the device includes a "standard" (e.g., NEMA) receptacle as well as a power line communication (PLC) circuit configured to receive data from and transmit data on a power line connected to the wall power input, and a wireless AP circuit connected to the PLC circuit, as well as at least one Wi-Fi antenna connected to the wireless AP circuit. In this example, the PLC circuit, wireless AP circuit and antenna are all housed in a low-profile housing 1654 that is positioned over the electrical receptacle. The power receptacle wireless access point device also includes a wall power input (e.g., terminal screws) configured to connect to a power line in a wall box, and mounts (e.g., mounting straps 1655 and/or screws 1657) to hold the power receptacle wireless access point device in a standard electrical box in the wall. The wireless AP is configured to receive data from the PLC circuit and to wirelessly transmit the data using the at least one antenna, and further configured to receive wireless data on the at least one antenna and to transmit the received data to the PLC circuit. In general, the housing 1654 may be adapted to allow passage of RF signals (e.g., wireless signals) therethrough. In some variations the wireless antenna may be located outside of the housing (though covered by a, e.g., plastic, faceplate, or in some variations exposed).

The power receptacle wireless access point device shown in FIGS. 16E and 16F may be covered with a faceplate, as shown in FIGS. 16C and 16D. In this example the faceplate is separate from the power receptacle wireless access point device, though it may be integrated with it. In some variations a standard faceplate (e.g. having an opening for two or more power receptacles) may be used. For example the housing 1654 for the wireless AP circuitry and/or PLC circuit and/or antenna may be adapted to 'cover' or otherwise fit into the opening in a standard faceplate.

FIGS. 16G-16J illustrate another variation of a power receptacle wireless access point device, including an additional (e.g., USB port) 1690. Thus, in this example, which may otherwise be similar to the example shown in FIGS. 16E-16F, the power receptacle wireless access point device includes a connector for a cable, such as an Ethernet cable, in addition to acting as a wireless AP. The faceplate (e.g., FIGS.

16G and 16H) may include an opening allowing access to the port 1690. In some variations the port is a PoE port.

The examples of power receptacle wireless access point devices shown in FIGS. 16C-16J above may be used to replace (e.g., retrofit) an electrical outlet and include a separate faceplate. In some variations the power receptacle wireless access point device may be adapted to operate with an existing power outlet (e.g., such as the power outlet shown in FIG. 16B or other types of standard power outlets). For example, a PLC circuit, wireless AP circuit and antenna may be connected to a faceplate (e.g. around the periphery of the faceplate) or may extend from the faceplate, and may extend from the faceplate slightly (or may be flush with the faceplate). An example is shown in FIGS. 16K1 and 16L. In FIG. 16L, the faceplate includes a housing for a PLC circuit, wireless AP circuit and antenna. The faceplate may connect (e.g., via wires 1697 or other electrical connector, to the power line in the electrical box). The faceplate version of the power receptacle wireless access point device is shown with an opening for accessing a standard electrical outlet; in FIG. 16K2, the faceplate version of the power receptacle wireless access point device is shown connected to a standard outlet. In some variations, as illustrated in FIG. 16M, the faceplate includes the PLC circuit, wireless AP circuit and antenna integrated thereon, and also includes plugs 1695 for connecting the circuitry into one of the standard outlet receptacles; the faceplate can then be secured using a mounting screw 1696, as in FIG. 16L.

FIGS. 16E-16M each illustrate variations of power receptacle wireless access point devices that link to an external internet source via provide power line communication and establish wireless AP communication regions within a room or rooms. In these examples, the power receptacle wireless access point devices also leave intact (or replace with a comparable) power outlet that includes a socket for connecting an electrical device. A faceplate may be integrated or separate, and may include a hole positioned over the socket to provide physical access to the socket.

In any of these examples, the PLC circuit (e.g., PLC module) may include circuitry supporting Bluetooth or Wireless USB. Power may be provided directly from the wall line after installation. In some variations the antenna included as part of the power receptacle wireless access point device is a microstrip antenna. The antenna is generally oriented to project from the faceplate and may therefore be directional (e.g., away from the faceplate), although the radiating pattern may be directed more into the room than back into the wall.

In general, the faceplate may be manufactured of a plastic material. The faceplate may be colored (e.g., white, ivory, black, tan, etc.) to match existing faceplates, and may have a mat or glossy finish. In some variations, the faceplate may be manufactured of aluminum, with a dark anodized finish; however the faceplate may generally allow transmission of wireless signals from the included antenna(s) in the power receptacle wireless access point devices.

Figure 16N:
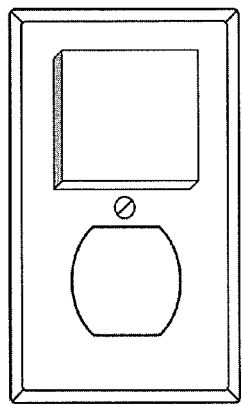
FIG. 16N is a block diagram for one variation of a power receptacle wireless access point (AP) device (node).
Figure 16N:
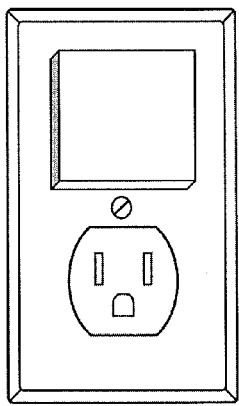
Figure 16N:
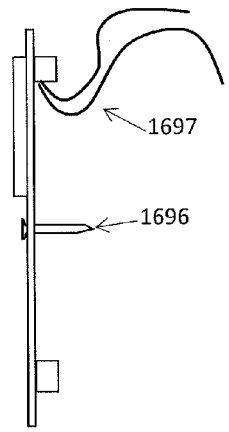
Figure 16N:
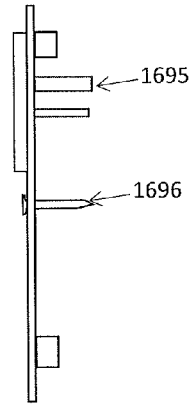
Figure 16N:
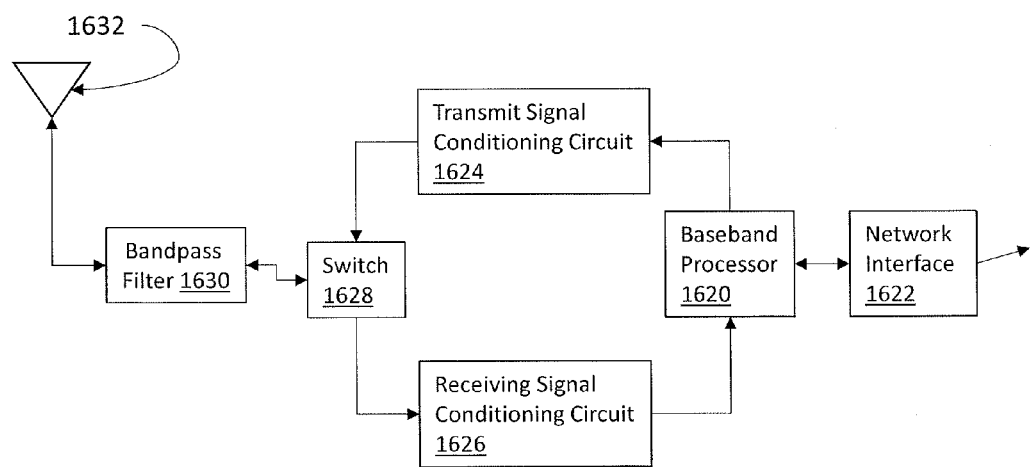

FIG. 16N is a block diagram illustrating one example of PLC circuitry. In this example, a baseband processor 1620 connects to the network interface 1622, a transmit signal conditioning circuitry 1624, and a receive signal conditioning circuitry 1626. The transmit signal conditioning circuitry 1624 and receive signal conditioning circuitry 1626 are each connected to a throw of a single-pole double-throw (SPDT) switch 1628. A bandpass filter 1630 interposes an output and the pole of the SPDT switch 1628. The output may be an antenna 1632 and/or wireless AP circuitry, an Ethernet port, etc. In some variations, the PCL circuitry supports multiple frequency ranges.

Figure 16O:
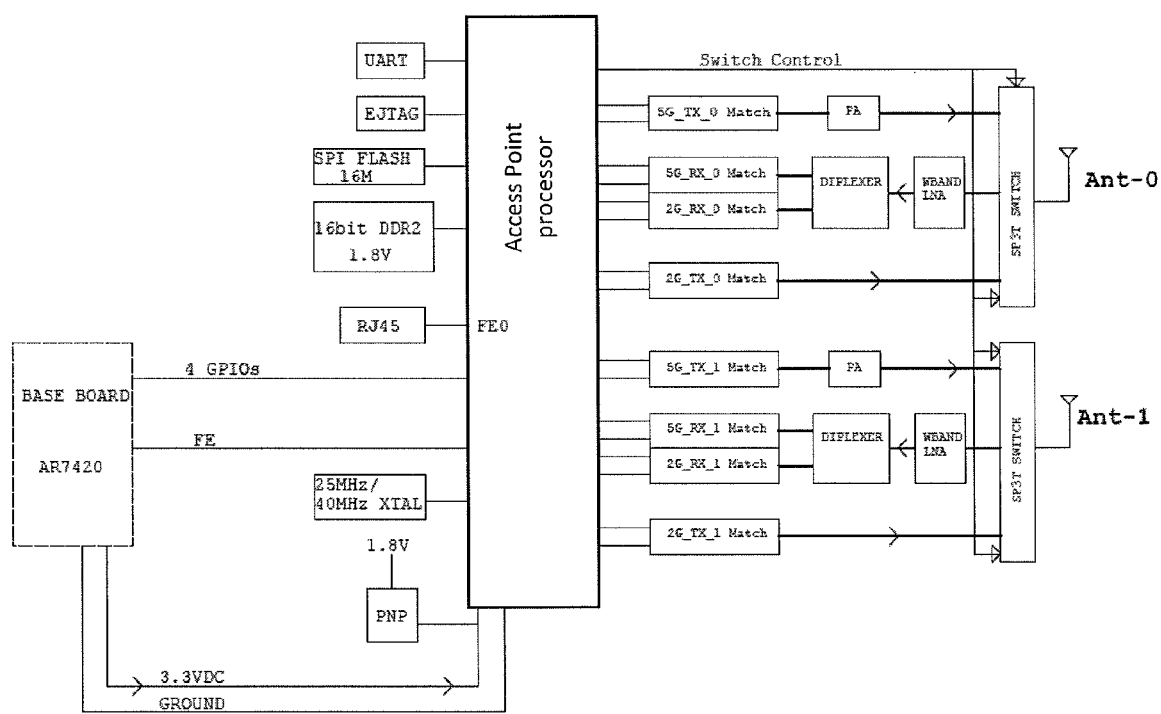
FIG. 16o is a schematic of one variation of a PLC circuit, AP circuit and antenna for a power receptacle wireless access point (AP) device (node).

FIG. 16o illustrates one example of a PLC module and an AP circuit (e.g., AP chip) that may be used with any of the power receptacle wireless access point devices described herein. In this example, the circuit also includes a pair of antennas (Ant-0 and Ant-1) connected to a processor (in this example, a processor for handling a wireless AP) with switch controls. The PLC module includes a PLC processor (in this example, AR 7420). Other processors and antennas may be used. In general, the resulting circuitry may be highly compact, as described above.

In addition to the wall-mounted variations of the power receptacle wireless access point devices described herein, also described are plug adapters, including power strip adapters, configured as power receptacle wireless access point devices. In general, power strips may not be easily used with power line communications, because the filtering and protections associated with such devices typically disrupt the PLC transmission on the line. Thus, in some variations a power strip may plug into an outlet and include the PLC circuitry and AP circuitry as well as one or more antennas, allowing the device to operate as an AP. The electrical outlets on the power strip may be 'downstream' of the connection of the PLC and AP circuitry to the input to line power, thereby allowing the power strip to easily provide the same protections (e.g., power filtering, circuit breakers, and/or limiters) of traditional power strips, while still operating as a power receptacle wireless access point devices (although devices plugged into the power strip may not use PLC. Alternatively, in some variations additional circuitry (boosters, repeaters, etc.) may be provided to allow PLC access directly through the outlets of the power line.

Figure 19A:
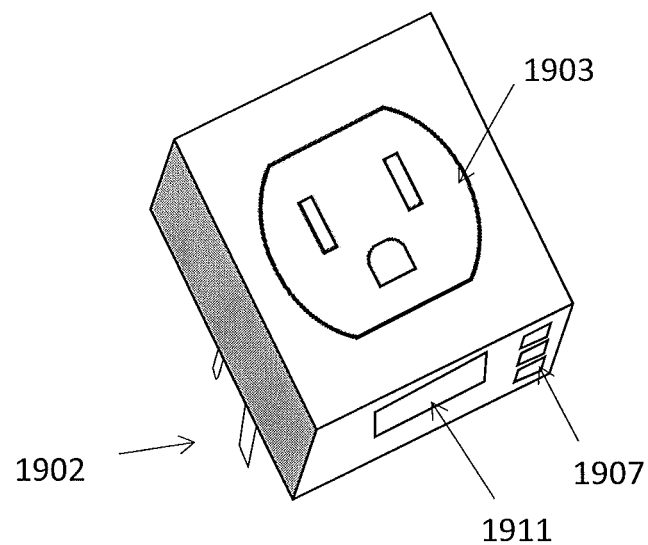
FIGS. 19A and 19B show one variation of a power receptacle wireless access point (AP) device configured as an adapter.
Figure 19B:
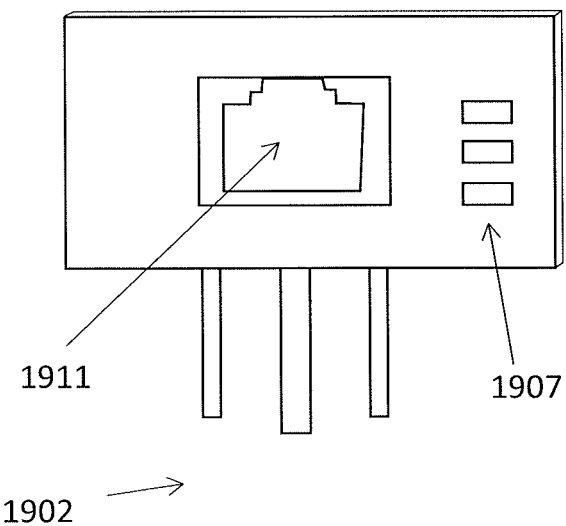

In some variations a power receptacle wireless access point devices may be an adapter that plugs into an existing electrical outlet. For example, FIGS. 19A and 19B illustrate one variation of a power receptacle wireless access point devices configured as an adapter. In this example, the device is configured to connect to an outlet and operated as an extremely low profile AP as well as including an Ethernet connection (e.g., PoE connection). The device shown in FIG. 19A (and indeed, any power receptacle wireless access point device) may include one or more indicator lights 1907 (e.g. LEDs, display, etc.) indicating the status, including the status of the wireless connectivity. FIG. 19B shows an end view of the device of FIG. 19A, showing an Ethernet port/connector 1911 on one end (e.g., top or bottom). Within the housing (not visible) is a PLC module (circuit/chip) and an AP module (circuit/chip) as well as an antenna. Two or three prongs (plug 1902) may be used to plug the device into an existing outlet. In some variations, the device may include one or more receptacles 1903 for plugs so that the outlet is not occluded by the power receptacle wireless access point device adapter.

Figure 17A:
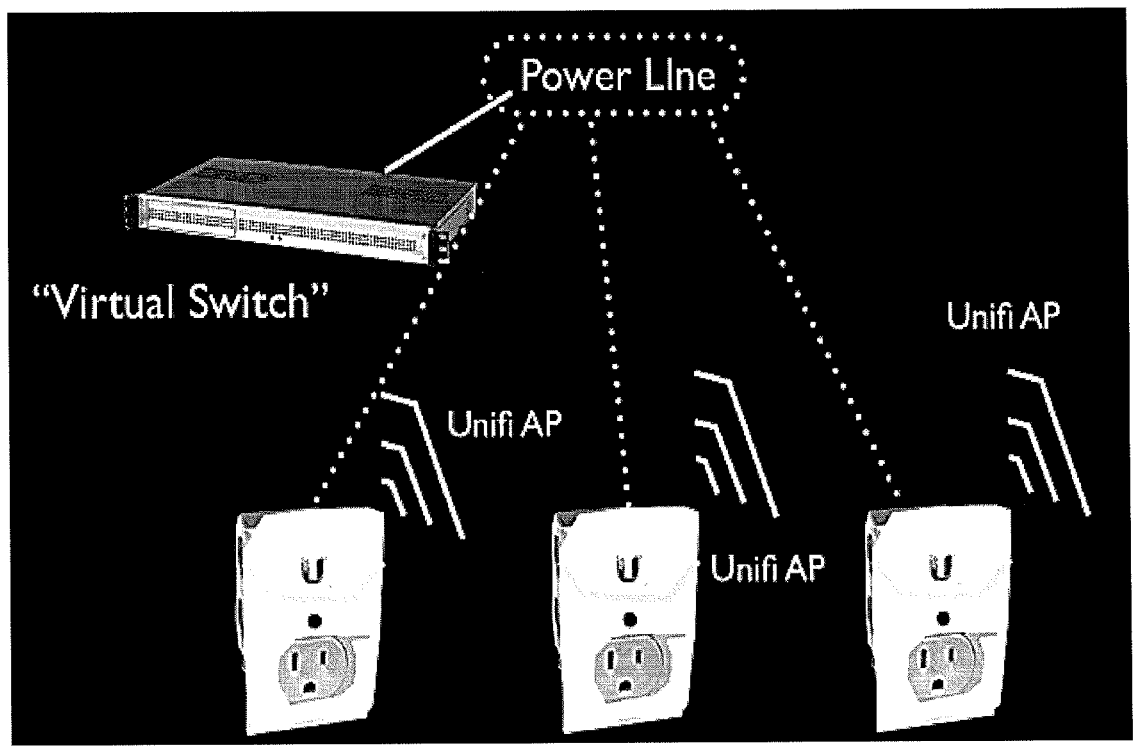
FIGS. 17A and 17B illustrate variations of systems using power receptacle wireless access point (AP) devices.
Figure 17B:
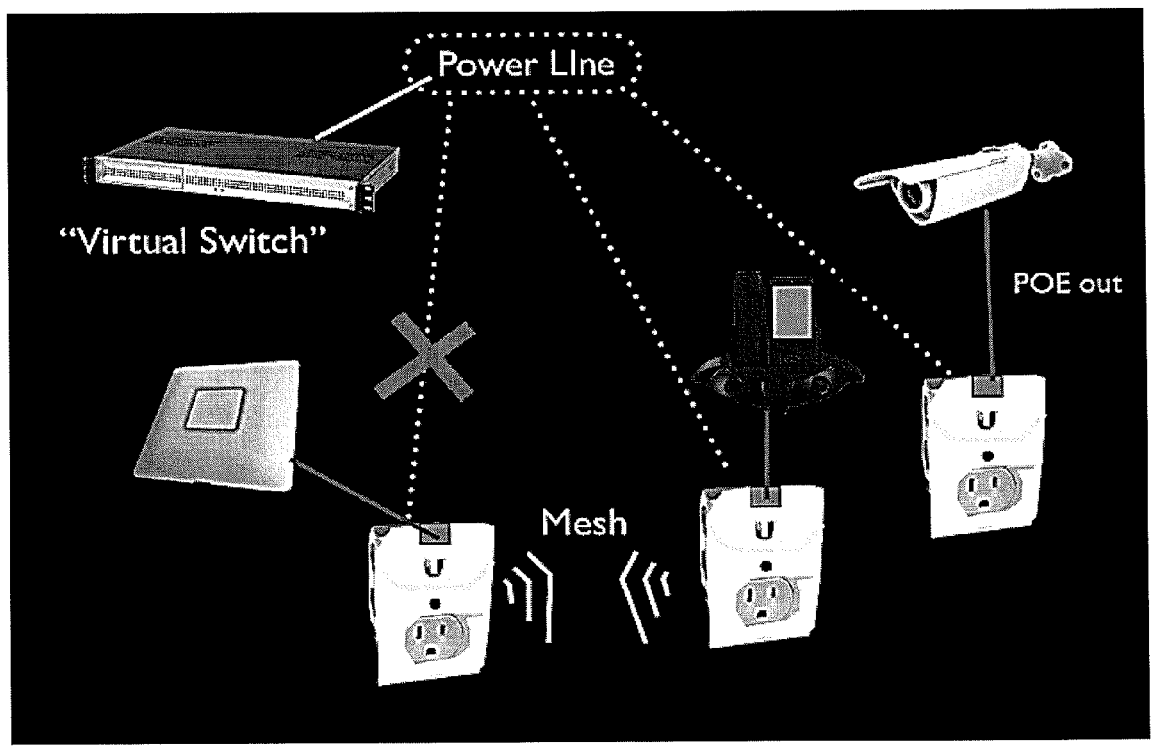

FIGS. 17A and 17B illustrates examples of systems using the power receptacle wireless access point devices shown in FIGS. 16C-16M. In FIG. 17A, each of the outlets shown is a power receptacle wireless access point device that operates as a wireless access point and is connected through the wall power line to a "virtual switch". The virtual switch may be a web based browser application on a local server or, optionally, a remotely located machine on a public cloud. In local deployment, the controller may be managed by a single user to maintain an office network with a few access points around the building. In cloud deployment, the controller provisions multiple deployment sites, e.g. multiple school campus buildings and outdoor areas consisting of thousands of access points and tens of thousands of users.

In any system including the power receptacle wireless access point devices described herein, a hub connected to an internet service provider (ISP) that encodes and decodes the signals onto the local power line (e.g., via LAN power line communication) may be included as part of the system. For example a hub (e.g., router) and/including a power line adapter set can be plugged into a power outlet and establish an Ethernet connection using the existing electrical wiring (wall power) in the home. Alternatively in some variations these devices may be used with broadband over power line (BPL) systems. In some variations, the PLC circuit for connecting the ISP device to the home power line may be an Ethernet connector coupled to a power receptacle wireless access point device, as shown in FIGS. 16G-16J, above.

FIG. 17B illustrates a variation providing Enterprise PLC. In this example, a power over Ethernet (POE) module coupled to an Ethernet port. In other variations, the circuitry is adapted to include additional communication e.g. wireless access point or a mesh node. FIG. 16D illustrates a system using power receptacle wireless access point devices such as those shown above. Each of the POE access points may be connected to a device using an Ethernet cable. The devices may include switches, phones, and cameras. In addition, the power receptacle wireless access point devices may also act to provide a wireless connection port (AP) for other devices within the structure. In some variations, as mentioned above, the devices may connect through the power line to a switch or virtual switch.

In general, the power receptacle wireless access point devices may support wireless standards, e.g., wireless USB and Bluetooth, and mesh node communications. In some variations, the power receptacle wireless access point devices support POE and mesh node communication. In some variations, the power receptacle wireless access point devices support POE and at least one wireless frequency range, e.g. 2.4 GHz, 3.6 GHz, 4.9 GHz, 5 GHz, and 5.9 GHz. When more than one wireless frequency range is implemented, additional antennas may be used (e.g., positioned in the face plate).

In general, a mesh node includes a small radio transmitter that functions similar to a wireless router. Nodes may use the Wi-Fi standards, e.g. 802.11a, b, and g to communicate wirelessly with users and with each other. Nodes may be programmed with software that tells them how to interact within the larger network. In mesh networks, information typically travels across the network from point A to point B by hopping wirelessly from one mesh node to the next. The nodes automatically choose the quickest and safest path in a process known as dynamic routing. In a wireless mesh network, only one node needs to be physically wired to a network connection. That one wired node then shares its Internet connection wirelessly with all other nodes in its vicinity. Those nodes then share the connection wirelessly with the nodes closest to them. The more nodes, the further the connection spreads, creating a wireless "cloud of connectivity" that can serve a small office or a city of millions.

FIGS. 17C-17D illustrate one variation of an antenna that may be used for the apparatuses described herein. This antenna is configured as a 2×2 MIMO antenna that can operate within the narrow confines of the wall-mounted power receptacle wireless access point device. In FIG. 17C the faceplate 1755 of the power receptacle wireless access point device is shown for reference, and may include a single plug receptacle 1757 and (optionally) a POE connector receptacle or simple Ethernet connector 1759. The antenna 1766 includes the emitter/radiator surface which is formed as part of a single feed (primary feed) having two (or in some variations more) isolated antenna input feeds. FIG. 17D shows a side view of the antenna primary feed (and the locations of the antenna input feeds 1769, 1769'). With an outline of the power receptacle wireless access point. FIG. 17E shows a side perspective view of this variation of the antenna emitter/radiator. The shape of the emitter/radiator portion of the antenna may be adjusted to optimize for the emitting pattern, and additional elements, such as reflectors, may also be included. The use of a single primary feed (having a single emitter/radiator) with multiple antenna input fees (e.g., two, three or more) may be particularly advantageous.

FIGS. 18A-18E illustrate examples of systems for distributing power receptacle wireless access point devices throughout a structure, providing network access. Any of the nodes (and hubs) described herein may also be used and/or may be configured as power receptacle wireless access point devices. Thus, these systems may include any of the aforementioned customizable access points or communication outlets, switches, and dimmers.

Figure 18A:
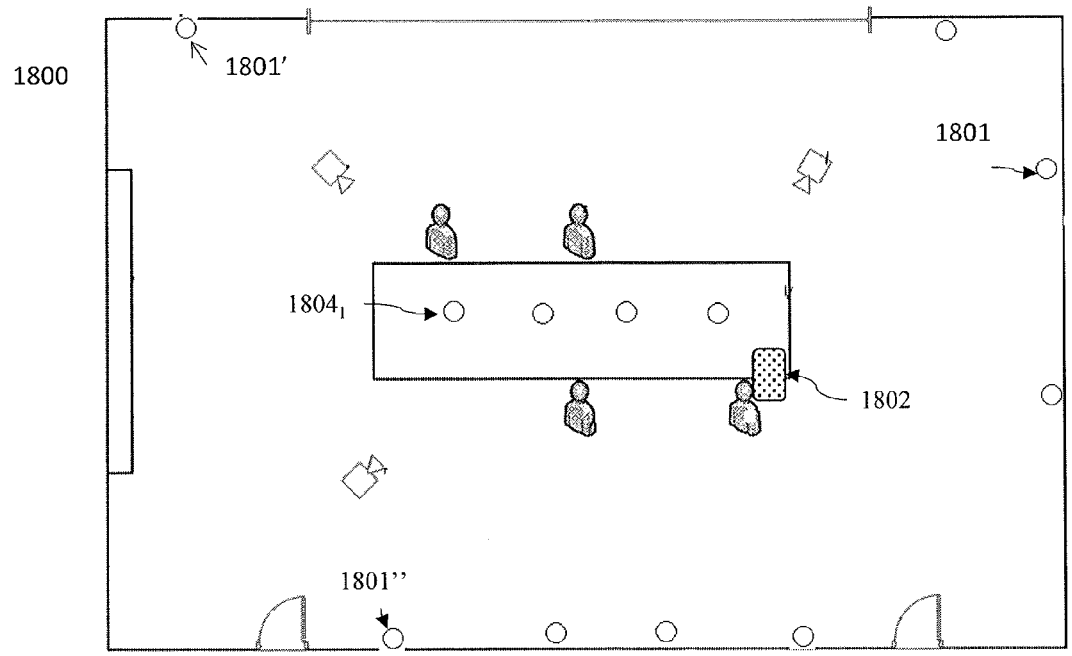
FIGS. 18A-18E illustrate variations of systems including one or more distributed nodes, including power receptacle wireless access point (AP) device nodes, within different habitable spaces.

FIG. 18A illustrates a variation of a system 1700 including power receptacle wireless access point devices that have been provisioned through the large room to provide customizable access points or communication outlets. In this example, there is central control of a group audience setting, e.g. conference room, lecture hall, theater, or banquet room. A hub may be used in communication with a control unit (e.g., tablet, computer, phone, etc.) to wirelessly control one or more devices. For example, an audience experience may be managed from n access device (e.g., wireless tablet 1802). In one instance, there are wireless access points 1801, 1801', 1801", e.g. on the wall, at light switches, in the ceiling, recessed in the floor, etc., positioned through the room and/or near the participants. A device may be connected directly (e.g., via Ethernet connection) to a power receptacle wireless access point device, or it may be wirelessly connected. In addition, the room may be equipped with multiple other nodes which may also control one or more devices or actuators (e.g., lights, audio-visual equipment, etc.), and their availability is transmitted to the hub and/or controller. To illustrate, the access device 1802 may be a mobile computing device, laptop, or cellphone, and can access the sound circuitry and put the device on mute during the performance or lecture. Alternatively, in a theater setting, the libretto or score may be transmitted to provide closed captioning. Alternatively, the light output of the device may be adjusted to reduce the impact at the neighboring chairs or the key clicks may be muted.

Figure 18B:
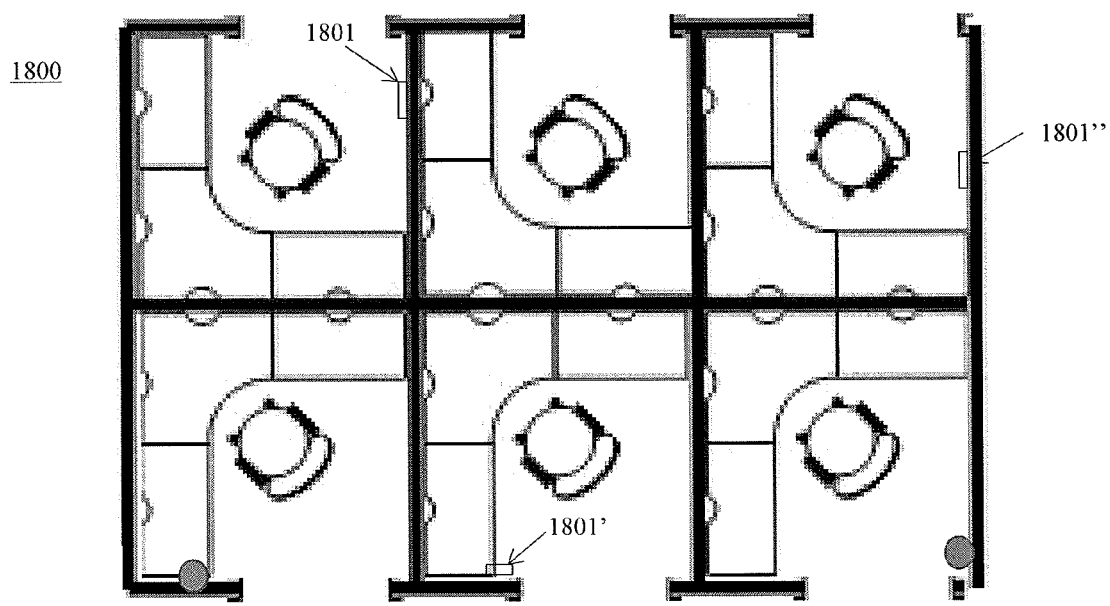

FIG. 18B shows another example of a system 1800 used in a modular office environment. There multiple access points 1801, 1801', 1801" positioned in different cubicles, e.g. at the entrance into the cubicle. The APs may provide access within this and adjacent cubicles, and the coverage may be overlapping. The power receptacle wireless access point devices and/or the virtual switch connected to them may manage the overlap and allow continuous access between the different regions. Thus, an employee may access the internet via the access points may also plug one or more device directly into an Ethernet connection on (including PoE connectors) on devices having them. In variations in which the power receptacle wireless access point device is configured as an electrical outlet, the outlet may also be used to power one or more devices. In addition, the same nodes (in variations of nodes configured as power receptacle wireless access point devices and having additional sensors) may be used to monitor the environment and provide data streams to a digital hub or through a hubless network. For example, the office environment, e.g. heat, lighting, air conditioning, may be customized according to the number of cubicles determined to be 'activated' by occupancy or other techniques. In one example, the lights near the cubicle and lighting to the break room, rest room, and exits may be illuminated when one or more of the cubicles are determined to be occupied. As mentioned above, occupancy may be determined by the hub (digital hub) using combinations of data streams, including detection of lights, sound, visual inputs, internet access, etc. The system may also control the lighting and other features to reduce lighting according to a timer to allow the employee to safely exit the office environment. In another variation, the access point includes an image sensor or biometric sensor. When the employee's presence in the cubicle is noted, the system applies environmental and access parameters associated with the employee.

Figure 18C:
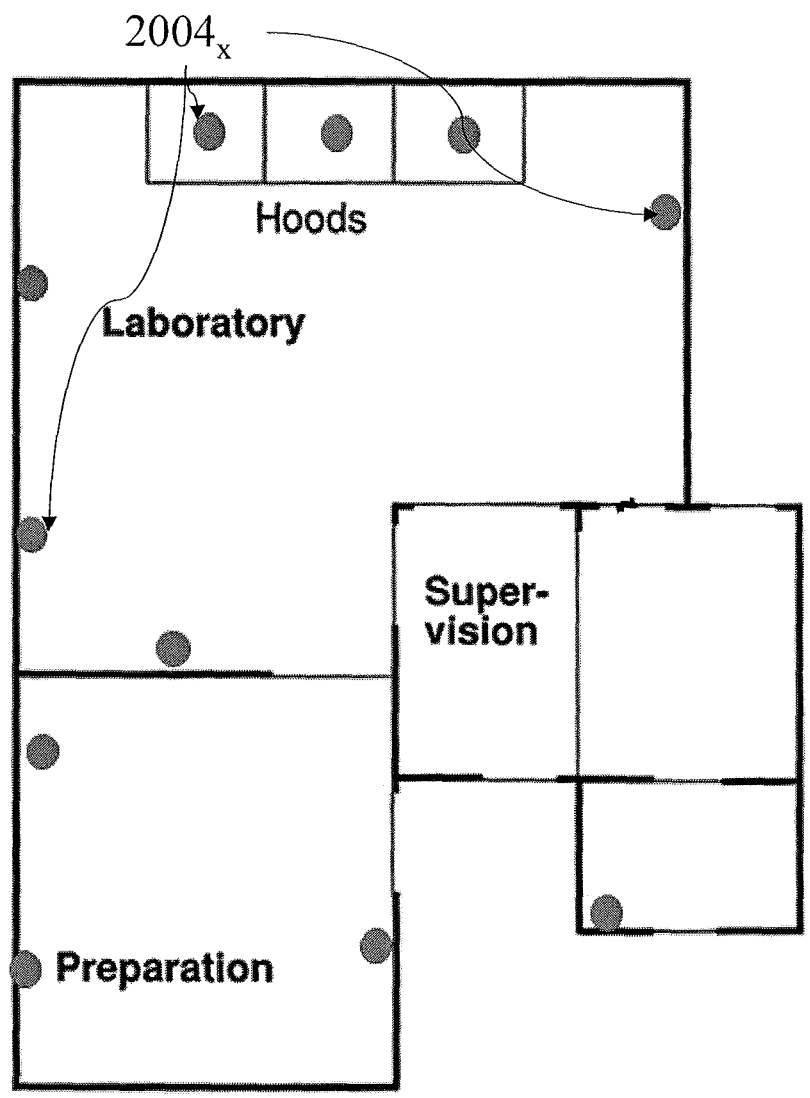

FIG. 18C illustrates a variation of a system 2000 used in a laboratory setting. In this example, nodes $2004_x$ distributed throughout the space include one or more preferably more sensors (or an integrated sensor panel) to monitor particulate levels or a type of gas or heat are among the environmental parameters controlled. This data is received by a digital hub or master controller that, in response, can adjust the ventilation to improve air flow when an unsafe level of gas has been detected, or adjust the temperature as needed.

Figure 18D:
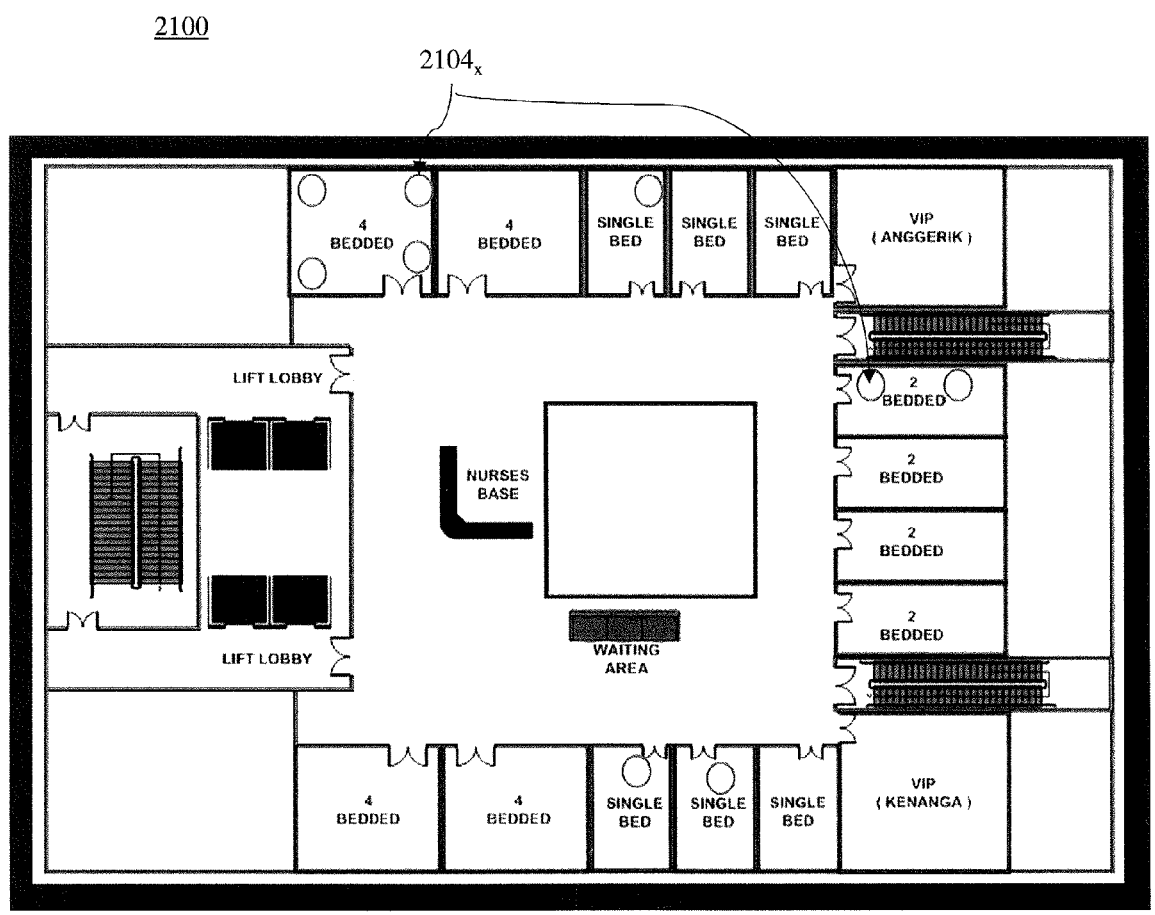

FIG. 18D illustrates another example of a system 2100, in this case used in a hospital setting. The hub and/or master controller may access the environmental parameters for each patient room via a plurality of different nodes (including wall-mounted interactive sensing and audio-visual node devices. In addition, there are wall-mounted (e.g., integrated into power outlets and/or wall switches) power receptacle wireless access point devices $2104x$ for providing wireless connectivity to various nodes positioned around the zones (e.g., beds). To illustrate, an IV stand may include a wireless sensor that sends a signal to a hub/master controller that indicates when the IV bag is empty or near empty. The hub/master controller may send a signal to the hospital staff indicating that patient care is needed. Alternatively, the hospital bed may be monitored by a sensor (e.g., a wall-mounted node having a camera and/or motion sensor) so that the hub/controller can detect a sleeping patient. When patient movement has dropped below threshold, the lighting in the room may be dimmed.

Figure 18E:
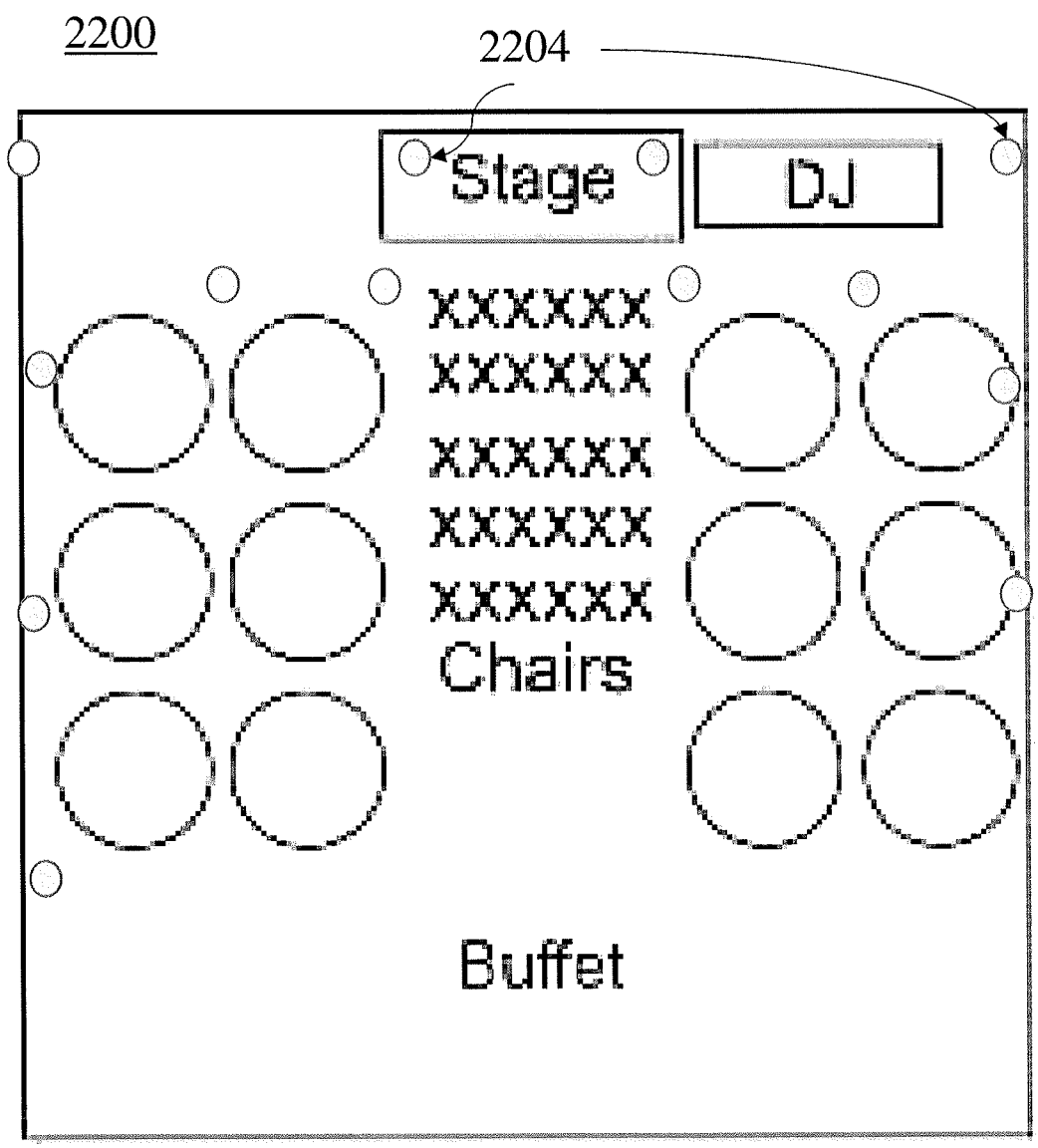

FIG. 18E illustrates a variation of a system 2200 including one or more power receptacle wireless access point device used in a restaurant setting. The power receptacle wireless access point devices may provide wireless access throughout the room in a secure and/or unsecure network. For example, customer Wi-Fi access may be provided using the network, while the same power receptacle wireless access point device nodes and/or other nodes connected or connectable to a digital hub for monitoring and/or controlling the space. For example, a hub/master controller may monitor the sound level in the room. The customizable outlets 2204 may be used for controlling and monitoring lighting, speakers, or microphones. The lighting in the dining area can be adjusted to create a mood, or the white noise generator can be adjusted according to the detected sound level, or a banquet room may be customized for an event. The access points may allow connection to wireless speakers which can be regulated/controlled by the digital hub/controller, thereby improving safety for guests.

Any of the aforementioned systems can be extended to work with standard electrical receptacles or track based power distribution systems that have positionable sockets. Any of the data structures and code described or used to implement any of the devices, systems and method described herein may be stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed. In general, the methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Any of the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

EXAMPLES

A. Integrated Data Power Cable (PLC Adapter)

Described herein are PLC adapters that may be used to connect one or more devices (e.g., a switch, a computer, etc.) to a PLC network. Conventional PLC adapters are generally boxed-shaped and directly plugged into the socket of a standard electrical wall outlet, using up a significant amount of space at and around the wall outlet. While some adapters provide an electrical pass-through, there general shape and size remains the same. One challenge with commercially available PLC networking products is the volume of space imposed by an adapter at a wall outlet and the area that immediately surrounds it. This is of particular concern in older houses and building structures because they generally have fewer electrical outlets. Another challenge arises when the space between a networking device and wall outlet is cluttered and impeded with the presence of other physical structures, such as furniture, electronic devices, and clusters of cables. There is a need to provide an integrated and streamlined power line communication apparatus that is configured for a minimal footprint.

Figure 20A:
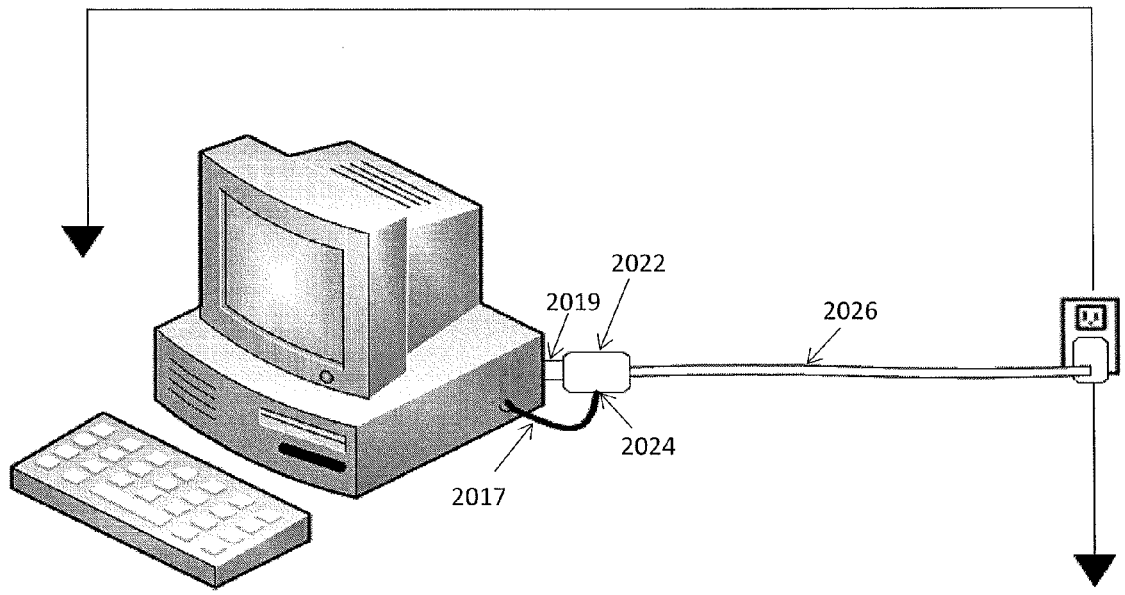
FIG. 20A shows one variation of an integrated PLC adapter/data power cable connected to a network-enabled device (computer) providing both power and connection to a PLC network.
Figure 20B:
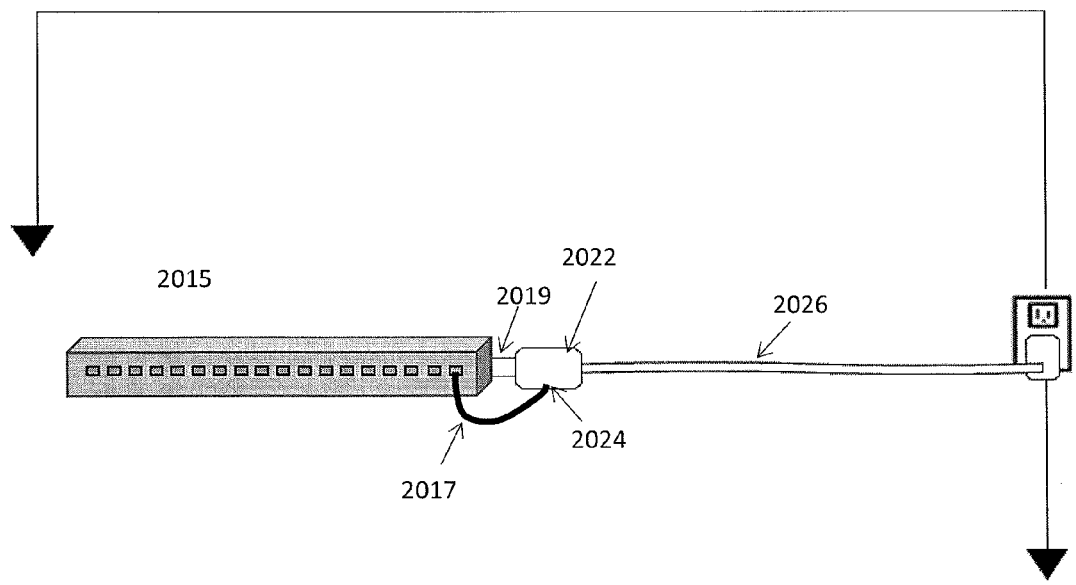
FIG. 20B shows another example of an integrated PLC adapter/data power cable connected to a network-enabled device (switch) providing both power and connection to a PLC network.

FIGS. 20A and 20B illustrate one example of an integrated PLC adapter/data power cable connecting a networking device (e.g., computer in FIG. 20A and switch in FIG. 20B) to a power line. A networking device may include any of the devices described herein, including for example, computers, switches/routers, printers, tablets, thermostats, VoIP phones, cameras, speakers, gaming consoles, Blu-ray players, RFID readers, security access pads, intercoms, and elevators, etc.

In FIGS. 20A and 20B, the integrated PLC adapter and power cable includes a distal end that is configured to plug into a standard line (wall) power outlet (e.g., any of the standard power outlets described above). For example, the plug may include a 3 prong connector. The plug may be connected via an elongate length of insulated connector 2026 to an adapter region 2022 that, in this example, is positioned near the proximal end of the integrated PLC adapter and power cable device, and includes a housing. The proximal end of the device, connected to the cable, includes a connector 2019 to connect to the power inlet for the networking device, as shown in FIGS. 20A and 20B, providing power to the device. The power may be line power or it may be modified (e.g., converted to DC) as required by the networking device. Thus, the integrated PLC adapter and power cables described herein may replace standard power cords or power cords and power adapters used for any of the networking devices described herein (e.g., different variations of integrated PLC adapter and power cables may be used). For example, any of the integrated PLC adapter and power cables described herein may include an AC power adapter to convert wall power into the DC power. The AC power adapter may be housed within the adapter region 2022. The adapter region 2022 may also include circuitry and structures, including connectors and/or cabling, such as an Ethernet RJ-45 connector and/or Ethernet cable 2017, to connect to an Ethernet port on the networking device, as shown in FIGS. 20A and 20B. In some variations, the Ethernet cable 2017 is integrated into the adapter region 2022, while in other variations the adapter region 2022 includes an Ethernet connector 2024 into which a short length of cable may connect, as shown. The proximal end of the integrated PLC adapter and power cable may include a connector that plugs into the power socket on the networking device.

Figure 21A:
FIGS. 21A and 21B illustrate top and side views, respectively of another example of an integrated PLC adapter/data power cable.
Figure 21B:
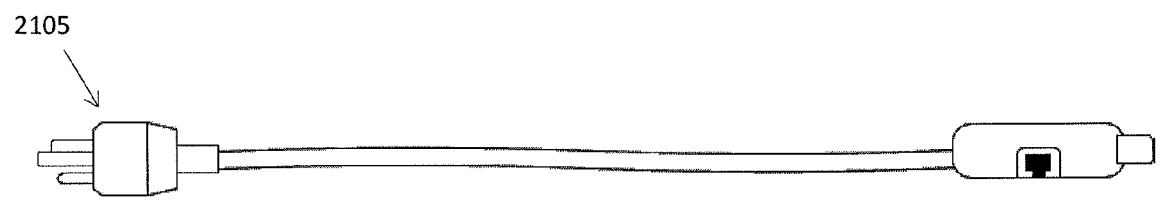

FIGS. 21A-21B, illustrate an integrated data power cable includes a signal carrier and an adapter, both of which are disposed between a power plug and a power connector, similar to the variations shown in FIGS. 20A-20B. In this example, the signal carrier, which may be in the form of a cable (e.g. AC cable 2026), is elongated. It may have a generally concentric cross-section and a highly conductive core. The core may be constructed from materials such as copper or a copper alloy. Other materials including, but not limited to, aluminum and its alloys are also an option. While less conductive than copper, aluminum should be considered if either cost or weight is an issue. The conductive core may be a single solid wire, however, a multi-stranded configuration of braided, twisted, coiled, or coaxial-arranged wires is preferable since it imparts more flexibility and is easier to handle and install.

The conductive core may be surrounded by a relatively flexible, electrically insulating sleeve. The thickness of the sleeve will depend on the various specifications of the signal carrier and the type of dielectric material from which the sleeve is formed. Commonly used materials for similar applications include polyvinylchloride (PVC), fluoroethylenepropylene (FEP), polytetrafluorethylene (TFE) Teflon, ethylene tetrafluoroethylene (ETFE), and silicone (SI), for example, and may be used to fabricate the sleeve. Depending on the material used, the sleeve can embody a solid or semi-solid form. The latter of which may be characterized by the cellular nature and structural air gaps present in a substance such as foam. An outer coating or thin jacket made of a suitable material for a given external environment encloses the sleeve and conductive core within it.

Figure 22A:
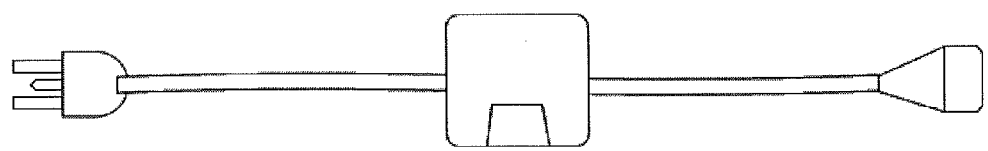
FIGS. 22A and 22B illustrate top views of additional examples of integrated PLC adapter/data power cables as described herein.
Figure 22B:

In general, the adapter region may be configured as a PLC converter, to transmit, receive, encode, and decode data signals on a power line, such as the 120V AC electrical wiring found in the typical U.S. home. The adapter may include a modem and a data signal unit having one or more communication ports and interfaces. The adapter may be a self-containing unit that is integrated with the signal carrier. As shown in FIGS. 22A and 22B, respectively, the adapter may be integrated in such a way that it is positioned along or enclosed within or the signal carrier.

In FIG. 21A-21B, the adapter region of the integrated PLC adapter and power cable is positioned near the proximal end, so that the housing for the adapter region is within a few inches (e.g., less than about 12 inches, less than about 10 inches, less than about 9 inches, less than about 8 inches, less than about 7 inches, less than about 6 inches, less than about 5 inches, less than about 4 inches, less than about 3 inches, less than about 2 inches, less than about and 1 inch, etc.) of the proximal end. The proximal end includes the connector/interface (e.g., socket) for connection to the networking device. Having the adapter integrated into the power supply cord and positioned very near the end of the device opposite from the connector/plug for connecting to the wall power (e.g., the distal end) has the surprising advantage of enhancing both the noise properties, reducing clutter, and enhancing the ease of set-up.

The integrated PLC adapter and power cable may therefore be used to establish a PLC network, in which the modem within the adapter portion transmits, receives, and processes data and power signals. For example, when the modem receives an outbound data signal that is to be transmitted on a power signal, the modem processes the data signal by modulating, that is, injecting or superimposing, it onto the power signal. When the modem receives an inbound modulated data-on-power signal or composite signal, it performs processes in which it extracts the data signal from the power signal and demodulates the data signal for appropriate reading.

As mentioned above, different modulation forms or methods may be used to shape the power signal so that discrete packets of information from the digital data signal produced by a networking device may be conveyed onto a continuous analog power signal. The most common techniques involve modulating one of the parameters of the power signal, or keying. For the sinusoidal waveform of an AC power signal, the parameters may include amplitude, frequency, and phase. In amplitude-shift keying (ASK), the amplitude of the signal is changed in response to data or information, while the frequency and phase are held constant. With frequency-shift keying (FSK), only the frequency is changed in response to data or information. And in phase-shift keying (PSK), only the phase of the wave is changed to indicate the data or information carried. Alternatively, other digital modulation techniques, for example, quadrature amplitude modulation (QAM), continuous phase modulation (CPM), orthogonal frequency-division multiplexing (OFDM), wavelet or fractal modulation, and spread-spectrum modulation, may be employed.

While interference may be minimal, because a data signal carried on a power signal transfers at a higher frequency than the power signal, a filter or series of filters may optionally be used to clean up the signal or filter out noise contamination introduced to the power line by other devices plugged into it. For example, washing machines, blenders, hair dryers, refrigerators, and fans, or other device connected to the power line, could produce noise that might degrade the quality of a PLC network if not filtered out. The filter may be positioned where it can filter out such noise from other devices that are plugged into the power line.

The data signal unit/portion of the adapter may have one or more corresponding communication interfaces and data ports to receive data signals from networking devices (e.g., over the Ethernet or similar connection). The data signal unit also may support one or both of wired and wireless technology. The embodiment depicted in FIGS. 21A-21B shows the adapter having one data port, however, other embodiments may include multiple ports. At a data port, data signals are sent and received between the adapter and a networking device. In one embodiment, an Ethernet cable connects an Ethernet port on the adapter of the integrated data power cable to an Ethernet port on a networking device. Data signals are relayed between these Ethernet ports through the Ethernet cable connecting them.

In the example shown in FIGS. 21A and 21B, the distal end of the integrated PLC adapter and power cable device includes a power plug 2105 attached to one end of the signal carrier (cord). The type of plug used may depend on the whether the power is alternating current (AC) or direct current (DC), and the amount of voltage that is transmitted through the sockets on the receptacle being fed by the power line. Thus, the selected plug may include a converter or other mechanism as is necessary. The most common wall outlets in the United States use a NEMA (National Electrical Manufacturers Association) 5-15R receptacle, which has a set of two narrow slits and a rounded hole. In such circumstances, a suitable plug is the corresponding male, AC, three-pronged NEMA 5-15P (North American 15 A/125 V grounded). Of course, another type of plug, including those used in countries other than the United States and with power lines other than 120 V, could be used.

Attached to the other end of the signal carrier is the adapter region, which may also include the power converter for adapting and supplying power to a networking device (e.g., converting to DC from line power) as well as acting as a PLC converter, as described above. A few examples of a variety of different shaped and sized adapters are shown in FIGS. 23A-23C. The type of adapter used will depend on the particular networking device.

In operation, a modulated signal, e.g., a composite of a data signal and a power signal, may be received from the wall power into the power plug connected thereto. PLC signal(s) may be is transmitted to the adapter, which may include a modem that can demodulate the signal(s), extracting the data signal and transmitting it via the Ethernet connection (port) to the connected networking device; similarly communication received from the networking device may be converted and encoded on the power line back to the wall power via the adapter. As mentioned, this communication may be provided by an Ethernet cable connecting the Ethernet port at the data signal unit with an Ethernet port on a networking device. When the networking device has data to convey to other devices connected to the PLC network, it may send data signal(s) to the adapter, e.g., a data signal unit that integrates with the modem of the PLC adapter in the integrated PLC adapter and power cable. The modem modulates the power signal to carry information from the data signal. The modulated signal is transmitted by the signal carrier and travels through the power plug onto the power line. The modulated signal may then be received by any networking device that is also connected to the PLC network.

In FIG. 24, similar to the variation shown in FIG. 20B, an integrated PLC adapter and power cable includes an adapter positioned immediately adjacent to the proximal end where the cable connects to the power inlet of the device (shown as a switch) to connect a front end of a networking device to a power line. An Ethernet cable is coupled to an Ethernet port on the integrated PLC adapter and power cable and to a front end of the networking device; when a modulated data power signal is received from the wall outlet 2405, it travels through the entire elongated signal carrier (cable 2406) until it reaches the adapter 2415. Once there the PLC adapter demodulates the signal to recover a data signal. Power provided by the wall outlet (either directly or after modification, including conversion from AC to DC power and/or amplification) is passed through the power connector (e.g., power plug in the networking device) attached to the front end of the networking device. The data signal may be routed to a data signal unit where, through an Ethernet port and/or coupled Ethernet cable, it may be transmitted to the Ethernet port on the front end of the networking device.

B. Integrated Data Power Outlet (PLC Adapter)

Figure 25A:
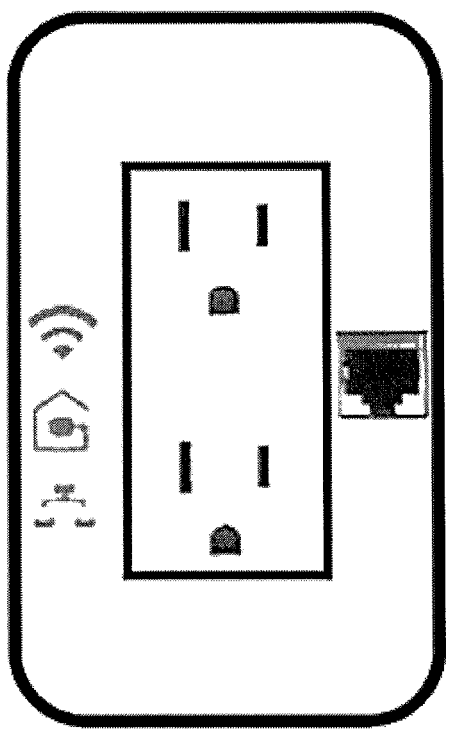
FIGS. 25A-25B show front and side views, respectively, of one variation of an integrated PLC power outlet.
Figure 25B:
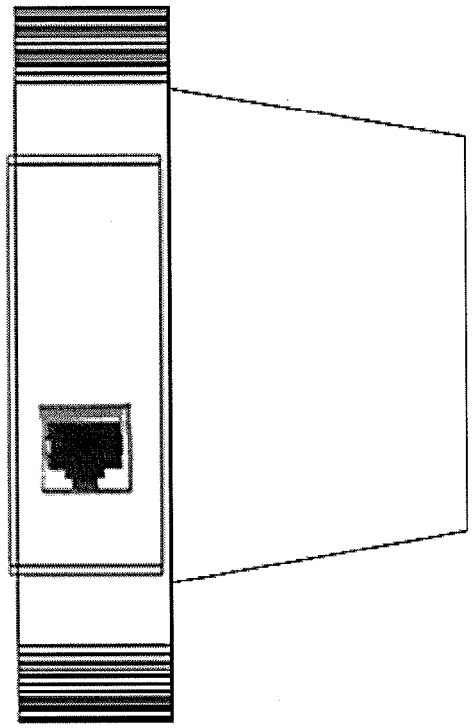
Figure 25C:
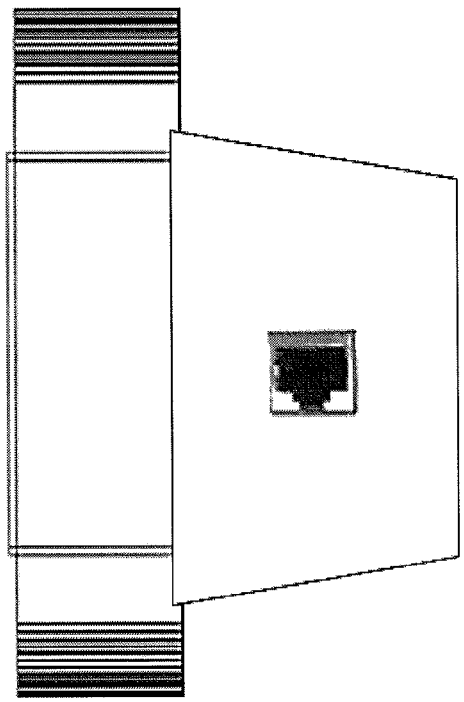
FIG. 25C is another variation of a side view of an integrated PLC power outlet.

FIGS. 25A-25C illustrate another variation of an integrated PLC power outlet, similar to those described above. In this example, the integrated PLC power outlet is configured to be mounted to a wall. It has a box-shaped housing, an electrical receptacle, a cover assembly, PLC conversion unit, which may include a modem and data signal unit.

In this example, the integrated PLC power outlet also includes one or more wired or wireless communication ports and corresponding interfaces. The communication ports may be located on or within the cover plate and the housing, as shown in FIGS. 25A-25C. Wired ports and interfaces may include, but are not limited to the following technology: Ethernet; USB; HDMI; DVI; and XLR. Wireless or virtual ports have a wireless access point, an antenna, a transmitter, and a receiver, along with a software interface that wirelessly connects through Wi-Fi (or Bluetooth, etc.) a networking device to a PLC network.

For example, upon properly installing the integrated data power outlet into a power box and connecting the outlet circuitry to that of an existing power line, a networking device may be added to a PLC network by plugging in the device's power plug into a socket of the outlet. A modulated signal is transmitted from the power line to the modem through the circuitry residing in the base and connected to the power line. The modem may process the signal and demodulate (downstream) or modulate (upstream) signals. Power may continue through the electrical socket to a power plug inserted therein, thereby providing power to a device, including a networking device. The extracted data signal may be routed to the data signal unit. A communication interface and port may convey the data signal to the networking device through a wired or wireless carrier. As an example, an Ethernet cable along with corresponding interface and port may be used. Alternatively, if the integrated PLC power outlet is configured to include a wireless access point (as described above) including an antenna (along with a transmitter and receiver), it may be used to wirelessly transmit the data signal to the networking device.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all subranges subsumed therein.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A power receptacle wireless access point (AP) device, the device comprising:
   a wall power input configured to connect to a power line in a wall of a room: a power line communication (PLC) circuit, the PLC circuit configured to receive data from and transmit data on a power line connected to the wall power input; at least one antenna comprising a microstrip antenna having a bent emitter surface arranged along a lateral side of a faceplate adjacent to at least one plug receptacle, wherein the bent emitter surface comprises a front surface facing a frontal surface plane in which the at least one plug receptacle is placed and a side surface comprising a plurality of plates shaped for defining a beamforming range, the front and the side surface forming a curvature resulting in a beamforming pattern that excludes directions of lateral sides of the frontal surface plane and the directions towards the back of the wall;
   a wireless AP circuit connected to the PLC circuit, the wireless AP configured to receive data from the PLC circuit and to wirelessly transmit the data using the at least one antenna, and further configured to receive wireless data on the at least one antenna and to transmit the received data to the PLC circuit; and a mount configured to mount the device in or over an electrical box.

2. The device of claim 1, further wherein the PLC circuit and the wireless AP circuit receive power from the wall power input.

3. The device of claim 1, wherein the PLC circuit comprises a demodulator configured to demodulate a data signal from the power line.

4. The device of claim 1, wherein the PLC circuit comprises a modulator configured to modulate a data signal for transmission on the power line.

5. The device of claim 1, further comprising an electrical power outlet configured to receive electrical power from the power line.

6. The device of claim 1, further comprising a switch configured to connect power from the power line to a power output.

7. The device of claim 1, further comprising a housing configured to house the PLC circuit, antenna and wireless AP circuit.

8. The device of claim 1, further comprising a faceplate configured to fit over an electrical box, wherein the wireless AP circuit, antenna and power line communication circuit are connected to the faceplate.

9. The device of claim 1, wherein the at least one antenna comprises a transmission antenna and a receiving antenna.

10. The device of claim 1, wherein the at least one antenna is a Wi-Fi antenna.

11. The device of claim 1, wherein the wireless AP circuit comprises a Wi-Fi radio circuit.

12. The device of claim 1, further comprising a power over Ethernet (PoE) output plug.

13. The device of claim 1, wherein the mount comprises an opening for a screw.

14. A power receptacle wireless access point (AP) device, the device comprising:
- a wall power input configured to connect to a power line in a wall of a room;
- a power line communication (PLC) circuit, the PLC circuit configured to receive data from and transmit data on a power line connected to the wall power input;
- at least one antenna comprising a microstrip antenna having a bent emitter surface arranged along a lateral side of a faceplate adjacent to at least one plug receptacle wherein the bent emitter surface comprises a front surface facing a frontal surface plane in which the at least one plug receptacle is placed and a side surface comprising a plurality of plates shaped for defining a beamforming range, the front and the side surface forming a curvature resulting in a beamforming pattern that excludes directions of lateral sides of the frontal surface plane and the directions towards the back of the wall;
- a wireless AP circuit connected to the PLC circuit, the wireless AP configured to receive data from the PLC circuit and to wirelessly transmit the data using the at least one antenna, and further configured to receive wireless data on the at least one antenna and to transmit the received data to the PLC circuit;
- an electrical power outlet configured to receive electrical power from the power line; and a mount configured to mount the device in an electrical box.

15. The device of claim 14, further wherein the PLC circuit and the wireless AP circuit receive power from the wall power input.

16. The device of claim 14, wherein the PLC circuit comprises a demodulator configured to demodulate a data signal from the power line.

17. The device of claim 14, wherein the PLC circuit comprises a modulator configured to modulate a data signal for transmission on the power line.

18. The device of claim 14, further comprising a housing configured to house the PLC circuit, antenna and wireless AP circuit.

19. The device of claim 14, wherein the at least one antenna comprises a transmission antenna and a receiving antenna.

20. The device of claim 14, wherein the at least one antenna is a Wi-Fi antenna.

21. The device of claim 14, wherein the wireless AP circuit comprises a Wi-Fi radio circuit.

22. The device of claim 14, further comprising a power over Ethernet (PoE) output plug.

23. A power receptacle wireless access point (AP) device, the device comprising:
- a wall power input configured to connect to a power line in a wall of a room: a power line communication (PLC) circuit, the PLC circuit configured to receive data from and transmit data on a power line connected to the wall power input; at least one antenna comprising a microstrip antenna having a bent emitter surface arranged along a lateral side of a faceplate adjacent to at least one plug receptacle wherein the bent emitter surface comprises a front surface facing a frontal surface plane in which the at least one plug receptacle is placed and a side surface comprising a plurality of plates shaped for defining a beamforming range, the front and the side surface forming a curvature resulting in a beamforming pattern that excludes directions of lateral sides of the frontal surface plane and the directions towards the back of the wall;
- a wireless AP circuit connected to the PLC circuit and to the at least one antenna, the wireless AP configured to receive data from the PLC circuit and to wirelessly transmit the data using the at least one antenna, and further configured to receive wireless data from the at least one antenna and to transmit the received data to the PLC circuit for transmission on the power line; and a faceplate configured to fit over an electrical box, wherein the wireless AP circuit, antenna and power line communication circuit are connected to the faceplate.

24. The device of claim 23, wherein the faceplate comprises an opening for an electrical outlet.

25. A power receptacle wireless access point (AP) adapter device, the device comprising;
- a wall power input configured to connect to a power line in a wall of a room:
- a power line communication (PLC) circuit, the PLC circuit configured to receive data from and transmit data on a power line connected to the wall power input;
- at least one antenna comprising an antenna having a bent emitter surface arranged along a lateral side of a faceplate adjacent to at least one plug receptacle wherein the bent emitter surface comprises a front surface facing a frontal surface plane in which the at least one plug receptacle is placed and a side surface comprising a plurality of plates shaped for defining a beamforming range, the front and the side surface forming a curvature resulting in a beamforming pattern that excludes directions of lateral sides of the frontal surface plane and the directions towards the back of the wall;
- a wireless AP circuit connected to the PLC circuit, the wireless AP configured to receive data from the PLC circuit and to wirelessly transmit the data using the at least one antenna, and further configured to receive wireless data on the at least one antenna and to transmit the received data to the PLC circuit.

26. The device of claim 25, further comprising a plurality of electrical power outlets configured to receive electrical power from the power line and provide electrical power to a plug connected any of the electrical power outlets.

* * * * *